United States Patent
Yamamoto et al.

(10) Patent No.: US 11,234,011 B2
(45) Date of Patent: Jan. 25, 2022

(54) IMAGE DECODING APPARATUS AND IMAGE CODING APPARATUS

(71) Applicant: SHARP KABUSHIKI KAISHA, Sakai (JP)

(72) Inventors: Yoshiya Yamamoto, Sakai (JP); Yukinobu Yasugi, Sakai (JP); Tomohiro Ikai, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/100,099

(22) Filed: Nov. 20, 2020

(65) Prior Publication Data

US 2021/0144395 A1  May 13, 2021

Related U.S. Application Data

(62) Division of application No. 16/328,074, filed as application No. PCT/JP2017/027877 on Aug. 1, 2017, now Pat. No. 10,863,186.

(51) Int. Cl.
| | |
|---|---|
| *H04N 19/44* | (2014.01) |
| *H04N 19/136* | (2014.01) |
| *H04N 19/176* | (2014.01) |
| *H04N 19/70* | (2014.01) |
| *H04N 19/119* | (2014.01) |
| *H04N 19/157* | (2014.01) |
| *H04N 19/96* | (2014.01) |

(52) U.S. Cl.
CPC .......... *H04N 19/44* (2014.11); *H04N 19/119* (2014.11); *H04N 19/136* (2014.11); *H04N 19/157* (2014.11); *H04N 19/176* (2014.11); *H04N 19/70* (2014.11); *H04N 19/96* (2014.11)

(58) Field of Classification Search
CPC combination set(s) only.
See application file for complete search history.

(56) References Cited

U.S. PATENT DOCUMENTS

| | | | |
|---|---|---|---|
| 9,807,424 B2* | 10/2017 | Guo | H04N 19/176 |
| 2012/0106628 A1* | 5/2012 | Sole | H04N 19/61 |
| | | | 375/240.02 |

(Continued)

FOREIGN PATENT DOCUMENTS

| | | |
|---|---|---|
| JP | 2005079965 A | 3/2005 |
| WO | 2015/147508 A1 | 10/2015 |
| WO | 2016/090568 A1 | 6/2016 |

OTHER PUBLICATIONS

Jianle Chen et al. "Algorithm Description of Joint Exploration Test Model 2", JVET-B1001_v3, Joint Video Exploration Team (JVET) of ITU-T SG 16 WP 3 and ISO/IEC JTC 1/SC 29/WG 11, 2nd Meeting: San Diego, USA, Feb. 20-26, 2016.

(Continued)

*Primary Examiner* — Dave Czekaj
*Assistant Examiner* — Shanika M Brumfield
(74) *Attorney, Agent, or Firm* — ScienBiziP, P.C.

(57) ABSTRACT

An image decoding apparatus is provided with a CT information decoding unit that decodes division information indicating a division method for binary tree division with respect to a coding node of a coding tree unit, and performs the binary tree division with respect to the coding node by referring to the division information of another decoded coding node.

1 Claim, 48 Drawing Sheets

(56) References Cited

U.S. PATENT DOCUMENTS

| | | | | |
|---|---|---|---|---|
| 2012/0308148 A1* | 12/2012 | Kim | ........................ | H04N 19/00 |
| | | | | 382/233 |
| 2013/0083839 A1* | 4/2013 | Yang | ...................... | H04N 19/86 |
| | | | | 375/240.02 |
| 2015/0281735 A1 | 10/2015 | Park et al. | | |
| 2015/0334407 A1* | 11/2015 | Rusert | ................... | H04N 19/463 |
| | | | | 375/240.12 |
| 2016/0044327 A1* | 2/2016 | Kim | ..................... | H04N 19/463 |
| | | | | 382/233 |
| 2016/0156907 A1* | 6/2016 | Liang | ..................... | H04N 19/70 |
| | | | | 375/240.12 |
| 2018/0027258 A1* | 1/2018 | Tech | ...................... | H04N 19/70 |
| | | | | 375/240.16 |
| 2018/0160113 A1* | 6/2018 | Jeong | ................... | H04N 19/593 |
| 2018/0176596 A1* | 6/2018 | Jeong | ................... | H04N 19/523 |
| 2018/0184122 A1 | 6/2018 | Park et al. | | |
| 2019/0141319 A1* | 5/2019 | Moon | ................... | H04N 19/159 |
| 2019/0191158 A1* | 6/2019 | Sim | ....................... | H04N 19/176 |
| 2019/0222843 A1* | 7/2019 | Lee | ........................ | H04N 19/12 |
| 2019/0327476 A1* | 10/2019 | Lee | ...................... | H04N 19/117 |

OTHER PUBLICATIONS

Office Action issued on U.S. Appl. No. 16/328,074 dated Apr. 2, 2020.

Notice of Allowance issued on U.S. Appl. No. 16/328,074 dated Jul. 31, 2020.

\* cited by examiner

FIG. 2A CODING VIDEO SEQUENCE
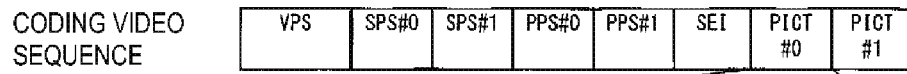
FIG. 2B CODING PICTURE
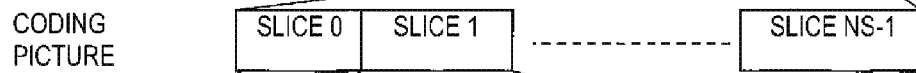
FIG. 2C CODING SLICE
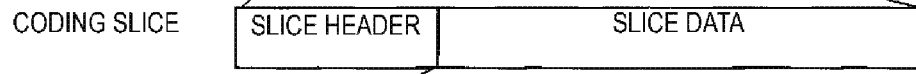
FIG. 2D CODING SLICE DATA
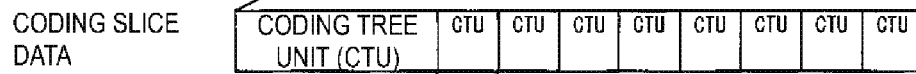
FIG. 2E CODING TREE UNIT
FIG. 2F CODING UNIT
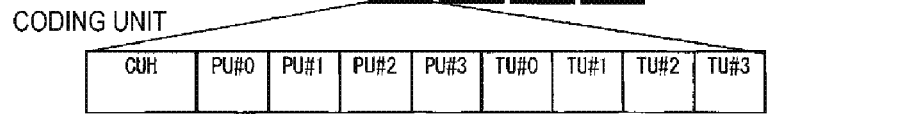

TIME (POC)

| coding_quadtree( x0, y0, log2CbSize, cqtDepth ) { | Descriptor |
|---|---|
| if( x0 + ( 1 << log2CbSize ) <= pic_width_in_luma_samples && y0 + ( 1 << log2CbSize ) <= pic_height_in_luma_samples && log2CbSize > MinCbLog2SizeY | |
| split_cu_flag[ x0 ][ y0 ] | ae(v) |
| if( cu_qp_delta_enabled_flag && log2CbSize >= Log2MinCuQpDeltaSize ) { | |
| IsCuQpDeltaCoded = 0 | |
| CuQpDeltaVal = 0 | |
| } | |
| if( cu_chroma_qp_offset_enabled_flag && log2CbSize >= Log2MinCuChromaQpOffsetSize ) | |
| IsCuChromaQpOffsetCoded = 0 | |
| if( split_cu_flag[ x0 ][ y0 ] ) { | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
| coding_quadtree( x1, y0, log2CbSize − 1, cqtDepth + 1 ) | |
| if( y1 < pic_height_in_luma_samples ) | |
| coding_quadtree( x0, y1, log2CbSize − 1, cqtDepth + 1 ) | |
| if( x1 < pic_width_in_luma_samples && y1 < pic_height_in_luma_samples ) | |
| coding_quadtree( x1, y1, log2CbSize − 1, cqtDepth + 1 ) | |
| } else | |
| coding_binarytree(x0, y0, log2CbSize, log2CbSize, cqtDepth, 0 ) | |
| } | |

FIG. 12

| | Descriptor |
|---|---|
| coding_binarytree ( x0, y0, log2CbWidth, log2CbHeight, cqtDepth, cbtDepth ) { | |
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( (((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) | |
|   split_bt_mode[ x0 ][ y0 ] | ae(v) |
| if ( split_bt_mode[ x0 ][ y0 ] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cqtDepth, cbtDepth + 1 ) | |
|   coding_binarytree( x0, y1, log2CbWidth, log2CbHeight - 1, cqtDepth, cbtDepth + 1 ) | |
| } else if ( split_bt_mode[ x0 ][ y0 ] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cqtDepth, cbtDepth + 1 ) | |
|   coding_binarytree( x1, y0, log2CbWidth - 1, log2CbHeight, cqtDepth, cbtDepth + 1 ) | |
| } else | |
|   coding_unit( x0, y0, log2CbWidth, log2CbHeight) | |
| } | |

FIG. 13

| coding_binarytree ( x0, y0, log2CbWidth, log2CbHeight, cbtDepth ) { | Descriptor |
|---|---|
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>    : 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>        : max_bt_depth_i_slice_chroma_minus2 + 2)<br>    : max_bt_depth_minus2 + 2 | |
| if ( ((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) { | |
|    split_bt_flag[ x0 ][ y0 ] | ae(v) |
|    if (cbtDepth == 0 && split_bt_flag[ x0 ][ y0 ] == 1 ) | |
|      split_dir_flag[ x0 ] [ y0 ] | ae(v) |
| } | |
| if ( splitBtMode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cbtDepth + 1 ) | |
| coding_binarytree( x0, y1, log2CbWidth, log2CbHeight - 1, cbtDepth + 1 ) | |
| } else if ( splitBtMode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cbtDepth + 1 ) | |
| coding_binarytree( x1, y0, log2CbWidth - 1, log2CbHeight, cbtDepth + 1 ) | |
| } else | |
| coding_unit( x0, y0, log2CbWidth, log2CbHeight) | |
| } | |

FIG. 15

| split_bt_flag | split_dir_flag = 0 with cbtDepth = 0 | split_dir_flag = 1 with cbtDepth = 0 |
|---|---|---|
| 0 | BT_SPLIT_NONE (=0) | BT_SPLIT_NONE (=0) |
| 1 | BT_SPLIT_HOR (=1) | BT_SPLIT_VER (=2) |

FIG. 16

| coding_binarytree ( x0, y0, log2CbWidth, log2CbHeight, cqtDepth, cbtDepth, splitConstrain ) { | Descriptor |
|---|---|
| maxBTSize = (slice_type == I_Slice) ?<br>( isLuma ? 1<<( log2_max_bt_size_i_slice_luma_minus2 + 2)<br>: 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>: max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) { | |
| if ( splitConstrain == 0 ) | |
| split_bt_mode [ x0 ][ y0 ] | ae(v) |
| else | |
| split_bt_flag[x0][y0] | ae(v) |
| } | |
| if ( splitBtMode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cbtDepth + 1, splitBtMode[ x0 ][ y0 ] ) | |
| coding_binarytree( x0, y1, log2CbWidth, log2CbHeight - 1, cbtDepth + 1, splitBtMode[ x0 ][ y0 ] ) | |
| } else if ( splitBtMode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cbtDepth + 1, splitBtMode[ x0 ][ y0 ] ) | |
| coding_binarytree( x1, y0, log2CbWidth - 1, log2CbHeight, cbtDepth + 1, splitBtMode[ x0 ][ y0 ] ) | |
| } else | |
| coding_unit( x0, y0, log2CbWidth, log2CbHeight) | |
| } | |

FIG. 17

| split_bt_flag | splitConstrain=1 | splitConstrain=2 |
|---|---|---|
| 0 | BT_SPLIT_NONE(=0) | BT_SPLIT_NONE(=0) |
| 1 | BT_SPLIT_HOR(=1) | BT_SPLIT_VER(=2) |

FIG. 18

| | Descriptor |
|---|---|
| coding_binarytree ( x0, y0, log2CbWidth, log2CbHeight, cbtDepth) { | |
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( (((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) { | |
|   if (cbtDepth == 0 ) | |
|     split_bt_mode [ x0 ][ y0 ][cbtDepth] | ae(v) |
|   else | |
|     split_bt_flag[x0][y0] | ae(v) |
| } | |
| if ( splitBtMode[ x0 ][ y0 ][cbtDepth] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cbtDepth + 1 ) | |
|   coding_binarytree( x0, y1, log2CbWidth, log2CbHeight - 1, cbtDepth + 1 ) | |
| } else if ( splitBtMode[ x0 ][ y0 ][cbtDepth] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cbtDepth + 1) | |
|   coding_binarytree( x1, y0, log2CbWidth - 1, log2CbHeight, cbtDepth + 1 ) | |
| } else | |
|   coding_unit( x0, y0, log2CbWidth, log2CbHeight) | |
| } | |

FIG. 19

| split_bt_flag | splitBtMode[x0][y0][cbtDepth-1]=1 | splitBtMode[x0][y0][cbtDepth-1]=2 |
|---|---|---|
| 0 | BT_SPLIT_NONE(=0) | BT_SPLIT_NONE(=0) |
| 1 | BT_SPLIT_HOR(=1) | BT_SPLIT_VER(=2) |

FIG. 20

| coding_binarytree ( x0, y0, log2CbWidth, log2CbHeight, cqtDepth, cbtDepth, splitConstrain ) { | Descriptor |
|---|---|
| maxBTSize = (slice_type == I_Slice) ?<br>( isLuma ? 1<<( log2_max_bt_size_i_slice_luma_minus2 + 2)<br>: 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>: max_bt_depth_i_slice_chroma_minus2 + 2)<br>: max_bt_depth_minus2 + 2 | |
| if ( ((1 << log2CbHeight) > minBTSize || (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) | |
| if ( splitConstrain == 0 ) | |
| split_bt_mode[ x0 ][ y0 ][ cbtDepth ] | ae(v) |
| else | |
| split_bt_flag[x0][y0] | |
| } | |
| if (splitBtMode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1,<br>split_bt_mode[ x0 ][ y0 ][ cbtDepth + 1 ] ) | |
| } else if (splitBtMode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1, 0 ) | |
| coding_binarytree( x1, y0, log2CbWidth - 1, log2CbHeight, cqtDepth, cbtDepth + 1,<br>split_bt_mode[ x0 ][ y0 ][ cbtDepth + 1 ] ) | |
| } else | |
| coding_unit( x0, y0, log2CbWidth, log2CbHeight) | |
| } | |

FIG. 22

| split_bt_flag | splitConstrain=1 | splitConstrain=2 |
|---|---|---|
| 0 | BT_SPLIT_NONE(=0) | BT_SPLIT_NONE(=0) |
| 1 | BT_SPLIT_HOR(=1) | BT_SPLIT_VER(=2) |

FIG. 23

| coding_binarytree ( x0, y0, log2CbWidth, log2CbHeight, cqtDepth, cbtDepth, splitConstrain ) { | Descriptor |
|---|---|
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) | |
| if ( splitConstrain == 0 ) | |
|     split_bt_mode[ x0 ][ y0 ][ cbtDepth ] | ae(v) |
| else | |
|     split_bt_flag[x0][y0] | |
| } | |
| if (splitBtMode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1,<br>split_bt_mode[ x0 ][ y0 ][ cbtDepth - 1 ] != 0 ? 3-split_bt_mode[ x0 ][ y0 ][ cbtDepth + 1 ] : 0 ) | |
| } else if (splitBtMode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1, 0 ) | |
| coding_binarytree( x1, y0, log2CbWidth - 1, log2CbHeight, cqtDepth, cbtDepth + 1,<br>split_bt_mode [ x0 ][ y0 ][ cbtDepth + 1 ] != 0 ? 3-split_bt_mode[ x0 ][ y0 ][ cbtDepth + 1 ] : 0 ) | |
| } else | |
|     coding_unit( x0, y0, log2CbWidth, log2CbHeight) | |
| } | |

FIG. 25

| coding_binarytree ( x0, y0, log2CbWidth, log2CbHeight, cqtDepth, cbtDepth, splitConstrain ) { | Descriptor |
|---|---|
| maxBTSize = (slice_type == I_Slice) ?<br>( isLuma ? 1<<( log2_max_bt_size_i_slice_luma_minus2 + 2)<br>: 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>: max_bt_depth_i_slice_chroma_minus2 + 2)<br>: max_bt_depth_minus2 + 2 | |
| if( ((1 << log2CbHeight) > minBTSize || (1 << log2CbWidth) > minBTSize ) &&<br>(1 << log2CbWidth) <= maxBTSize &&<br>(1 << log2CbHeight) <= maxBTSize &&<br>cbtDepth < maxBTDepth && !splitConstrain) | |
| split_bt_mode[ x0 ][ y0 ][cbtDepth] | ae(v) |
| if (split_bt_mode[ x0 ][ y0 ][cbtDepth] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1,<br>split_bt_mode[ x0 ][ y0 ][ cbtDepth + 1 ] != 0 ? 1: 0 ) | |
| } else if (split_bt_mode[ x0 ][ y0 ][cbtDepth] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1, 0 ) | |
| coding_binarytree( x1, y0, log2CbWidth - 1, log2CbHeight, cqtDepth, cbtDepth + 1,<br>split_bt_mode [ x0 ][ y0 ][ cbtDepth + 1 ] != 0 ? 1: 0 ) | |
| } else | |
| coding_unit( x0, y0, log2CbWidth, log2CbHeight) | |
| } | |

FIG. 27

| | Descriptor |
|---|---|
| coding_binarytree ( x0, y0, log2CbWidth, log2CbHeight, cqtDepth, cbtDepth, splitConstrain ) { | |
| maxBTSize = (slice_type == I_Slice) ?<br>( isLuma ? 1<<( log2_max_bt_size_i_slice_luma_minus2 + 2)<br>   : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>   : max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize )) &&<br>(1 << log2CbWidth) <= maxBTSize &&<br>(1 << log2CbHeight) <= maxBTSize &&<br>cbtDepth < maxBTDepth ) | |
|   if ( splitConstrain == 0 ) | |
|     split_bt_mode[ x0 ][ y0 ][ cbtDepth ] | ae(v) |
|   else | |
|     split_bt_flag[x0][y0] | |
| } | |
| if (splitBtMode[ x0 ][ y0 ][ cbtDepth ] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cqtDepth, cbtDepth + 1, 0 ) | |
|   coding_binarytree( x0, y1, log2CbWidth, log2CbHeight - 1, cqtDepth, cbtDepth + 1,<br>split_bt_mode[ x0 ][ y0 ][ cbtDepth + 1 ] == 1? 1: 0 ) | |
| } else if (splitBtMode[ x0 ][ y0 ][ cbtDepth ] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cqtDepth, cbtDepth + 1, 0 ) | |
|   coding_binarytree( x1, y0, log2CbWidth - 1, log2CbHeight, cqtDepth, cbtDepth + 1,<br>split_bt_mode[ x0 ][ y0 ][ cbtDepth + 1 ] == 2 ? 2: 0 ) | |
| } else | |
|   coding_unit( x0, y0, log2CbWidth, log2CbHeight) | |
| } | |

FIG. 29

| coding_binarytree ( x0, y0, log2CbWidth, log2CbHeight, cqtDepth, cbtDepth, splitConstrain ) { | Descriptor |
|---|---|
| maxBTSize = (slice_type == I_Slice) ? <br> ( isLuma ? 1<<( log2_max_bt_size_i_slice_luma_minus2 + 2) <br>         : 1<<( log2_max_bt_size_i_slice_chroma_minus2 + 2)) <br> : 1<<( log2_max_bt_size_minus2 + 2) | |
| minBTSize = 4 | |
| maxBTDepth = (slice_type == I_Slice) ? <br> ( isLuma ? max_bt_depth_i_slice_luma_minus2 + 2 <br>         : max_bt_depth_i_slice_chroma_minus2 + 2) <br> : max_bt_depth_minus2 + 2 | |
| if ( ((1 << log2CbHeight) > minBTSize || (1 << log2CbWidth) > minBTSize )) && <br> (1 << log2CbWidth) <= maxBTSize && <br> (1 << log2CbHeight) <= maxBTSize && <br> cbtDepth < maxBTDepth ) | |
| if ( splitConstrain == 0 ) | |
|     split_bt_mode[ x0 ][ y0 ][ cbtDepth ] | ae(v) |
| else | |
|     split_bt_flag[x0][y0] | |
| } | |
| if (splitBtMode[ x0 ][ y0 ][ cbtDepth ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1, <br> split_bt_mode[ x0 ][ y0 ][ cbtDepth + 1 ] == 1 ? 2 : 0 ) | |
| } else if (splitBtMode[ x0 ][ y0 ][ cbtDepth ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1, 0 ) | |
| coding_binarytree( x1, y0, log2CbWidth - 1, log2CbHeight, cqtDepth, cbtDepth + 1, <br> split_bt_mode[ x0 ][ y0 ][ cbtDepth + 1 ] == 2 ? 1 : 0 ) | |
| } else | |
| coding_unit( x0, y0, log2CbWidth, log2CbHeight) | |
| } | |

FIG. 31

| coding_binarytree ( x0, y0, log2CbWidth, log2CbHeight, cqtDepth, cbtDepth, splitConstrain ) { | Descriptor |
|---|---|
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize )) &&<br>(1 << log2CbWidth) <= maxBTSize &&<br>(1 << log2CbHeight) <= maxBTSize &&<br>cbtDepth < maxBTDepth ) | |
|   if ( splitConstrain == 0 ) | |
|     split_bt_mode[ x0 ][ y0 ][ cbtDepth ] | ae(v) |
|   else | |
|     split_bt_flag[x0][y0] | |
| } | |
| if (splitBtMode[ x0 ][ y0 ] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cqtDepth, cbtDepth + 1,<br>log2CbWidth >= log2CbHeight + 2 ? 2 : 0 ) | |
|   coding_binarytree( x0, y1, log2CbWidth, log2CbHeight - 1, cqtDepth, cbtDepth + 1,<br>log2CbWidth >= log2CbHeight + 2 ? 2 : 0 ) | |
| } else if (splitBtMode[ x0 ][ y0 ] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cqtDepth, cbtDepth + 1,<br>log2CbHeight >= log2CbWidth + 2 ? 1 : 0 ) | |
|   coding_binarytree( x1, y0, log2CbWidth - 1, log2CbHeight, cqtDepth, cbtDepth + 1,<br>log2CbHeight >= log2CbWidth + 2 ? 1 : 0 ) | |
| } else | |
|   coding_unit( x0, y0, log2CbWidth, log2CbHeight) | |
| } | |

FIG. 32

| | Descriptor |
|---|---|
| coding_binarytree ( x0, y0, log2CbWidth, log2CbHeight, cqtDepth, cbtDepth, splitConstrain ) { | |
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 - 2 | |
| if ( (((1 << log2CbHeight) > minBTSize \|\| (1 << log2CbWidth) > minBTSize )) &&<br>(1 << log2CbWidth) <= maxBTSize &&<br>(1 << log2CbHeight) <= maxBTSize &&<br>cbtDepth < maxBTDepth ) | |
| if ( splitConstrain == 0 ) | |
|   split_bt_mode[ x0 ][ y0 ][ cbtDepth ] | ae(v) |
| else | |
|   split_bt_flag[x0][y0] | |
| } | |
| if (splitBtMode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1,<br>log2CbWidth >= log2CbHeight + 2 && slice_type == I_SLICE ? 2: 0 ) | |
| coding_binarytree( x0, y1, log2CbWidth, log2CbHeight - 1, cqtDepth, cbtDepth + 1,<br>log2CbWidth >= log2CbHeight + 2 && slice_type == I_SLICE ? 2: 0 ) | |
| } else if (splitBtMode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1,<br>log2CbHeight >= log2CbWidth + 2 && slice_type == I_SLICE ? 1 : 0 ) | |
| coding_binarytree( x1, y0, log2CbWidth - 1, log2CbHeight, cqtDepth, cbtDepth + 1,<br>log2CbHeight >= log2CbWidth + 2 && slice_type == I_SLICE ? 1 : 0 ) | |
| } else | |
| coding_unit( x0, y0, log2CbWidth, log2CbHeight) | |
| } | |

FIG. 33

| | Descriptor |
|---|---|
| coding_binarytree ( x0, y0, log2CbWidth, log2CbHeight, cbtDepth ) { | |
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if( ((1 << log2CbHeight) > minBTSize \|\|<br>  (1 << log2CbWidth) > minBTSize ) &&<br>  (1 << log2CbWidth) <= maxBTSize &&<br>  (1 << log2CbHeight) <= maxBTSize &&<br>  cbtDepth < maxBTDepth ) { | |
|   split_bt_flag [ x0 ][ y0 ] | ae(v) |
|   if (cbtDepth <= TH && split_bt_flag [ x0 ][ y0 ] == 1 ) | |
|     split_dir_flag [ x0 ] [ y0 ] [ cbtDepth ] | ae(v) |
| } | |
| if ( splitBtMode[ x0 ][ y0 ] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cbtDepth + 1 ) | |
|   coding_binarytree( x0, y1, log2CbWidth, log2CbHeight - 1, cbtDepth + 1 ) | |
| } else if ( splitBtMode[ x0 ][ y0 ] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cbtDepth + 1 ) | |
|   coding_binarytree( x1, y0, log2CbWidth - 1, log2CbHeight, cbtDepth + 1 ) | |
| } else | |
|   coding_unit( x0, y0, log2CbWidth, log2CbHeight) | |
| } | |

FIG. 34

| | Descriptor |
|---|---|
| coding_binarytree ( x0, y0, log2CbWidth, log2CbHeight, cbtDepth, splitConstrain ) { | |
| maxBTSize = (slice_type == I_Slice) ?<br>( isLuma ? 1<<( log2_max_bt_size_i_slice_luma_minus2 + 2)<br>   : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>   : max_bt_depth_i_slice_chroma_minus2 + 2)<br>: max_bt_depth_minus2 + 2 | |
| if ( ((1 << log2CbHeight) > minBTSize \| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) { | |
| if ( splitConstrain == 0 \|\| cbtDepth <=TH ) | |
|   split_bt_mode [ x0 ][ y0 ] | ae(v) |
| else | |
|   split_bt_flag[x0][y0] | ae(v) |
| } | |
| if ( splitBtMode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cbtDepth + 1, splitBTMode[x0][y0]) | |
| coding_binarytree( x0, y1, log2CbWidth, log2CbHeight - 1, cbtDepth + 1, splitBTMode[x0][y0])) | |
| } else if ( splitBtMode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cbtDepth + 1, splitBTMode[x0][y0])) | |
| coding_binarytree( x1, y0, log2CbWidth - 1, log2CbHeight, cbtDepth + 1, splitBTMode[x0][y0])) | |
| } else | |
| coding_unit( x0, y0, log2CbWidth, log2CbHeight) | |
| } | |

FIG. 35

| coding_binarytree ( x0, y0, log2CbWidth, log2CbHeight, cbtDepth) { | Descriptor |
|---|---|
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) { | |
|   if ( cbtDepth <= TH ) | ae(v) |
|     split_bt_mode [ x0 ][ y0 ] | |
|   else | |
|     split_bt_flag[x0][y0] | |
| } | |
| if ( splitBtMode[ x0 ][ y0 ] [cbtDepth] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cbtDepth + 1 ) | |
|   coding_binarytree( x0, y1, log2CbWidth, log2CbHeight - 1, cbtDepth + 1 ) | |
| } else if ( splitBtMode[ x0 ][ y0 ] [cbtDepth] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cbtDepth + 1 ) | |
|   coding_binarytree( x1, y0, log2CbWidth - 1, log2CbHeight, cbtDepth + 1 ) | |
| } else | |
|   coding_unit( x0, y0, log2CbWidth, log2CbHeight) | |
| } | |

FIG. 36

| | Descriptor |
|---|---|
| coding_binarytree ( x0, y0, log2CbWidth, log2CbHeight, cqtDepth, cbtDepth, splitConstrain ) { | |
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) | |
| if ( splitConstrain == 0 ) | |
|   split_bt_mode[ x0 ][ y0 ][ cbtDepth ] | |
| else | |
|   split_bt_flag[x0][y0] | |
| } | |
| if (splitBtMode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1,<br>cbtDepth > TH ? split_bt_mode[ x0 ][ y0 ][ cbtDepth + 1 ] : 0) | |
| } else if (splitBtMode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1, 0 ) | |
| coding_binarytree( x1, y0, log2CbWidth - 1, log2CbHeight, cqtDepth, cbtDepth + 1,<br>cbtDepth > TH ? split_bt_mode[ x0 ][ y0 ][ cbtDepth + 1 ] : 0) | |
| } else | |
|   coding_unit( x0, y0, log2CbWidth, log2CbHeight) | |
| } | |

FIG. 37

| | Descriptor |
|---|---|
| coding_binarytree ( x0, y0, log2CbWidth, log2CbHeight, cqtDepth, cbtDepth, splitConstrain ) { | |
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( ((1 << log2CbHeight) > minBTSize || (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) | |
|   if ( splitConstrain == 0 ) | |
|     split_bt_mode[ x0 ][ y0 ][ cbtDepth ] | |
|   else | |
|     split_bt_flag[x0][y0] | |
| } | |
| if (splitBtMode[ x0 ][ y0 ] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cqtDepth, cbtDepth + 1, 0 ) | |
|   coding_binarytree( x0, y1, log2CbWidth, log2CbHeight - 1, cqtDepth, cbtDepth + 1,<br>    split_bt_mode[ x0 ][ y0 ][ cbtDepth + 1 ] !=0 && cbtDepth > TH ?<br>                               3-split_bt_mode[ x0 ][ y0 ][ cbtDepth - 1 ] : 0) | |
| } else if (splitBtMode[ x0 ][ y0 ] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cqtDepth, cbtDepth + 1, 0 ) | |
|   coding_binarytree( x1, y0, log2CbWidth - 1, log2CbHeight, cqtDepth, cbtDepth + 1,<br>    split_bt_mode[ x0 ][ y0 ][ cbtDepth + 1 ] !=0 && cbtDepth > TH ?<br>                               3-split_bt_mode[ x0 ][ y0 ][ cbtDepth + 1 ] : 0) | |
| } else | |
|   coding_unit( x0, y0, log2CbWidth, log2CbHeight) | |
| } | |

FIG. 38

| | Descriptor |
|---|---|
| coding_binarytree ( x0, y0, log2CbWidth, log2CbHeight, cqtDepth, cbtDepth, splitConstrain ) { | |
| maxBTSize = (slice_type == I_Slice) ?<br>( isLuma ? 1<<( log2_max_bt_size_i_slice_luma_minus2 + 2)<br>: 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>: max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth && !splitConstrain) | |
| split_bt_mode[ x0 ][ y0 ][ cbtDepth ] | |
| if (split_bt_mode[ x0 ][ y0 ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1,<br>split_bt_mode[ x0 ][ y0 ][ cbtDepth + 1 ] != 0 && cbtDepth > TH  ? 1: 0 ) | |
| } else if (split_bt_mode[ x0 ][ y0 ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1, 0 ) | |
| coding_binarytree( x1, y0, log2CbWidth - 1, log2CbHeight, cqtDepth, cbtDepth + 1,<br>split_bt_mode [ x0 ][ y0 ][ cbtDepth + 1 ] != 0 && cbtDepth > TH  ? 1: 0 ) | |
| } else | |
| coding_unit( x0, y0, log2CbWidth, log2CbHeight) | |
| } | |

FIG. 39

| coding_binarytree ( x0, y0, log2CbWidth, log2CbHeight, cqtDepth, cbtDepth, splitConstrain ) { | Descriptor |
|---|---|
| maxBTSize = (slice_type == I_Slice) ?<br>( isLuma ? 1<<( log2_max_bt_size_i_slice_luma_minus2 + 2)<br>: 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>: max_bt_depth_i_slice_chroma_minus2 + 2)<br>: max_bt_depth_minus2 + 2 | |
| if ( (((1 << log2CbHeight) > minBTSize ) | (1 << log2CbWidth) > minBTSize )) &&<br>(1 << log2CbWidth) <= maxBTSize &&<br>(1 << log2CbHeight) <= maxBTSize &&<br>cbtDepth < maxBTDepth ) | |
| if ( splitConstrain == 0 ) | |
| split_bt_mode[ x0 ][ y0 ][ cbtDepth ] | |
| else | |
| split_bt_flag[x0][y0] | |
| } | |
| if (splitBtMode[ x0 ][ y0 ][ cbtDepth ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1,<br>split_bt_mode[ x0 ][ y0 ][ cbtDepth + 1 ] == 1 && cbtDepth > TH ? 1: 0 ) | |
| } else if (splitBtMode[ x0 ][ y0 ][ cbtDepth ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth - 1, 0 ) | |
| coding_binarytree( x1, y0, log2CbWidth - 1, log2CbHeight, cqtDepth, cbtDepth + 1,<br>split_bt_mode[ x0 ][ y0 ][ cbtDepth + 1 ] == 2 && cbtDepth > TH ? 2: 0 ) | |
| } else | |
| coding_unit( x0, y0, log2CbWidth, log2CbHeight) | |
| } | |

FIG. 40

| coding_binarytree( x0, y0, log2CbWidth, log2CbHeight, cqtDepth, cbtDepth, splitConstrain ) { | Descriptor |
|---|---|
| maxBTSize = (slice_type == I_Slice) ?<br>( isLuma ? 1<<( log2_max_bt_size_i_slice_luma_minus2 + 2)<br>: 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>: max_bt_depth_i_slice_chroma_minus2 + 2)<br>: max_bt_depth_minus2 + 2 | |
| if ( ((1 << log2CbHeight) > minBTSize || (1 << log2CbWidth) > minBTSize )) &&<br>(1 << log2CbWidth) <= maxBTSize &&<br>(1 << log2CbHeight) <= maxBTSize &&<br>cbtDepth < maxBTDepth ) | |
| if ( splitConstrain == 0 ) | |
| split_bt_mode[ x0 ][ y0 ][ cbtDepth ] | |
| else | |
| split_bt_flag[x0][y0] | |
| } | |
| if (splitBtMode[ x0 ][ y0 ][ cbtDepth ] == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1, 0 ) | |
| coding_binarytree( x0, y1, log2CbWidth, log2CbHeight - 1, cqtDepth, cbtDepth + 1,<br>split_bt_mode[ x0 ][ y0 ][ cbtDepth + 1 ] == 1 && cbtDepth > TH ? 2: 0 ) | |
| } else if (splitBtMode[ x0 ][ y0 ][ cbtDepth ] == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1, 0 ) | |
| coding_binarytree( x1, y0, log2CbWidth - 1, log2CbHeight, cqtDepth, cbtDepth + 1,<br>split_bt_mode[ x0 ][ y0 ][ cbtDepth + 1 ] == 2 && cbtDepth > TH ? 1: 0 ) | |
| } else | |
| coding_unit( x0, y0, log2CbWidth, log2CbHeight) | |
| } | |

FIG. 41

| seq_parameter_set_rbsp( ) { | Descriptor |
|---|---|
| . . . | |
|   sps_max_latency_increase_plus1[ i ] | ue(v) |
| } | |
| log2_CTU_size_minus2 | ue(v) |
| log2_minQT_ISliceLuma_minus2 | ue(v) |
| log2_minQT_ISliceChroma_minus2 | ue(v) |
| log2_minQT_PBSlice_minus2 | ue(v) |
| log2_max_bt_size_minus2 | ue(v) |
| log2_max_bt_size_i_slice_luma_minus2 | ue(v) |
| log2_max_bt_size_i_slice_chroma_minus2 | ue(v) |
| for (i=0; i < max_temporal_id; i++) { | |
|   max_bt_depth_minus2[i] | ue(v) |
|   max_bt_depth_i_slice_luma_minus2[i] | ue(v) |
|   max_bt_depth_i_slice_chroma_minus2[i] | ue(v) |
| } | |
| log2_min_luma_transform_block_size_minus2 | ue(v) |
| . . . | |

FIG. 43

| coding_binarytree ( x0, y0, log2CbWidth, log2CbHeight, cqtDepth, cbtDepth ) { | Descriptor |
|---|---|
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( ((1 << log2CbHeight) > minBTSize \|\| (1 << log2CbWidth) > minBTSize ) &&<br>(1 << log2CbWidth) <= maxBTSize &&<br>(1 << log2CbHeight) <= maxBTSize &&<br>cbtDepth < maxBTDepth &&<br>(slice_type != I_Slice \|\| isLuma \|\| (cqtDepth + cbtDepth) < (cqtDepthL[x0][y0] + cbtDepthL[x0][y0])) ) | |
|   split_bt_mode[ x0 ][ y0 ] | ae(v) |
| if ( split_bt_mode[ x0 ][ y0 ] == 1 ) { /*HORIZONTAL DIVISION*/ | |
|   y1 = y0 + (1<< (log2CbHeight - 1)) | |
|   coding_binarytree( x0, y0, log2CbWidth, log2CbHeight - 1, cqtDepth, cbtDepth + 1 ) | |
|   coding_binarytree( x0, y1, log2CbWidth, log2CbHeight - 1, cqtDepth, cbtDepth + 1 ) | |
| } else if ( split_bt_mode[ x0 ][ y0 ] == 2 ) { /*VERTICAL DIVISION*/ | |
|   x1 = x0 + (1<< (log2CbWidth - 1 )) | |
|   coding_binarytree( x0, y0, log2CbWidth - 1, log2CbHeight, cqtDepth, cbtDepth + 1 ) | |
|   coding_binarytree( x1, y0, log2CbWidth - 1, log2CbHeight, cqtDepth, cbtDepth + 1 ) | |
| } else | |
| if (isLuma) { | |
|   cqtDepthL[x0][y0] = cqtDepth | |
|   cbtDepthL[x0][y0] = cbtDepth | |
| } | |
| coding_unit( x0, y0, log2CbWidth, log2CbHeight) | |
| } | |

FIG. 45

| coding_quadtree( x0, y0, log2CbSize, cqtDepth ) { | Descriptor |
|---|---|
| if( x0 + ( 1 << log2CbSize ) <= pic_width_in_luma_samples && y0 + ( 1 << log2CbSize ) <= pic_height_in_luma_samples && log2CbSize > MinCbLog2SizeY && (1<<log2CbSize) >= minQTSize ) | |
|   split_cu_flag[ x0 ][ y0 ] | ae(v) |
| if( cu_qp_delta_enabled_flag && log2CbSize >= Log2MinCuQpDeltaSize ) { | |
|   IsCuQpDeltaCoded = 0 | |
|   CuQpDeltaVal = 0 | |
| } | |
| if( cu_chroma_qp_offset_enabled_flag && log2CbSize >= Log2MinCuChromaQpOffsetSize ) | |
|   IsCuChromaQpOffsetCoded = 0 | |
| if( slice_type != I_Slice | isLuma ) { | |
|   splitCuFlag = split_cu_flag[ x0 ][ y0 ] | |
|   splitCuFlagL[ x0 ][ y0 ] = split_cu_flag[ x0 ][ y0 ] | |
| } else | |
|   splitCuFlag = splitCuFlagL [ X COORDINATE OF THE CORRESPONDING LUMINANCE ][ Y COORDINATE OF THE CORRESPONDING LUMINANCE ] && split_cu_flag[ x0 ][ y0 ] | |
| if( splitCuFlag ) { | |
|   x1 = x0 + ( 1 << ( log2CbSize − 1 ) ) | |
|   y1 = y0 + ( 1 << ( log2CbSize − 1 ) ) | |
|   coding_quadtree( x0, y0, log2CbSize − 1, cqtDepth + 1 ) | |
|   if( x1 < pic_width_in_luma_samples ) | |
|     coding_quadtree( x1, y0, log2CbSize − 1, cqtDepth + 1 ) | |
|   if( y1 < pic_height_in_luma_samples ) | |
|     coding_quadtree( x0, y1, log2CbSize − 1, cqtDepth + 1 ) | |
|   if( x1 < pic_width_in_luma_samples && y1 < pic_height_in_luma_samples ) | |
|     coding_quadtree( x1, y1, log2CbSize − 1, cqtDepth + 1 ) | |
| } else | |
|   coding_binarytree(x0, y0, log2CbSize, log2CbSize, cqtDepth, 0 ) | |
| } | |

FIG. 46

| | Descriptor |
|---|---|
| coding_binarytree ( x0, y0, log2CbWidth, log2CbHeight, cqtDepth, cbtDepth ) { | |
| maxBTSize = (slice_type == I_Slice) ?<br>( isLuma ? 1<<( log2_max_bt_size_i_slice_luma_minus2 + 2)<br>    : 1<<( log2_max_bt_size_i_slice_chroma_minus2 + 2))<br>: 1<<( log2_max_bt_size_minus2 + 2) | |
| minBTSize = 4 | |
| maxBTDepth = (slice_type == I_Slice) ?<br>( isLuma ? max_bt_depth_i_slice_luma_minus2 + 2<br>    : max_bt_depth_i_slice_chroma_minus2 + 2)<br>: max_bt_depth_minus2 + 2 | |
| if ( ((1 << log2CbHeight) > minBTSize || (1 << log2CbWidth) > minBTSize ) &&<br>(1 << log2CbWidth) <= maxBTSize &&<br>(1 << log2CbHeight) <= maxBTSize &&<br>cbtDepth < maxBTDepth ) | |
| if ( isLuma ) { | |
| split_bt_mode[ x0 ][ y0 ] | ae(v) |
| splitBtMode = split_bt_mode[ x0 ][ y0 ] | |
| } else { | |
| split_bt_flag[ x0 ][ y0 ] | ae(v) |
| splitBtMode = split_bt_flag[ x0 ][ y0 ] ?<br>            split_bt_mode[X COORDINATE OF THE CORRESPONDING LUMINANCE ][ Y COORDINATE OF THE CORRESPONDING LUMINANCE ] : 0 | |
| } | |
| if (splitBtMode == 1 ) { /*HORIZONTAL DIVISION*/ | |
| y1 = y0 + (1<< (log2CbHeight - 1)) | |
| coding_binarytree( x0, y0, log2CbWidth, log2CbHeight - 1, cqtDepth, cbtDepth + 1 ) | |
| coding_binarytree( x0, y1, log2CbWidth, log2CbHeight - 1, cqtDepth, cbtDepth + 1 ) | |
| } else if (splitBtMode == 2 ) { /*VERTICAL DIVISION*/ | |
| x1 = x0 + (1<< (log2CbWidth - 1 )) | |
| coding_binarytree( x0, y0, log2CbWidth - 1, log2CbHeight, cqtDepth, cbtDepth + 1 ) | |
| coding_binarytree( x1, y0, log2CbWidth - 1, log2CbHeight, cqtDepth, cbtDepth + 1 ) | |
| } else | |
| coding_unit( x0, y0, log2CbWidth, log2CbHeight) | |
| } | |

FIG. 47

| coding_quadtree( x0, y0, log2CbSize, cqtDepth ) { | Descriptor |
|---|---|
| if( x0 + ( 1 << log2CbSize ) <= pic_width_in_luma_samples && y0 + ( 1 << log2CbSize ) <= pic_height_in_luma_samples && log2CbSize > MinCbLog2SizeY && (1<<log2CbSize) >= minQTSize && isLuma ) | |
| split_cu_flag[ x0 ][ y0 ] | ae(v) |
| if( cu_qp_delta_enabled_flag && log2CbSize >= Log2MinCuQpDeltaSize ) { | |
| IsCuQpDeltaCoded = 0 | |
| CuQpDeltaVal = 0 | |
| } | |
| if( cu_chroma_qp_offset_enabled_flag && log2CbSize >= Log2MinCuChromaQpOffsetSize ) | |
| IsCuChromaQpOffsetCoded = 0 | |
| if(slice_type != I_Slice \|\| isLuma) | |
| splitCuFlag = split_cu_flag[ x0 ][ y0 ] | |
| else | |
| splitCuFlag = split_cu_flag[ X COORDINATE OF THE CORRESPONDING LUMINANCE ][ Y COORDINATE OF THE CORRESPONDING LUMINANCE ] | |
| if( splitCuFlag ) { | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
| coding_quadtree( x1, y0, log2CbSize − 1, cqtDepth + 1 ) | |
| if( y1 < pic_height_in_luma_samples ) | |
| coding_quadtree( x0, y1, log2CbSize − 1, cqtDepth + 1 ) | |
| if( x1 < pic_width_in_luma_samples && y1 < pic_height_in_luma_samples ) | |
| coding_quadtree( x1, y1, log2CbSize − 1, cqtDepth + 1 ) | |
| } else | |
| coding_binarytree(x0, y0, log2CbSize, log2CbSize, cqtDepth, 0 ) | |
| } | |

FIG. 48

IMAGE DECODING APPARATUS AND IMAGE CODING APPARATUS

TECHNICAL FIELD

The disclosure is related to a prediction image generation device, an image decoding apparatus, and an image coding apparatus.

BACKGROUND ART

For efficiently transmitting or recording a video, an image coding apparatus that generates coding data by coding the video and an image decoding apparatus that generates a decoded image by decoding the coding data are used.

Specific examples of video coding method include methods proposed in H. 264/AVC, High Efficiency Video Coding (HEVC) and the like.

In such a video coding method, an image (picture) constituting a video is managed by a hierarchical structure including a slice obtained by dividing the image, a Coding Unit (CU) obtained by dividing the slice, a Prediction Unit (PU) and a Transform Unit (TU), which are blocks obtained by diving the coding unit, and a Transform Unit (TU), and coding/decoding is performed for each CU.

Further, in such a video coding system, generally, a prediction image is generated based on a locally decoded image obtained by coding/decoding an input image, and a prediction residual (also referred to as "difference image" or "residual image") obtained by subtracting the prediction image from the input image (original image) is coded. Examples of method for generating the prediction image include inter-picture prediction (inter prediction) and intra-picture prediction (intra prediction).

In addition, techniques of video coding and decoding in recent years include Non Patent Literature 1.

Furthermore, in recent years, as a division method from a Coding Tree Unit (CTU) constituting a slice to a Coding Unit (CU), in addition to QT division for quad tree division, BT division for binary tree division has been introduced. The BT division includes horizontal division and vertical division.

CITATION LIST

Non Patent Literature

Non Patent Literature 1: "Algorithm Specification of Joint Exploration Test Model 2", JVET-B 1002, Joint Video Exploration Team (JVET) of ITU-T SG 16 WP 3 and ISO/IEC JTC 1/SC 29/WG 11, 20-26 Feb. 2016

SUMMARY

Technical Problem

Since the BT division in addition to the QT division as a division method of the CTU, the division pattern to the CU increases, and coding/decoding becomes complicated.

Therefore, the disclosure has been made in view of the above-described problems, and an object of the disclosure is to provide an image decoding apparatus and an image coding apparatus capable of reducing the complexity of coding/decoding of a video.

Solution to Problem

In order to solve the above-described problems, an image decoding apparatus according to an aspect of the disclosure configured to decode a picture for each tree unit, includes a division information decoding unit configured to decode division information indicating a division method for binary tree division with respect to a coding node of the coding tree unit, and a dividing unit configured to perform the binary tree division with respect to the coding node by referring to the division information of another coded coding node.

To solve the above-described problems, an image coding apparatus according to an aspect of the disclosure configured to divide a picture into coding tree units to code the picture, includes a division information coding unit configured to code division information indicating a division method for binary tree division with respect to a coding node of the coding tree unit, and a dividing unit configured to perform binary tree division with respect to the coding node by referring to the division information of another coded coding node.

Advantageous Effects of Invention

According to an aspect of the disclosure, the complexity of coding/decoding of a video can be reduced.

BRIEF DESCRIPTION OF DRAWINGS

FIGS. 2A to 2F are diagrams illustrating a hierarchical structure of data of a coded stream according to an embodiment of the disclosure.

FIGS. 3A to 3H illustrate partition shapes in a case where the PU division mode are 2N×2N, 2N×N, 2N×nU, 2N×nD, N×2N, nL×2N, nR×2N, and N×N, respectively.

FIG. 8A illustrates the transmission apparatus provided with the image coding apparatus, and FIG. 8B illustrates the reception apparatus provided with the image decoding apparatus.

FIG. 9A illustrates the recording apparatus provided with the image coding apparatus, and FIG. 9B illustrates the playback apparatus provided with the image decoding apparatus.

FIG. 12 is a configuration diagram of a syntax table of QT information according to an embodiment of the disclosure.

FIG. 13 is a configuration diagram of a syntax table of BT information according to an embodiment of the disclosure.

FIG. 15 is a configuration diagram of a syntax table of BT information according to an embodiment of the disclosure.

FIG. 16 is a diagram illustrating a derivation table of a BT split mode.

FIG. 17 is a configuration diagram of a syntax table of BT information according to an embodiment of the disclosure.

FIG. 18 is a diagram illustrating a derivation table of a BT split mode.

FIG. 19 is a configuration diagram of a syntax table of BT information according to an embodiment of the disclosure.

FIG. 20 is a diagram illustrating a derivation table of a BT split mode.

FIG. 22 is a configuration diagram of a syntax table of BT information according to an embodiment of the disclosure.

FIG. 23 is a diagram illustrating a derivation table of a BT split mode.

FIG. 25 is a configuration diagram of a syntax table of BT information according to an embodiment of the disclosure.

FIG. 27 is a configuration diagram of a syntax table of BT information according to an embodiment of the disclosure.

FIG. 29 is a configuration diagram of a syntax table of BT information according to an embodiment of the disclosure.

FIG. 31 is a configuration diagram of a syntax table of BT information according to an embodiment of the disclosure.

FIG. 32 is a configuration diagram of a syntax table of BT information according to an embodiment of the disclosure.

FIG. 33 is a configuration diagram of a syntax table of BT information according to an embodiment of the disclosure.

FIG. 34 is a configuration diagram of a syntax table of BT information according to an embodiment of the disclosure.

FIG. 35 is a configuration diagram of a syntax table of BT information according to an embodiment of the disclosure.

FIG. 36 is a configuration diagram of a syntax table of BT information according to an embodiment of the disclosure.

FIG. 37 is a configuration diagram of a syntax table of BT information according to an embodiment of the disclosure.

FIG. 38 is a configuration diagram of a syntax table of BT information according to an embodiment of the disclosure.

FIG. 39 is a configuration diagram of a syntax table of BT information according to an embodiment of the disclosure.

FIG. 40 is a configuration diagram of a syntax table of BT information according to an embodiment of the disclosure.

FIG. 41 is a configuration diagram of a syntax table of BT information according to an embodiment of the disclosure.

FIG. 43 is a syntax structure diagram for SPS.

FIG. 45 is a configuration diagram of a syntax table of BT information according to an embodiment of the disclosure.

FIG. 46 is a configuration diagram of a syntax table of QT information according to an embodiment of the disclosure.

FIG. 47 is a configuration diagram of a syntax table of BT information according to an embodiment of the disclosure.

FIG. 48 is a configuration diagram of a syntax table of QT information according to an embodiment of the disclosure.

DESCRIPTION OF EMBODIMENTS

First Embodiment

Figure 1:
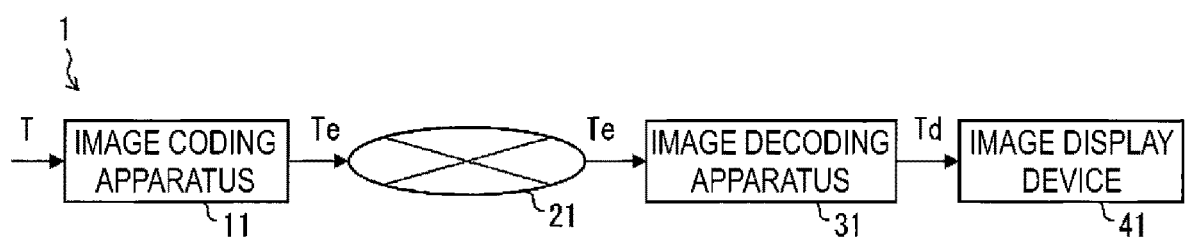
FIG. 1 is a schematic diagram illustrating a configuration of an image transmission system according to an embodiment of the disclosure.

Hereinafter, embodiments of the disclosure are described in detail by referring to the drawings.

FIG. 1 is a schematic diagram illustrating a configuration of an image transmission system 1 according to the present embodiment.

The image transmission system 1 is a system configured to transmit a code obtained by coding a target image, and to decode the transmitted code to display an image. The image transmission system 1 is configured to include an image coding apparatus 11, a network 21, an image decoding apparatus 31, and an image display apparatus 41.

An image T indicating an image of a single layer or a plurality of layers is input to the image coding apparatus 11. A layer is a concept used to distinguish a plurality of pictures in a case where a certain time is constituted with one or more pictures. For example, if a common picture is coded by the plurality of layers having different image qualities and resolutions, scalable coding is performed, and if pictures of different viewpoints are coded by the plurality of layers, view scalable coding is performed. In a case where prediction is performed between pictures of the plurality of layers (inter-layer prediction, inter-view prediction), the coding efficiency is greatly improved. Further, in a case where the prediction is not performed (simulcast), the coding data can be summarized.

The network 21 transmits the coded stream Te generated by the image coding apparatus 11 to the image decoding apparatus 31. The network 21 may be, for example, the Internet, a Wide Area Network (WAN), a Local Area Network (LAN), or a combination of them. The network 21 is not necessarily limited to a bidirectional communication network, but may be a unidirectional communication network that transmits broadcast waves such as terrestrial digital broadcasting, satellite broadcasting and the like. In addition, the network 21 may be replaced by a storage medium in which a coded stream Te such as a DVD (Digital Versatile Disc), a BD (Blue-ray Disc), or the like is recorded.

The image decoding apparatus 31 decodes each of the coded streams Te transmitted by the network 21, and generates one or a plurality of decoded images Td decoded respectively.

The image display device 41 displays all or part of one or a plurality of decoded images Td generated by the image decoding apparatus 31. The image display device 41 includes, for example, a display device such as a liquid crystal display or an organic electro-luminescence (EL) display. In addition, in a spatial scalable coding and an SNR scalable coding, an enhancement layer image with high image quality are displayed in a case where the image decoding apparatus 31 and the image display apparatus 41 have high processing capability, and a base layer image not requiring a higher processing capability and display capability as the enhancement layer is displayed in a case where the image decoding apparatus 31 and the image display apparatus 41 only have lower processing capability.

Operator

The operators used herein are described below.

$>>$ is a right bit shift, $<<$ is a left bit shift, & is a bitwise AND, | is a bitwise OR, |=is a sum operation (OR) with another condition.

x?y: z is a triplet operator that takes y in a case where x is true (other than 0) and takes z in the case where x is false (0).

Clip 3 (a: b: c) is a function for clipping c to a value not less than a and not greater than b, returning a when c<a, returning b when c>b, and returning c in other cases (however, a<=b).

Structure of Coded Stream Te

Prior to the detailed description of the image coding apparatus 11 and the image decoding apparatus 31 according to the present embodiment, the data structure of the coded stream Te generated by the image coding apparatus 11 and decoded by the image decoding apparatus 31 will be described.

FIGS. 2A to 2F are diagrams illustrating a hierarchical structure of data of the coded stream Te. The coded stream Te illustratively includes a sequence and a plurality of pictures constituting the sequence. FIGS. 2A to 2F are diagrams respectively illustrating a coding video sequence defining a sequence SEQ, a coding picture defining a picture PICT, a coding slice defining a slice S, coding slice data defining slice data, a coding tree unit included in the coding slice data, and a Coding Unit (CU) included in the coding tree unit.

Coding Video Sequence

In the coding video sequence, a set of data to be referred to by the image decoding apparatus 31 in order to decode the sequence SEQ as a processing target is defined. As illustrated in FIG. 2A, the sequence SEQ includes a Video Parameter Set (VPS), a Sequence Parameter Set (SPS), a Picture Parameter Set (PPS), a picture PICT, and Supplemental Enhancement Information (SEI). Here, the value after # indicates the layer ID. FIGS. 2A to 2F illustrate an example in which the coding data #0 and #1, that is, Layer 0 and Layer 1 are present, but the type of layers and the number of layers are not limited to this.

In the video parameter set VPS, a set of coding parameters common to a plurality of videos, a plurality of layers included in the video, and a set of the coding parameters related to each of the layers are defined in a video constituted with a plurality of layers.

In the sequence parameter set SPS, a set of coding parameters referred to by the image decoding apparatus 31 to decode the target sequence is defined. For example, a width and a height of a picture are defined. There may be a plurality of the SPSs. In this case, one of the plurality of the SPSs is selected from the PPS.

In the picture parameter set PPS, a set of coding parameters referred to by the image decoding apparatus 31 to decode each picture in the target sequence is defined. For example, a reference value (pic_init_qp_minus 26) of a quantization step size used for decoding the picture, or a flag (weighted_pred_flag) indicating application of weighted prediction is included. Note that, there may be a plurality of the PPSs. In this case, one of the plurality of the PPSs is selected from each picture in the target sequence.

Coded Picture

In the coded picture, a set of data referred to by the image decoding apparatus 31 is defined to decode the picture PICT to be processed. As illustrated in FIG. 2B, the picture PICT includes slices $S_0$ to $S_{NS-1}$ (NS is the total number of the slices included in the picture PICT).

Note that, in the following description, in a case where there is no need to distinguish each of the slices $S_0$ to $S_{NS-1}$, the suffix of the numerals may be omitted. In addition, the data included in the coded stream Te to be described below is the same for other data with suffix.

Coding Slice

In the coding slice, a set of data to be referred to by the image decoding apparatus 31 is defined to decode the slice S to be processed. As illustrated in FIG. 2C, the slice S includes a slice header SH and slice data SDATA.

The slice header SH includes a coding parameter group referred to by the image decoding apparatus 31 in order to determine the decoding method of a target slice. The slice-type designation information (slice_type) for designating the slice-type is an example of a coding parameter included in the slice header SH.

Examples of the slice-type that can be designated by the slice-type designation information include (1) I slice using only intra prediction at the time of coding, (2) P slice using unidirectional prediction or intra prediction at the time of coding, and (3) B slice using unidirectional prediction, bidirectional prediction, or intra prediction at the time of coding, and the like.

Note that the slice header SH may include a reference (pic_parameter_set_id) to the picture parameter set PPS included in the coding video sequence.

Coding Slice Data

In coding slice data, a set of data to be referred to by the image decoding apparatus 31 is defined to decode the slice data SDATA to be processed. As illustrated in FIG. 2D, the slice data SDATA includes a Coding Tree Unit (CTU). The CTU is a block has a fixed size (for example, 64×64) constituting a slice, and may be referred to as Largest Coding Unit (LCU).

Coding Tree Unit

As illustrated in FIG. 2E, a set of data to be referred to by the image decoding apparatus 31 is defined to decode the coding tree unit to be processed. The coding tree unit is divided into the coding units (CU), which is a basic unit of coding processing for recursive Quad Tree division (QT division) or Binary Tree division (BT division). A tree structure obtained by the recursive quad tree division or binary tree division is referred to as a Coding Tree (CT), and a node of the tree structure is referred to as a Coding Node (CN). The intermediate node between the quad tree and the binary tree is the coding node, and the coding tree unit itself is also defined as the highest layer coding node.

The CTU includes a QT split flag (cu_split_flag) indicating whether to perform the QT division, and a BT split mode (split_bt_mode) indicating a division method for the BT division. cu_split_flag and/or split_bt mode are transmitted for each coding node CN. In a case where cu_split_flag is 1, the coding node CN is divided into four coding nodes CN. In a case where cu_split_flag is 0, the coding node CN is not divided. On the other hand, in a case where split_bt_mode is 1, the coding node CN is horizontally divided into two coding nodes CNs. In a case where split_bt_mode is 2, the coding node CN is vertically divided into two coding nodes CNs. In a case where split_bt_mode is 0, the coding node CN is not divided, and one coding unit CU is held as a node. The coding unit CU is a terminal node (leaf node) of the coding node and is not further divided.

Note that, in this specification, with respect to division, the terms "horizontal" and "vertical" refer to the directions of the dividing line. Therefore, "horizontal division", "division in HOrizontal Direction (HOR)" and "horizontally dividing" mean division by a horizontal boundary line, that is, division into two or more blocks on the upper and lower directions. In addition, "vertical division"," division in VErtical Direction (VER) "and" vertically dividing "mean division by vertical boundary lines, that is, dividing into two or more blocks on the left and right.

Note that, although not illustrated in the present specification, another terminology also exists. That is, the horizontal division in the present specification may be referred to as split vertically since one block is divided into two or more blocks arranged in the vertical direction. In addition, the vertical division in the present specification may be referred to as split horizontally since one block is divided into two or more blocks arranged in the horizontal direction. In the above-described another terminology, it should be noted that, the description of vertical split may mean horizontal division in the present specification (or vice versa). In this case, the meaning of the term should be replaced as appropriate.

Further, in a case where the size of the coding tree unit CTU is 64×64 pixels, the size of the coding unit may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 2F, a set of data to be referred to by the image decoding apparatus 31 is defined to decode the coding unit to be processed. Specifically, the coding unit includes a prediction tree, a transform tree, and a CU Header CUH. A prediction mode, a division method (PU division mode), and the like are defined in the CU header.

In the prediction tree, prediction information (reference picture index, motion vector, and the like) of each Prediction Unit (PU) obtained by dividing the coding unit into one or a plurality of units is defined. In other words, the prediction unit refers to one or more non-overlapping regions constituting the coding unit. The prediction tree also includes one or more prediction units obtained by the above-described division. Hereinafter, note that the prediction unit obtained by further dividing the prediction unit is referred to as "sub-block". The sub-block is constituted with a plurality of pixels. If the sizes of the prediction unit and the sub-block are equal, the number of the sub-block in the prediction unit is one. If the size of the prediction unit and the sub-block are equal, the number of the sub-block in the prediction unit is one. If the size of the prediction unit is greater than the size of the sub-block, the prediction unit is divided into sub-blocks. For example, in a case where the prediction unit is 8×8 and the sub-block is 4×4, the prediction unit is divided into 4 sub-blocks, which are horizontally divided into two and vertically divided into two.

The prediction process may be performed for each prediction unit (sub-block).

Generally, there are two types of division in the prediction tree, in the case of intra prediction and inter prediction. Intra prediction is prediction in the same picture, and in the case of inter prediction refers to prediction processing performed between different pictures (for example, between display times, between layer images).

In the case of intra prediction, the division method includes 2N×2N (the same size as the coding unit) and N×N.

In the case of inter prediction, the division method is coded according to the PU division mode (part_mode) of the coding data and includes 2N×2N (the same size as the coding unit), 2N×N, 2N×nU, 2N×nD, N×2N, nL×2N, nR×2N, N×N and the like. Note that 2N×N and N×2N indicate 1:1 symmetric division, 2N×nU, 2N×nD and nL×2N, nR×2N indicate asymmetric division of 1:3, 3:1. The PUs included in the CU are sequentially represented as PU0, PU1, PU2, and PU3.

Figures 3A, 3B, 3C, 3D:
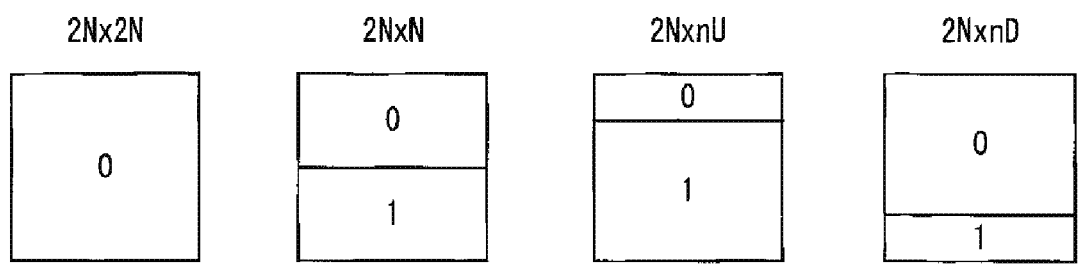
FIGS. 3A to 3H are diagrams, each illustrating a pattern in a PU division mode.
Figures 3E, 3F, 3G, 3H:
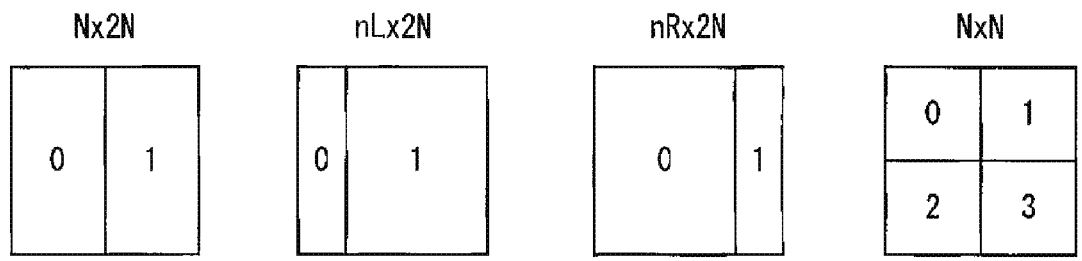

FIGS. 3A to 3H illustrate the shape of the partition (the position of the boundary of the PU division) in each PU division mode specifically. FIG. 3A illustrates a partition of 2N×2N, FIGS. 3B, 3C and 3D respectively illustrate partitions (horizontally long partitions) in the case of 2N×N, 2N×nU and 2N×nD, respectively. FIGS. 3E, 3F and 3G respectively illustrate the partitions (vertically long partitions) in the case of N×2N, nL×2N, nR×2N, and FIG. 3H illustrates the partition of N×N. Note that the horizontally long partitions and the vertically long partitions are generically referred to as rectangular partitions, 2N×2N, N×N are generically referred to as square partitions.

Further, in the transform tree, the coding unit is divided into one or a plurality of transform units, and the position and the size of each transform unit are defined. In other words, the transform unit refers to one or more non-overlapping regions constituting the coding unit. In addition, the transform tree includes one or a plurality of transform units obtained from the above-described division.

As the division in the transform tree, a method in which an area having the same size as the coding unit is allocated as a transform unit and a method due to a recursive quad tree division similar to the division of the CU described above are included.

The transform processing is performed for each transform unit.

Prediction Parameter

The prediction image of the Prediction Unit (PU) is derived by prediction parameters associated with the PU. The prediction parameters include prediction parameters for intra prediction or prediction parameters for inter prediction. Hereinafter, the prediction parameters (inter prediction parameters) for inter prediction will be described. The inter prediction parameters include prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags respectively indicating whether a reference picture list called an L0 list and an L1 list is used, and a reference picture list corresponding to a value of 1 is used. Note that, in the present specification, in a case where "a flag indicating whether XX or not" is described, or a case where a flag other than 0 (for example, 1) is XX, or a case where 0 is not XX, and in logical negation or logical product, and the like, 1 is treated as true and 0 is treated as false (the same applies below). However, other values may be used as the true value or the false value in an actual device or method.

The syntax elements for deriving the inter prediction parameters included in the coding data include, for example, a PU division mode part_mode, a merge flag merge_flag, a merge index merge_idx, an inter prediction identifier inter_pred_idc, a reference picture index refIdxLX, a prediction vector index mvp_LX_idx, and a difference vector mvdLX.

Reference Picture List

The reference picture list is a list includes reference pictures stored in the reference picture memory 306. FIGS.

Figure 4A:
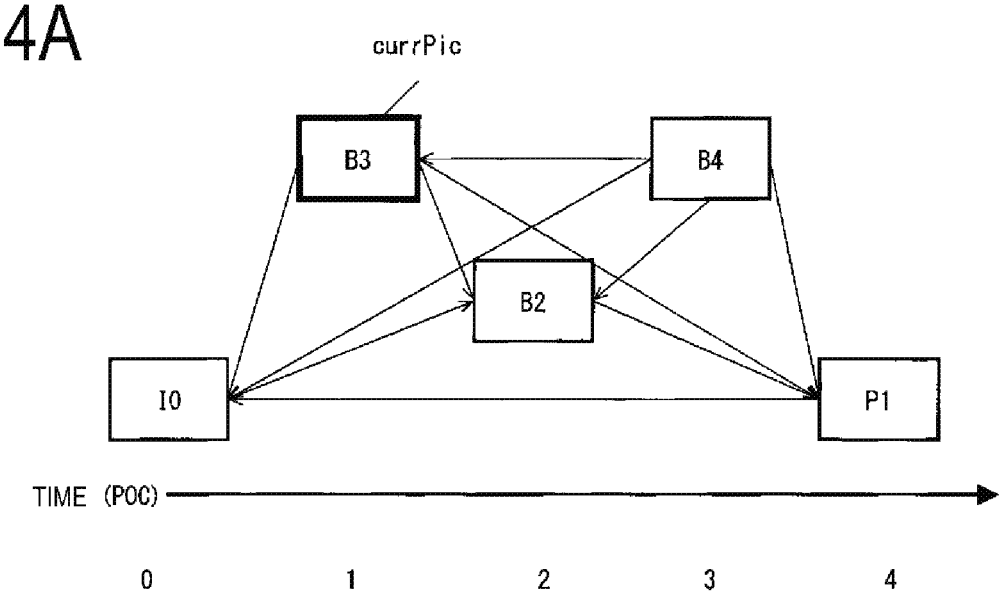
FIGS. 4A and 4B are conceptual diagrams illustrating an example of reference pictures and reference picture lists.
Figure 4B:
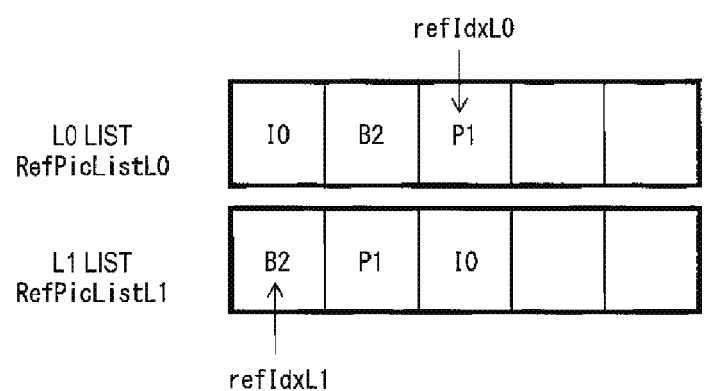

4A and 4B are conceptual diagrams illustrating an example of the reference pictures and the reference picture lists. In FIG. 4A, the rectangle indicates the picture, the arrow indicates the reference relation of the picture, the horizontal axis indicates time, I, P and B in the rectangle respectively indicate intra picture, uni-prediction picture and bi-prediction picture, and numbers in the rectangle indicate a decoding order. As illustrated in the figure, the decoding order of the pictures is I0, P1, B2, B3, B4, and the display order is I0, B3, B2, B4, P1. FIG. 4B illustrates an example of the reference picture list. The reference picture list is a list representing candidates of the reference pictures, and one picture (slice) may have one or more reference picture lists. In the example illustrated in the figure, the target picture B3 has two reference picture lists, an L0 list RefPicList0 and an L1 list RefPicList1. In a case where the target picture is B3, the reference pictures are I0, P1 and B2, and reference pictures include these pictures as elements. In each prediction unit, which picture in the reference picture list RefPicListX is actually to be referenced is designated by the reference picture index refIdxLX. In the figure, an example is illustrated that reference pictures P1 and B2 are referred to by refIdxL0 and refIdxL1.

Merge Prediction and AMVP Prediction

The decoding (coding) method of the prediction parameter includes a merge prediction mode and an Adaptive Motion Vector Prediction (AMVP) mode, and a merge flag merge_flag is a flag for identifying them. The merge prediction mode is a mode to be used for deriving from the prediction parameters of a processed neighboring PU without including the prediction list utilization flag predFlagLX (or the inter prediction identifier inter_pred_idc), the reference picture index refIdxLX, and the motion vector mvLX in the coding data, the AMVP mode is a mode in which the inter prediction identifier inter_pred_idc, the reference picture index refIdxLX, and the motion vector mvLX are included in the coding data. Note that, the motion vector mvLX is coded as a prediction vector index mvp_LX_idx that identifies the prediction vector mvpLX and a difference vector mvdLX.

The inter prediction identifier inter_pred_idc is a value indicating the type and the number of reference pictures, and takes a value of any of PRED_L0, pred_L1, and PRED_BI. PRED_L0 and PRED_L1 indicate that the reference pictures managed in the reference picture lists of the L0 list and the L1 list are used respectively, and indicate that one reference picture is used (Uni-Prediction). PRED_BI indicates that two reference pictures are used (Bi-Prediction BiPred), and the reference pictures managed by the L0 list and the L1 list are used. The prediction vector index mvp_LX_idx is an index indicating a prediction vector, and the reference picture index refIdxLX is an index indicating the reference picture managed in the reference picture list. Note that LX is a description method used in a case where L0 prediction and L1 prediction are not distinguished, and by replacing LX with L0 and L1, the parameters for the L0 list and the parameters for the L1 list are distinguished.

The merge index merge_idx is an index indicating whether one of the prediction parameter in the prediction parameter candidates (merge candidates) derived from the PU whose processing has been completed is used as the prediction parameter of the decoding target PU.

Motion Vector

The motion vector mvLX indicates an amount of deviation between blocks on two different pictures. The prediction vector and the difference vector relating to the motion vector mvLX are referred to as the prediction vector mvpLX and the difference vector mvdLX, respectively.

Inter Prediction Identifier inter_pred_idc and Prediction List Utilization Flag predFlagLX The relationship between the inter prediction identifier inter_pred_idc and the prediction list utilization flag predFlagL0, predFlagL1 is as follows and can be mutually converted.

inter_pred_idc=(predFlagL1<<1)+predFlagL0 predFlagL0=inter_pred_idc & 1 predFlagL1=inter_pred_idc>>1

Note that, as the inter prediction parameter, a prediction list utilization flag may be used, or an inter prediction identifier may be used. In addition, the determination using the prediction list utilization flag may be replaced with the determination using the inter prediction identifier. Conversely, the determination using the inter prediction identifier may be replaced with the determination using the prediction list utilization flag.

Bi-Prediction biPred Determination

A flag biPred for determining the Bi-Prediction BiPred can be derived according to whether two prediction list utilization flags are both 1. For example, it can be derived by the following equation.

$$biPred=(predFlagL0==1 \; \&\& \; predFlagL1==1)$$

The flag biPred can also be derived according to whether the inter prediction identifier is a value indicating that two prediction lists (reference pictures) are used. For example, it can be derived by the following equation.

$$biPred=(inter\_pred\_idc==PRED\_BI)?1:0$$

The above equation can also be expressed by the following equation.

$$biPred=(inter\_pred\_idc==PRED\_BI)$$

Note that, PRED_BI may use, for example, three values.

Configuration of Image Decoding Apparatus

Figure 5:
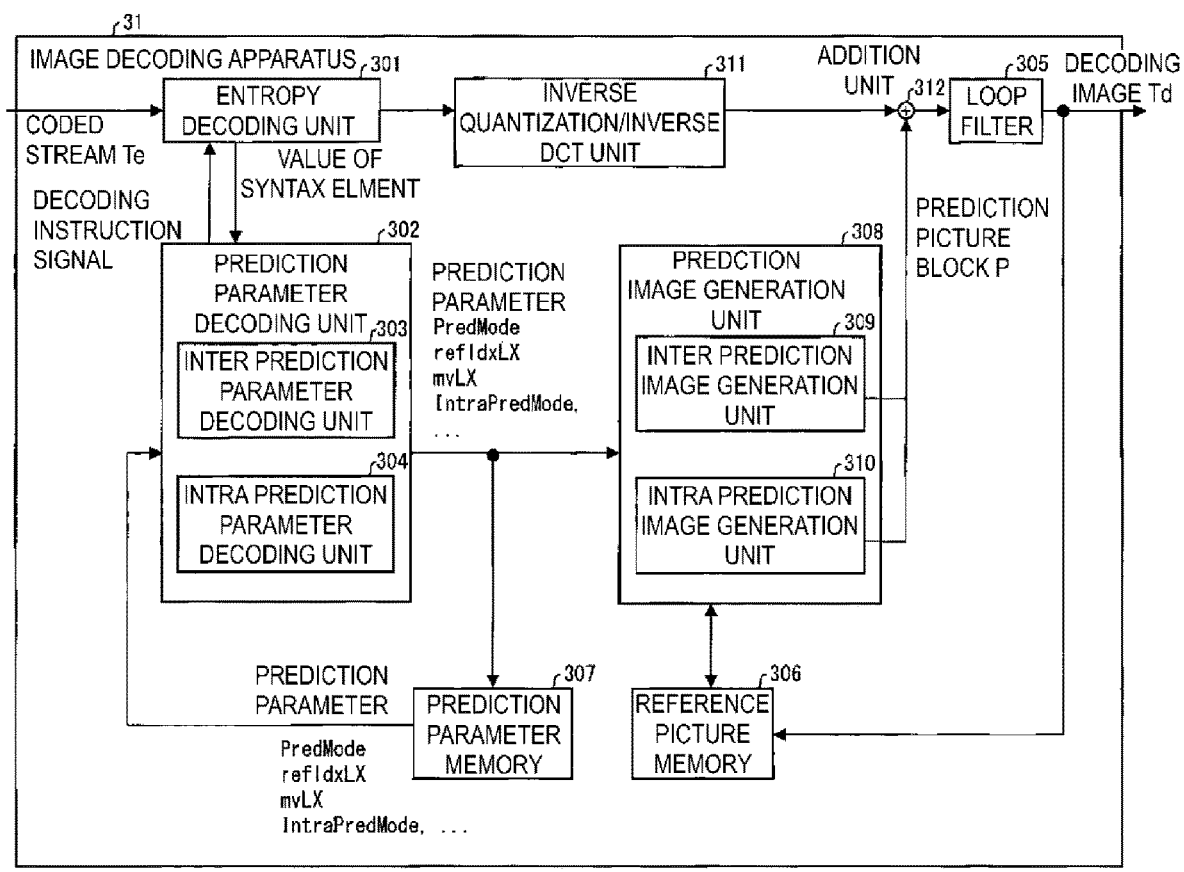
FIG. 5 is a block diagram illustrating a configuration of an image coding apparatus according to an embodiment of the disclosure.

Next, a configuration of the image decoding apparatus 31 according to the present embodiment will be described. FIG. 5 is a schematic diagram illustrating a configuration of the image decoding apparatus 31 according to the present embodiment. The image decoding apparatus 31 is configured to include an entropy decoding unit 301, a prediction parameter decoding unit (prediction image decoding device) 302, a loop filter 305, a reference picture memory 306, a prediction parameter memory 307, a prediction image generation unit (prediction image generation device) 308, an inverse quantization/inverse DCT unit 311, and an addition unit 312.

In addition, the prediction parameter decoding unit 302 is configured to include an inter prediction parameter decoding unit 303 and an intra prediction parameter decoding unit 304. The predicted image generation unit 308 is configured to include an inter prediction image generation unit 309 and an intra prediction image generation unit 310.

The entropy decoding unit 301 performs entropy decoding of the coded stream Te input from the outside to separate and decode individual codes (syntax elements). The separated code includes prediction information for generating a prediction image and residual information for generating a difference image.

The entropy decoding unit 301 outputs a part of the separated code to the prediction parameter decoding unit 302. A part of the separated codes are, for example, a prediction mode predMode, a PU division mode part_mode, a merge flag merge_flag, a merge index merge_idx, an inter prediction identifier inter_pred_idc, a reference picture index refIdxLX, a prediction vector index mvp_LX_idx, and a difference vector mvdLX. Control of which code to decode is performed based on an instruction of the prediction parameter decoding unit 302. The entropy decoding unit 301 outputs a quantization coefficient to the inverse quantization/inverse DCT unit 311. The quantization coefficient is a coefficient obtained by performing Discrete Cosine Transform (DCT) and quantization with respect to the residual signal in the coding processing.

The inter prediction parameter decoding unit 303 decodes the inter prediction parameter by referring to the prediction parameter stored in the prediction parameter memory 307 based on the code input from the entropy decoding unit 301.

The inter prediction parameter decoding unit 303 outputs the decoded inter prediction parameter to the prediction image generation unit 308, and stores it in the prediction parameter memory 307. The inter prediction parameter decoding unit 303 will be described in detail later.

The intra prediction parameter decoding unit 304 decodes the intra prediction parameter by referring to the prediction parameter stored in the prediction parameter memory 307 based on the code input from the entropy decoding unit 301. The intra prediction parameter is a parameter used in a process of predicting a CU within one picture, for example, an intra prediction mode IntraPredMode. The intra prediction parameter decoding unit 304 outputs the decoded intra prediction parameter to the prediction image generation unit 308, and stores it in the prediction parameter memory 307.

The intra prediction parameter decoding unit 304 may derive different intra prediction modes with luminance and chrominance. In this case, the intra prediction parameter decoding unit 304 decodes a luminance prediction mode IntraPredModeY as the prediction parameter of the luminance and a chrominance prediction mode IntraPredModeC as the prediction parameter of the chrominance. The luminance prediction mode IntraPredModeY has 35 modes corresponding to planar prediction (0), DC prediction (1), and direction predictions (2 to 34). The chrominance prediction mode IntraPredModeC uses one of the planar prediction (0), the DC prediction (1), the direction predictions (2 to 34), and the LM mode (35). The intra prediction parameter decoding unit 304 decodes a flag indicating whether IntraPredModeC is the same mode as the luminance mode, if the flag indicates that the mode is the same as the luminance mode, IntraPredModeY may be assigned to IntraPredModeC, and if the flag indicates that the mode is different from the luminance mode, the planar prediction (0), the DC prediction (1), the direction predictions (2 to 34), and the LM mode (35) may be decode as IntraPredModeC.

The loop filter 305 applies filters to the decoded image of the CU generated by the addition unit 312, such as a deblocking filter, a Sample Adaptive Offset (SAO), and an Adaptive Loop Filter (ALF).

The reference picture memory 306 stores the decoded image of the CU generated by the addition unit 312 at a predetermined position for each picture and CU to be decoded.

The prediction parameter memory 307 stores the prediction parameter at a predetermined position for each picture and prediction unit (or sub-block, fixed size block, pixel) to be decoded. Specifically, the prediction parameter memory 307 stores the inter prediction parameter decoded by the inter prediction parameter decoding unit 303, the intra prediction parameter decoded by the intra prediction parameter decoding unit 304, and the prediction mode predMode separated by the entropy decoding unit 301. The stored inter prediction parameters include, for example, a prediction list utilization flag predFlagLX (inter prediction identifier inter_pred_idc), a reference picture index refIdxLX, and a motion vector mvLX.

The prediction mode predMode input from the entropy decoding unit 301 and the prediction parameter input from the prediction parameter decoding unit 302 are input to the prediction image generation unit 308. In addition, the prediction image generation unit 308 reads the reference picture from the reference picture memory 306. The prediction image generation unit 308 generates a prediction image of PU using the input prediction parameter and the read reference picture in the prediction mode indicated by the prediction mode predMode.

In a case where the prediction mode predMode indicates the inter prediction mode, the inter prediction image generation unit 309 generates a prediction image of PU by inter prediction using the inter prediction parameter input from the inter prediction parameter decoding unit 303 and the read reference picture.

The inter prediction image generation unit 309 reads a reference picture block at a position indicated by the motion vector mvLX with reference to the decoding target PU from a reference picture indicated by the reference picture index refIdxLX from the reference picture memory 306, with respect to the reference picture list (L0 list or L1 list) in which the prediction list utilization flag predFlagLX is 1. The inter prediction image generation unit 309 performs prediction based on the read reference picture block to generate the prediction image of the PU. The inter prediction image generation unit 309 outputs the generated prediction image of the PU to the addition unit 312.

In a case where the prediction mode predMode indicates the intra prediction mode, the intra prediction image generation unit 310 performs intra prediction using the intra prediction parameter input from the intra prediction parameter decoding unit 304 and the read reference picture. Specifically, the intra prediction image generation unit 310 reads a neighboring PU within a predetermined range from the decoding target PU among the decoded PUs from the reference picture memory 306. The predetermined range is, for example, any one of the neighboring PUs on the left, the upper left, the upper, and the upper right, in a case where the decoding target PU sequentially moves in an order of so-called raster scan, which is different according to the intra prediction mode. The raster scan order is an order in which each row from the upper end to the lower end is sequentially moved from the left end to the right end in each picture.

The intra prediction image generation unit 310 performs prediction in a prediction mode indicated by the intra prediction mode IntraPredMode for the read neighboring PU to generate a prediction image of the PU. The intra prediction image generation unit 310 outputs the generated prediction image of the PU to the addition unit 312.

In the intra prediction parameter decoding unit 304, in a case where different intra prediction modes are derived for luminance and chrominance, the intra prediction image generation unit 310 generates a prediction image of the PU of luminance by any one of the planar prediction (0), the DC prediction (1), and the direction predictions (2 to 34) according to the luminance prediction mode IntraPredModeY, and generates a prediction image of the PU of chrominance by any one of the planar prediction (0), the DC prediction (1), the direction predictions (2 to 34), and the LM mode (35) according to the chrominance prediction mode IntraPredModeC.

The inverse quantization/inverse DCT unit 311 inverse quantizes the quantization coefficient input from the entropy decoding unit 301 to obtain DCT coefficients. The inverse quantization/inverse DCT unit 311 performs Inverse Discrete Cosine Transform (inverse DCT) on the obtained DCT coefficients, and calculates a residual signal. The inverse quantization/inverse DCT unit 311 outputs the calculated residual signal to the addition unit 312.

The addition unit 312 adds the prediction image of the PU input from the inter prediction image generation unit 309 or the intra prediction image generation unit 310 and the residual signal input from the inverse quantization/inverse DCT unit 311 for each pixel to generate a decoded image of the PU. The addition unit 312 stores the generated decoded image of the PU in the reference picture memory 306, and outputs the decoded image Td integrating the generated decoded image of the PU for each picture to the outside.

Configuration of Image Coding Apparatus

Figure 6:
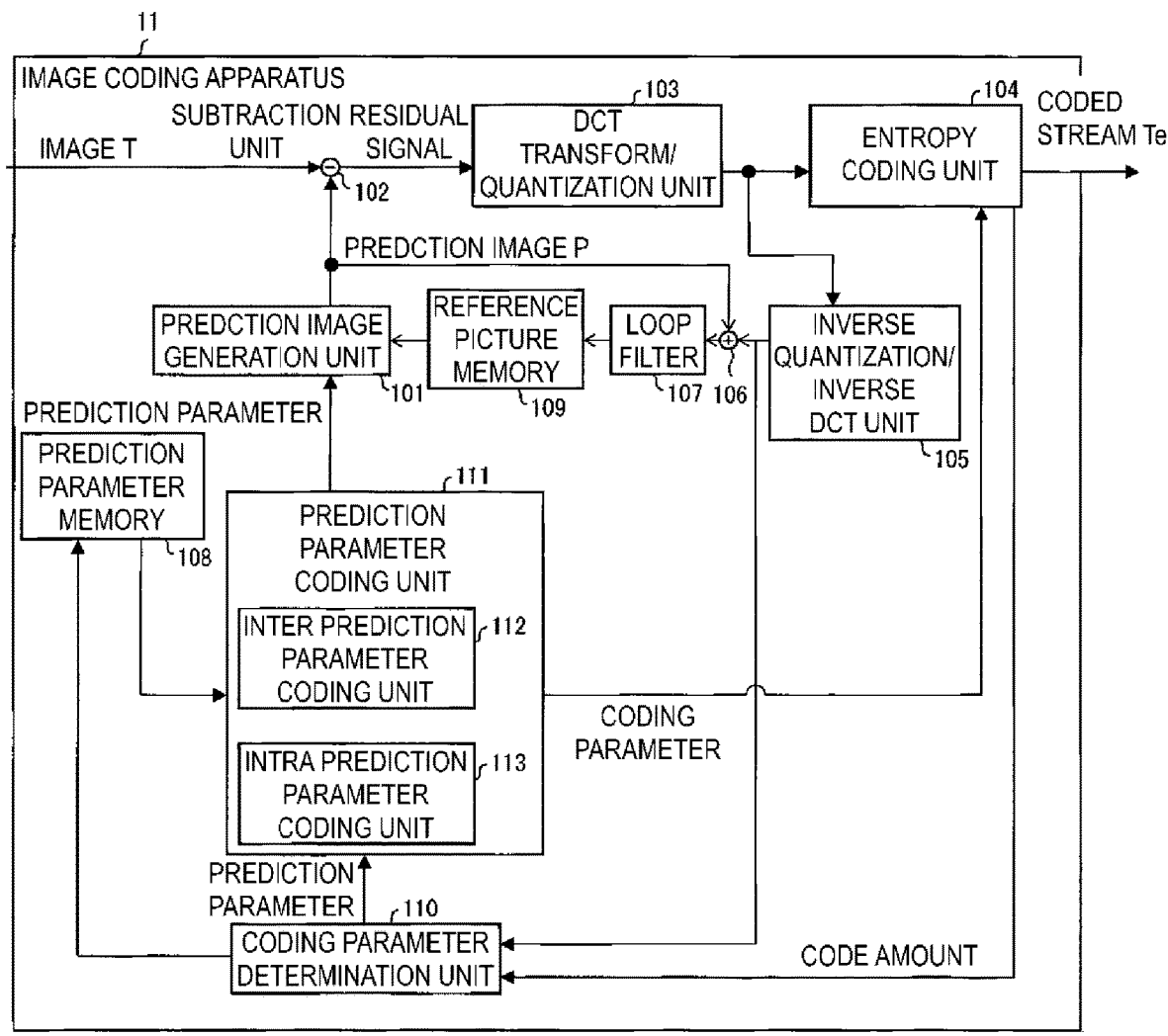
FIG. 6 is a schematic diagram illustrating a configuration of an image decoding apparatus according to an embodiment of the disclosure.

Next, a configuration of the image coding apparatus 11 according to the present embodiment will be described. FIG. 6 is a block diagram illustrating the configuration of the image coding apparatus 11 according to the present embodiment. The image coding apparatus 11 is configured to include a prediction image generation unit 101, a subtraction unit 102, and a DCT/quantization unit 103, an entropy coding unit 104, an inverse quantization/inverse DCT unit 105, an addition unit 106, and a loop filter 107, a prediction parameter memory (prediction parameter storage unit, frame memory) 108, and a reference picture memory (reference image storage unit, frame memory) 109, a coding parameter determination unit 110, and a prediction parameter coding unit 111. The prediction parameter coding unit 111 is configured to include an inter prediction parameter coding unit 112 and an intra prediction parameter coding unit 113.

The prediction image generation unit 101 generates the prediction image P of the prediction unit PU for each coding unit CU which is a region obtained by dividing the picture for each picture of the image T. Here, the predicted image generation unit 101 reads the decoded block from the reference picture memory 109 based on the prediction parameter input from the prediction parameter coding unit 111. The prediction parameter input from the prediction parameter coding unit 111 is, for example, a motion vector in the case of inter prediction. The prediction image generation unit 101 reads a block at a position on the reference image indicated by the motion vector from the target PU as a starting point. In the case of intra prediction, the prediction parameter is, for example, an intra prediction mode. The pixel value of the neighboring PU used in the intra prediction mode is read from the reference picture memory 109, and the prediction image P of the PU is generated. The prediction image generation unit 101 generates the prediction image P of the PU using one prediction method among a plurality of prediction methods for the read reference picture block. The predicted image generation unit 101 outputs the generated predicted image P of the PU to the subtraction unit 102.

Figure 7:
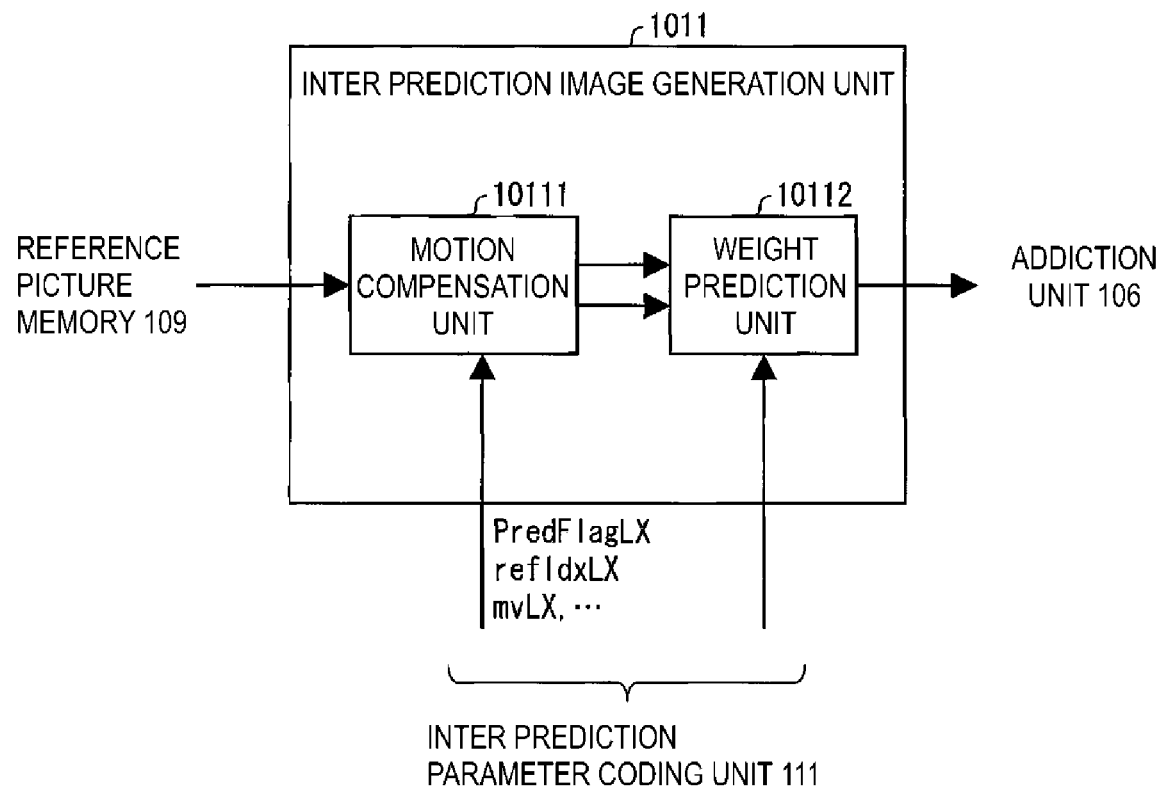
FIG. 7 is a schematic diagram illustrating a configuration of an inter prediction image generation unit of the image coding apparatus according to an embodiment of the disclosure.

Note that the predicted image generating unit 101 is the same operation as the predicted image generating unit 308 described above. For example, FIG. 7 is a schematic diagram illustrating a configuration of the inter prediction image generation unit 1011 included in the prediction image generation unit 101. The inter prediction image generation unit 1011 is configured to include a motion compensation unit 10111 and a weight prediction unit 10112. The motion compensation unit 10111 and the weight prediction unit 10112 have the same configurations as those of the motion compensation unit 3091 and the weight prediction unit 3094 described above, respectively, and hence description thereof will be omitted.

The prediction image generating unit 101 generates a predicted image P of the PU based on the pixel value of the reference block read from the reference picture memory by using the parameters input from the prediction parameter coding unit. The predicted image generated by the predicted image generating unit 101 is output to the subtraction unit 102 and the addition unit 106.

The subtraction unit 102 subtracts the signal value of the prediction image P of the PU input from the predicted image generating unit 101 from the pixel value of the corresponding PU of the image T to generate a residual signal. The subtraction unit 102 outputs the generated residual signal to the DCT/quantization unit 103.

The DCT/quantization unit 103 performs DCT on the residual signal input from the subtraction unit 102 to calculate DCT coefficient. The DCT/quantization unit 103 quantizes the calculated DCT coefficient to obtain a quantization coefficient. The DCT/quantization unit 103 outputs the obtained quantization coefficient to the entropy coding unit 104 and the inverse quantization/inverse DCT unit 105.

A quantization coefficient is input to the entropy coding unit 104 from the DCT/quantization unit 103, and coding parameters are input from the prediction parameter coding unit 111. The input coding parameters include numerals, for example, such as reference picture index refIdxLX, prediction vector index mvp_LX_idx, difference vector mvdLX, prediction mode predMode, and merge index merge_idx.

The entropy coding unit 104 entropy-codes the inputted quantization coefficient and coding parameter to generate a coded stream Te and outputs the generated coded stream Te to the outside.

The inverse quantization/inverse DCT unit 105 inversely quantizes the quantization coefficient input from the DCT/quantization unit 103 to obtain a DCT coefficient. The inverse quantization/inverse DCT unit 105 performs inverse DCT on the obtained DCT coefficient to calculate a residual signal. The inverse quantization/inverse DCT unit 105 outputs the calculated residual signal to the addition unit 106.

The addition unit 106 adds the signal value of the prediction image P of the PU input from the prediction image generation unit 101 and the signal value of the residual signal input from the inverse quantization/inverse DCT unit 105 for each pixel to generate a decoded image. The addition unit 106 stores the generated decoded image in the reference picture memory 109.

The loop filter 107 applies a deblocking filter, a Sample Adaptive Offset (SAO), and an Adaptive Loop Filter (ALF) to the decoded image generated by the addition unit 106.

The prediction parameter memory 108 stores the prediction parameter generated by the coding parameter determination unit 110 at a predetermined position for each picture to be coded and each CU.

The reference picture memory 109 stores the decoded image generated by the loop filter 107 at a predetermined position for each picture to be coded and each CU.

The coding parameter determination unit 110 selects one of a plurality of sets of coding parameters. The coding parameter is the prediction parameter described above or a parameter to be coded which is generated in association with the prediction parameter. The prediction image generation unit 101 generates the prediction image P of the PU using each of these sets of coding parameters.

The coding parameter determination unit 110 calculates the size of the information amount and a cost value indicating the coding error for each of the plurality of sets. The cost value is, for example, the sum of the code amount and the value obtained by multiplying the square error by the coefficient λ. The code amount is an information amount of the coded stream Te obtained by entropy coding the quantization error and the coding parameter. The square error is a total sum of the squares values of residual values of the residual signal calculated by the subtraction unit 102 among pixels. The coefficient λ is an actual number larger than zero which is set in advance. The coding parameter determination unit 110 selects a set of the coding parameters that the calculated cost value is the smallest. As a result, the entropy coding unit 104 outputs the selected set of coding parameters to outside as the coded stream Te, and does not output the set of the coding parameters not selected. The coding parameter determination unit 110 stores the determined coding parameter in the prediction parameter memory 108.

The prediction parameter coding unit 111 derives a format for coding from the parameter input from the coding parameter determination unit 110, and outputs the derived format to the entropy coding unit 104. The derivation of the format for coding refers to, for example, deriving a difference vector from a motion vector and a prediction vector. The prediction parameter coding unit 111 derives a necessary parameter for generating a prediction image from the parameter input from the coding parameter determination unit 110, and outputs the derived parameter to the prediction image generation unit 101. The necessary parameter for generating the predicted image is, for example, a motion vector in a sub-block unit.

The inter prediction parameter coding unit 112 derives an inter prediction parameter such as a difference vector based on the prediction parameter input from the coding parameter determination unit 110. The inter prediction parameter coding unit 112 includes the same configuration as the configuration in which the inter prediction parameter decoding unit 303 (see FIG. 6, and the like) derives the inter prediction parameter as a configuration for deriving the necessary parameters for generating the prediction image to be output to the prediction image generation unit 101. The configuration of the inter prediction parameter coding unit 112 will be described later.

The intra prediction parameter coding unit 113 derives a format (for example, MPM_idx, rem_intra_luma_pred_mode, and the like) for coding from the intra prediction mode IntraPredMode input from the coding parameter determination unit 110.

Configuration of Image Decoding Apparatus

Figure 10:
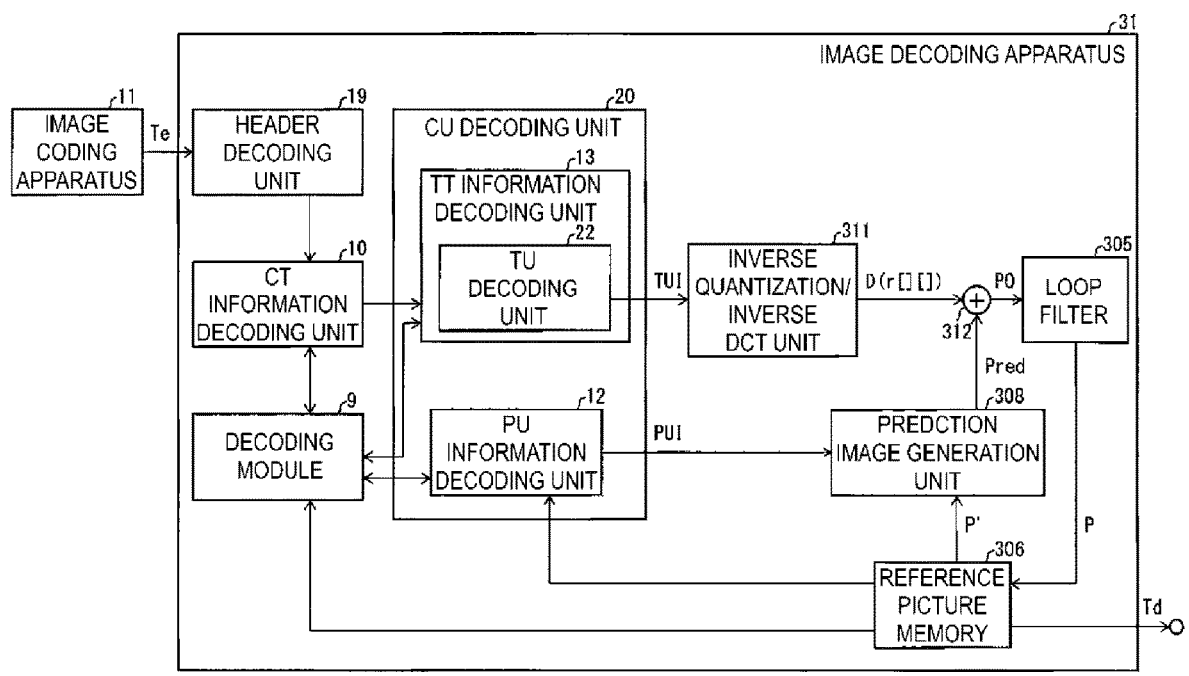
FIG. 10 is a block diagram illustrating a configuration of the image decoding apparatus according to an embodiment of the disclosure.

FIG. 10 is a block diagram illustrating a configuration of the image decoding apparatus according to the present embodiment. In this figure, in order to simplify the drawing, illustration of some members included in the block diagram illustrated in FIG. 10 is omitted. Further, for convenience of explanation, members having the same functions as those illustrated in FIG. 5 are denoted by the same reference numerals, and description thereof is omitted.

As illustrated in FIG. 10, the image decoding apparatus 31 includes a decoding module 9, a CT information decoding unit 10 (division information decoding unit, dividing unit), a prediction image generation unit 308, an inverse quantization/inverse DCT unit 311, and a reference picture memory 306, an addition unit 312, a loop filter 305, a header decoding unit 19, and a CU decoding unit 20. The CU decoding unit 20 further includes a PU information decoding unit 12 and a TT information decoding unit 13, and the TT information decoding unit 13 further includes a TU decoding unit 22.

Decoding Module

The schematic operation of each module will be described below. The decoding module 9 performs a decoding processing of decoding a syntax value from the binary data. More specifically, the decoding module 9 decodes the syntax value coded by the entropy coding method such as CABAC based on the coding data and the syntax type supplied from the supply source, and returns the decoded syntax value to the supply source.

In the following examples, the supply source of the coding data and the syntax type is a CT information decoding unit 10, and a CU decoding unit 20 (PU information decoding unit 12 and TT information decoding unit 13).

Header Decoding Unit

The header decoding unit 19 decodes Video Parameter Set (VPS), SPS, PPS, and slice header of the coding data input from the image coding apparatus 11.

CT Information Decoding Unit

The CT information decoding unit 10 performs decoding processing of the coding tree unit and the coding tree on the coding data input from the image coding apparatus 11 using the decoding module 9. Specifically, the CT information decoding unit 10 decodes the CTU information and the CT information from the coding data according to the following procedure.

First, the CT information decoding unit 10 decodes the tree unit header CTUH from the CTU information included in the CTU using the decoding module 9. Next, the CT information decoding unit 10 decodes the QT split flag indicating whether to QT divide the target CT from the CT information included in the CT and the BT split mode indicating the division method of the BT division of the target CT, and recursively divides and decodes the target CT until the QT split flag and the BT split mode no longer notify a further division. Finally, the tree unit footer CTUF is decoded from the CTU information.

The tree unit header CTUH and the tree unit footer CTUF include the coding parameters referred to by the image decoding apparatus 31 for determining the decoding method of the target coding tree unit. In addition to the QT split flag and the BT split mode, the CT information may include parameters applied to the target CT and lower layer coding node.

CU Decoding Unit

The CU decoding unit 20 includes a PU information decoding unit 12 and a TT information decoding unit 13, and decodes PUI information and TTI information of the lowest layer coding tree CT (that is, CU).

PU Information Decoding Unit

The PU information decoding unit 12 decodes the PU information (merge flag (merge_flag), merge index (merge_idx), predicted motion vector index (mvp_idx), reference image index (ref_idx), inter prediction identifier (inter_pred_ flag), difference vector (mvd), and the like) for each PU using the decoding module 9.

TT Information Decoding Unit

The TT information decoding unit 13 decodes each TTI (TU split flag SP_TU (split_transform_flag), CU residual flag CBP_TU (cbf_cb, cbf_cr, cbf_luma), and the like and TU and the like) using the decoding module 9.

Further, the TT information decoding unit 13 includes the TU decoding unit 22. The TU decoding unit 22 decodes QP update information (quantization correction value) in a case where the TU contains a residual. Note that the QP update information is a value indicating a difference value from the quantization parameter prediction value qPpred which is a prediction value of the quantization parameter QP. Further, the TU decoding unit 22 decodes the quantization prediction residual (residual_coding).

Processing of CT Information Decoding

Figure 11:
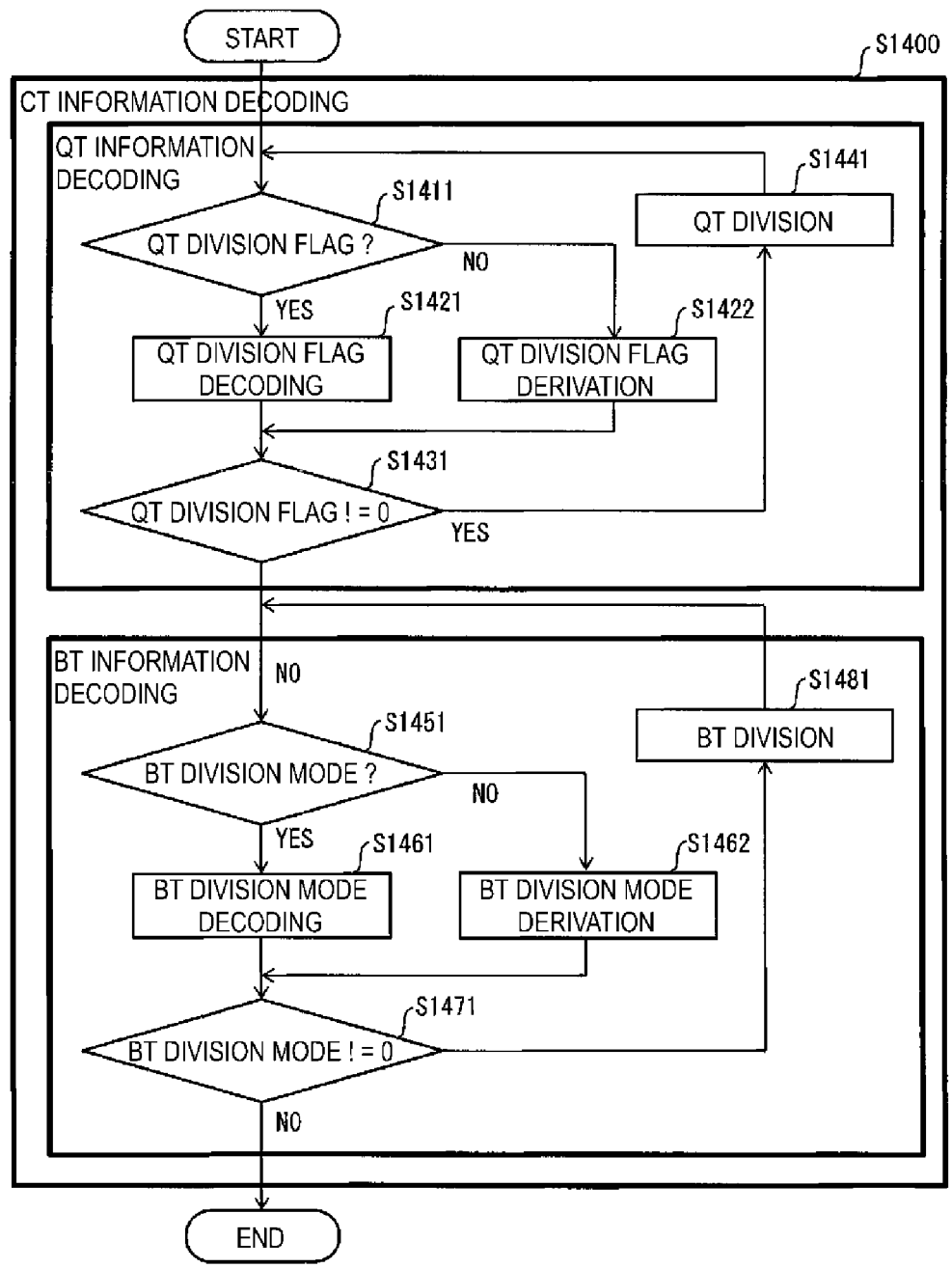
FIG. 11 is a flowchart illustrating an operation of a CT information decoding unit according to an embodiment of the disclosure.

The operation of the CT information decoding by the CT information decoding unit 10 will be described in detail by referring to FIG. 11 to FIG. 13. FIG. 11 is a flowchart describing the operation of the CT information decoding unit 10 according to an embodiment of the disclosure. FIG. 12 is a diagram illustrating a configuration example of a syntax table of the QT information according to an embodiment of the disclosure, and FIG. 13 is a diagram illustrating a configuration example of a syntax table of the BT information according to an embodiment of the disclosure.

In the CT information decoding S1400 by the CT information decoding unit 10, QT information decoding and BT information decoding are performed. Hereinafter, the QT information decoding and the BT information decoding according to the CT information decoding unit 10 will be sequentially described.

First, the CT information decoding unit 10 decodes the CT information from the coding data and recursively decodes the coding tree CT (coding_quadtree). Specifically, the CT information decoding unit 10 decodes the QT information and decodes the target coding tree coding_quadtree (x0, y0, log 2CbSize, cqtDepth). Note that the x0 and y0 are the upper-left coordinates of the target coding tree, and log 2CbSize is a logarithm CT size (for example, 6, 7, 8 if the CT size is 64, 128, 256) which is the logarithm of 2 of the CT size which is the size of the coding tree. The cqtDepth is a CT layer (QT depth) indicating the layer of the coding tree.

(S1411) The CT information decoding unit 10 determines whether a QT split flag is included in the decoded CT information. Specifically, the CT information decoding unit 10 determines whether the logarithm CT size log 2CbSize is greater than the logarithmic value MinCbLog2SizeY of the predetermined minimum CT size. In a case where the logarithm CT size log 2CbSize is greater than MinCbLog2SizeY, it is determined that there is a QT split flag, and the processing proceeds to S1421. In other case, the process proceeds to S1422.

(S1421) In a case where it is determined that the logarithm CT size log 2CbSize is greater than MinCbLog2SizeY, the CT information decoding unit 10 decodes the QT split flag (split_cu_flag) which is a syntax element.

(S1422) In other case (logarithm CT size log 2CbSize is not greater than MinCbLog2SizeY), that is, in a case where the QT split flag split_cu_flag does not appear in the coding data, the CT information decoding unit 10 omits the decoding of the QT split flag split_cu_flag from the coding data, and derives the QT split flag split_cu_flag as 0.

(S1431) In a case where the QT split flag split_cu_flag is other than 0 (=1), the CT information decoding unit 10 executes S1441 described later, shifts to the next lower layer and repeats the processing after S1411. In other case (a case where the QT split flag split_cu_flag is 0), the process proceeds to S1451.

(S1441) The CT information decoding unit 10 performs QT division. Specifically, the CT information decoding unit 10 decodes the four coding trees CT with the logarithm CT size log 2CbSize−1 at the position of the CT layer cqtDepth+1 (x0, y0), (x1, y0), (x0, y1), (x1, y1).

coding_quadtree (x0, y0, log 2CbSize−1, cqtDepth+1)
coding_quadtree (x1, y0, log 2CbSize−1, cqtDepth+1)
coding_quadtree (x0, y1, log 2CbSize−1, cqtDepth+1)
coding_quadtree (x1, y1, log 2CbSize−1, cqtDepth+1)

Here, x0 and y0 are the upper left coordinates of the target coding tree, x1, y1 are derived by adding ½ of the logarithm CT size (1<<log 2CbSize) to (x0, y0) as shown in the following equation.

x1=x0+(1<<(log 2CbSize−1))

y1=y0+(1<<(log 2CbSize−1))

Note that "<<" indicates a left shift. The value of 1<<N is the same as that of N power of 2 (the same applies below). Similarly, ">>" indicates a right shift.

Then, the CT information decoding unit 10 updates by adding 1 to the CT layer cqtDepth indicating the layer of the coding tree, and by subtracting 1 from the logarithm CT size log 2CbSize which is a logarithmic value of the coding unit size (CT size is halved).

cqtDepth=cqtDepth+1 log 2CbSize=log 2CbSize−1

The CT information decoding unit 10 also continues the QT information decoding started from S1411 using the updated upper left coordinates, the logarithm CT size, and the CT layer in the lower layer coding tree CT.

(S1451) The CT information decoding unit 10 decodes the CT information from the coding data and recursively decodes the coding tree CT (coding_binarytree). Specifically, the CT information decoding unit 10 decodes the BT information and decodes the target coding tree coding_binarytree (x0, y0, log 2CbWidth, log 2CbHeight, cqtDepth, cbtDepth). Note that x0 and y0 are the upper left coordinates of the target coding tree, log 2CbWidth is a logarithmic value of the width of the coding tree, log 2CbHeight is a logarithmic value of the height of the coding tree, and cqtDepth is the CT layer (QT depth) indicating the layer of the coding tree, and cbtDepth is the CT layer (BT depth) indicating the layer of the coding tree.

The CT information decoding unit 10 determines whether the BT split mode (division information) is included in the decoded CT information. Specifically, the CT information decoding unit 10 determines whether the height of the coding tree (1<<log 2CbHeight) is greater than minBTSize or the width of the coding tree (1<<log 2CbWidth) is greater than minBTSize, the width of the coding tree (1<<log 2CbWidth) is not greater than maxBTSize, the height of the coding tree (1<<log 2CbHeight) is not greater than maxBTSize, and cbtDepth is less than maxBTDepth (hereinafter referred to as predetermined conditions). The minBTSize is the minimum BT size (the minimum size of the leaf node of the binary tree), the maxBTSize is the maximum BT size (the maximum size of the root node of the binary tree), the maxBTDepth is the maximum BT depth (the maximum value of the depth of the binary tree).

In a case where the predetermined conditions are satisfied, it is determined that there is a BT split mode, and the process proceeds to S1461. In other case, the process proceeds to S1462.

(S1461) In the case where the predetermined conditions are satisfied, the CT information decoding unit 10 decodes the BT split mode split_bt_mode [x0] [y0] which is a syntax element.

(S1462) In another case (a case where the predetermined conditions are not satisfied), that is, in a case where the BT split mode split_bt_mode [x0] [y0] does not appear in the coding data, the CT information decoding unit 10 omits decoding of the BT split mode split_bt_mode [x0] [y0] from the data and derive the BT split mode split_bt_mode [x0] [y0] as 0.

(S1471) In a case where the BT split mode split_bt_mode [x0] [y0] is other than 0 (=1 or 2), the CT information decoding unit 10 executes S1481 described later, shifts to the next lower layer and repeats the processing after S1451. In other case (a case where the BT split mode split_bt_mode [x0] [y0] is 0), the CT information decoding unit 10 does not divide the target coding tree and terminates the processing.

(S1481) The CT information decoding unit 10 performs the BT division. Specifically, in a case where the BT split mode split_bt_mode [x0] [y0] is 1, the CT information decoding unit 10 decodes two coding trees CT of log 2CbWidth and log 2CbHeight−1, respectively, as logarithmic values of width and height at the positions (x0, y0) and (x0, y1) of the CT layer cbtDepth+1.

coding_binarytree (x0, y0, log 2CbWidth, log 2CbHeight−1, cqtDepth, cbtDepth+1)

coding_binarytree (x0, y1, log 2CbWidth, log 2CbHeight−1, cqtDepth, cbtDepth+1)

On the other hand, in a case where the BT split mode split_bt_mode [x0] [y0] is 2, the CT information decoding unit 10 decodes two coding trees CT of log 2CbWidth−1 and log 2CbHeight, respectively, as the logarithmic values of width and height at the positions (x0, y0) and (x1, y0) of the CT layer cbtDepth+1.

coding_binarytree (x0, y0, log 2CbWidth−1, log 2CbHeight, cqtDepth, cbtDepth+1)

coding_binarytree (x1, y0, log 2CbWidth−1, log 2CbHeight, cqtDepth, cbtDepth+1)

Here, x0 and y0 are the upper left coordinates of the target coding tree, x1, y1 are derived by adding ½ of (1<<log 2CbWidth) and ½ of (1<<log 2CbHeight) to (x0, y0) respectively, as shown in the following equation.

$$x1=x0+(1<<(\log 2CbWidth-1))$$

$$y1=y0+(1<<(\log 2CbHeight-1))$$

Note that << indicates a left shift. 1<<N is the same as the N power of 2 (the same applies below). Similarly, >> indicates a right shift.

Then, the CT information decoding unit 10 updates by adding 1 to the CT layer cbtDepth indicating the layer of the coding tree, and by subtracting 1 from log 2CbWidth or log 2CbHeight.

cbtDepth=cbtDepth+1 log 2CbWidth=log 2CbWidth−1 log 2CbHeight=log 2CbHeight−1

The CT information decoding unit 10 also continues the BT information decoding starting from S1451 using the updated upper left coordinates, the logarithmic value of the CT width and height, and the BT layer in the lower layer coding tree CT.

Note that the CT information decoding described above is a decoding method assuming that the QT tree and the BT tree are separate layers. In this method, the QT division cannot be performed after the BT division, but it is not necessary to determine whether the QT split flag is present after the BT division. However, the present embodiment is not limited to this, and a decoding method in which the QT tree and the BT tree are the same layer may be adopted. In this case, both the QT division and the BT division can be selected, that is, the QT division can be performed even after the BT division, but it is necessary to determine whether the QT split flag is present for every time.

Limitation of BT Division

In the present embodiment, the division method for the BT division is limited in order to reduce the complexity of coding/decoding of a video. Specifically, when the coding node of the CTU is decoded, the BT division is performed by referring to the division method for the BT division in the other decoded coding node.

In the present embodiment, when the coding node of the CTU is decoded, the BT division is performed by referring to the division method for the BT division in another decoded coding node, thus the BT division pattern of the coding node is limited. As a result, the complexity of coding/decoding related to the BT division of the coding node can be reduced.

In the following, as a specific aspect, an aspect in which the division method of the lower layer coding node is limited to a division method (horizontal division or vertical division) of a root node (coding node with cbtDepth=0) in the BT tree is illustrated.

Figure 14A:
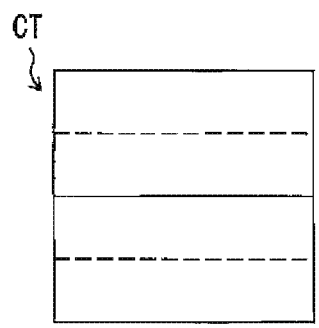
FIGS. 14A and 14B are diagrams, each illustrating an example of a division method for BT division.
Figure 14B:
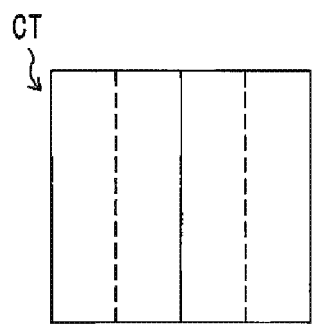

FIGS. 14A and 14B illustrate an example of the division method for the BT division. In the figure, the solid line indicates the division of the parent node, and the dash line indicates the division of the child node. In this aspect, as illustrated in FIG. 14A, in a case where the division method of the parent node is horizontal division, the division method of the child node is limited to the horizontal division. On the other hand, as illustrated in FIG. 14B, in a case where the division method of the parent node is vertical division, the division method of the child node is limited to vertical division.

Processing of BT Information Decoding-1

An operation example of BT information decoding by the CT information decoding unit 10 in the present aspect will be described in detail by referring to FIG. 15. FIG. 15 is a diagram illustrating a configuration example of a syntax table of BT information according to an embodiment of the disclosure.

In this case, the image coding apparatus 11 codes the BT division direction flag split_dir_flag [x0] [y0] indicating the division direction of the root node when coding the root node with cbtDepth=0. In a case where split_dir_flag [x0] [y0] is 0, vertical division is represented, and in a case where split_dir_flag [x0] [y0] is 1, horizontal division is represented.

Further, in the image coding apparatus 11, a BT split flag split_bt_flag [x0] [y0] indicating whether to perform the BT division coded for each coding tree CT. In a case where split_bt_flag [x0] [y0] is 0, it indicates that BT division is not performed, and in a case where split_bt_flag [x0] [y0] is 1, it indicates that BT division is performed.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth).

In a case where the predetermined condition is not satisfied, that is, the BT split flag split_bt_flag [x0] [y0] does not appear in the coding data, the CT information decoding unit 10 omits the decoding of the BT split flag split_bt_flag [x0] [y0] from the coding data and derives the BT split mode splitBtMode [x0] [y0] as 0.

On the other hand, in a case where the predetermined condition is satisfied, the CT information decoding unit 10 decodes the BT split flag split_bt_flag [x0] [y0] as a syntax element.

In a case where cbtDepth=0 (root node) and the BT split flag split_bt_flag [x0] [y0] is other than 0 (=1), the CT information decoding unit 10 decodes the BT division direction flag split_dir_flag [x0] [y0].

The CT information decoding unit 10 derives the BT split mode splitBtMode [x0] [y0] of the target CT based on the decoded BT division direction flag split_dir_flag [x0] [y0] and the BT split flag split_bt_flag [x0] [y0]. Here, the derivation table of the BT split mode splitBtMode [x0] [y0] is illustrated in FIG. 16.

As illustrated in FIG. 16, the BT split mode splitBtMode [x0] [y0] is determined according to the respective values of the BT division direction flag split_dir_flag [x0] [y0] and the BT split flag split_bt_flag [x0] [y0]. Note that B_SPLIT_NONE represents not to divide, splitBtMode [x0] [y0]=0, BT_SPLIT_HOR represents horizontal division, splitBtMode [x0] [y0]=1, BT_SPLIT_VER represents vertical division, splitBtMode [x0] [y0]=2.

Based on the BT split mode splitBtMode [x0] [y0] derived in this way, the CT information decoding unit 10 performs BT division. The CT information decoding unit 10 also performs the same processing in the lower layer coding tree CT to continue the BT information decoding.

Note that the CT information decoding unit 10 stores the BT division direction flag split_dir_flag [x0] [y0] decoded at cbtDepth=0 (root node) in the memory. In a case other than cbtDepth=0 and the BT split flag split_bt_flag [x0] [y0] is other than 0 (=1), the CT information decoding unit 10 derives the BT split flag split_dir_flag [x0] [y0] stored in the memory (that is, set the same division direction as the root node), and the BT split flag split_dir_flag [x0] [y0] is not decoded.

Note that, in the above description, the configuration has been described in which the division of the lower layer coding node is determined by referring to the BT division direction flag split_dir_flag [x0] [y0] of the coding node with cbtDepth=0, but the present embodiment is not necessarily limited to this. For example, in a case where cbtDepth=i, the division of the coding node may be determined by referring to the BT division direction flag split_dir_flag [x0] [y0] of the coding node of cbtDepth=j (j<i, j is an integer not less than 0).

Note that, in the above description, two syntaxes, a syntax split_bt_flag indicating whether to divide, and a syntax split_dir_flag indicating the division method are used as the syntax indicating the BT division (division information), but a syntax (for example, split_bt_mode) combined by both of them may be used. In this case, it indicates whether the first bit of the binary representation of split_bt_mode is divided (corresponding to split_bt_flag), and the succeeding bit indicates the division method (corresponding to split_dir_flag). Also, when the first bit of split_bt_mode is 0, that is, indicating that division is not to be performed, or in a case where the division method is limited (in the case of a condition not including the BT split flag split_dir_flag), the subsequent bit of split_bt_mode does not appear.

Processing of BT Information Decoding-2

Another operation example of the BT information decoding performed by the CT information decoding unit 10 according to the present aspect will be described in detail by referring to FIG. 17. FIG. 17 is a diagram illustrating a configuration example of a syntax table of the BT information according to an embodiment of the disclosure.

In this case, the image decoding apparatus 31 inherits a splitConstrain indicating the division method of the parent node to the child node. In a case where the splitConstrain is 0, it indicates that the division method for the BT division is not limited, in a case where the splitConstrain is 1, it indicates that the division method for the BT division is limited to the horizontal division, which is the division method of the parent node, and in a case where the splitConstrain is 2, it indicates that the division method for the BT division is limited to the vertical division, which is the division method of the parent node.

Also, in the image coding apparatus 11, the BT split mode split_bt_mode [x0] [y0] or the BT split flag split_bt_flag [x0] [y0] indicating whether to perform the BT division is coded for each coding tree CT.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth, splitConstrain). The initial value of splitConstrain is 0.

In the case where the predetermined condition is not satisfied, that is, if the BT split mode split_bt_mode [x0] [y0] or the BT split flag split_bt_flag [x0] [y0] does not appear in the coding data, the CT information decoding unit 10 derives the BT Derive the mode splitBtMode [x0] [y0] as 0.

On the other hand, in the case where the predetermined condition is satisfied, the CT information decoding unit 10 decodes the BT split mode split_bt_mode [x0] [y0] or the BT split flag split_bt_flag [x0] [y0] as the syntax element.

In a case where the splitConstrain is 0, the CT information decoding unit 10 decodes the BT split mode split_bt_mode [x0] [y0] from the coding data and sets the decoded BT split mode split_bt_mode [x0] [y0] as BT split mode splitBtMode [x0] [y0] of the target CT.

On the other hand, in a case where the splitConstrain is other than 0 (=1, 2), the CT information decoding unit 10 decodes the BT split flag split_bt_flag [x0] [y0] from the coding data, and derives the BT split mode splitBtMode [x0] [y0] of the target CT based on splitConstrain and the BT split flag split_bt_flag [x0] [y0]. Here, the derivation table of the BT split mode splitBtMode [x0] [y0] is illustrated in FIG. 18.

As illustrated in FIG. 18, the BT split mode splitBtMode [x0] [y0] is determined according to the values of splitConstrain and BT split flag split_bt_flag [x0] [y0].

In a case where the BT split mode splitBtMode [x0] [y0] is 1, the CT information decoding unit 10 decodes two coding trees CT of log 2CbHeight−1 at the positions (x0, y0) and (x0, y1) of the CT layer cbtDepth+1.

On the other hand, in a case where the BT split mode split_bt_mode [x0] [y0] is 2, the CT information decoding unit 10 decodes the two coding trees CT of log 2CbWidth−1 at the positions (x0, y0), (x1, y0) of the CT layer cbtDepth+1.

The CT information decoding unit 10 sets splitBtMode [x0] [y0] to the splitConstrain of each of the decoded coding trees CT, performs the same processing on the lower layer coding tree CT and continues BT information decoding.

Note that, in the above description, different syntax is allocated in the case where the value range is binary as the syntax indicating the BT division method (division information) and in the case where the value range is multi-valued, but both of them may use the same syntax name (for example, split_bt_mode). That is, the same syntax split_bt_mode may be used without distinguishing the syntax split_bt_flag that indicates whether to divide, and the syntax split_bt_mode that indicates the direction of divide. Which one the syntax means can be determined obviously. Note that, in this case, even in the same syntax, the binary expression varies according to the condition. For example, in the case of binary values, the binary representation is either 0 or 1, and in the case of three values, it is 0, 10, or 11. The same applies below. In this case, the portion described as decoding (coding) "the BT split mode split_bt_mode [x0] [y0] [cbtDepth] or BT split flag split_bt_flag [x0] [y0] indicating whether BT division is performed or not" may be replaced simply as decoding "the BT division information split_bt_mode [x0] [y0] [cbtDepth]".

Processing of BT Information Decoding-3

Another operation example of the BT information decoding performed by the CT information decoding unit 10 according to the present aspect will be described in detail by referring to FIG. 19. FIG. 19 is a diagram illustrating a configuration example of a syntax table of the BT information according to an embodiment of the disclosure.

In this case, in the image coding apparatus 11, the BT split mode split_bt_mode [x0] [y0] [cbtDepth] or the BT split flag split_bt_flag [x0] [y0] indicating whether to perform the BT division is coded for each coding tree CT.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cbtDepth).

In a case where the predetermined condition is not satisfied, that is, the BT split mode split_bt_mode [x0] [y0] [cbtDepth] or the BT split flag split_bt_flag [x0] [y0] does not appear in the coding data, the CT information decoding unit 10 omits the decoding of the BT split mode split_bt_mode [x0] [y0] [cbtDepth] or the BT split flag split_bt_flag [x0] [y0] from the coding data, and derives the BT split mode splitBtMode [x0] [y0] [cbtDepth] as 0.

On the other hand, in a case where the predetermined condition is satisfied and cbtDepth=0, the CT information decoding unit 10 decodes the BT split mode split_bt_mode [x0] [y0] [cbt Depth] from the coding data, and sets the decoded BT split mode split_bt_mode [x0] [y0] [cbtDepth] as the BT split mode splitBtMode [x0] [y0] [cbtDepth] of the target CT.

Further, in a case where the predetermined condition is satisfied and other than cbtDepth=0(=cbtDepth>0), the CT information decoding unit 10 decodes the BT split flag split_bt_flag [x0] [y0] from the coding data, and derives the BT split mode splitBtMode [x0] [y0] [cbtDepth] of the target CT based on the BT split mode splitBtMode [x0] [y0] [cbtDepth−1] and the BT split flag split_bt_flag [x0] [y0] of the parent node. Here, the derivation table of the BT split mode splitBtMode [x0] [y0] [cbtDepth] is illustrated in FIG. 20.

As illustrated in FIG. 20, the BT split mode splitBtMode [x0] [y0] [cbtDepth] is determined according to the respective value of the BT split flag splitBtMode [x0] [y0] [cbtDepth−1] and the BT split flag split_bt_flag [x0] [y0] of the parent node.

In a case where the BT split mode splitBtMode [x0] [y0] [cbtDepth] is 1, the CT information decoding unit 10 decodes the two coding trees CT of log 2CbHeight−1 at the positions (x0, y0), (x0, y1) of the CT layer cbtDepth+1.

On the other hand, in a case where the BT split mode split_bt_mode [x0] [y0] is 2, the CT information decoding unit 10 decodes the two coding trees CT of log 2CbWidth−1 at the positions (x0, y0), (x1, y0) of the CT layer cbtDepth+1.

The CT information decoding unit 10 also performs the same processing in the lower layer coding tree CT to continue the BT information decoding.

As in the above description, one syntax split_bt_mode may be used without distinguishing the syntax of divide information into split_bt_flag and split_bt_mode, and both may be distinguished from binary representation.

Second Embodiment

In the present embodiment, when the division directions of BT division is limited, that is, when the coding node of the CTU is decoded, BT division is performed using the division method for the BT division in another decoded coding node as another specific aspect, an aspect is indicated, in which the division method of another coding node (next-sibling node) having the same parent node with the same cbtDepth is limited according to the division method (horizontal division or vertical division) of the coding node (previous-sibling node) having the same parent node with the same cbtDepth in the BT tree.

Specific examples of the above-described aspects include an aspect in which the division method of the next-sibling node is limited to the same division method as the previous-sibling node, an aspect in which the division method of the next-sibling node is limited to a division method different from the division method of the previous-sibling node, and an aspect in which BT division of the next-sibling node is prohibited in a case where the previous-sibling node is BT divided. Here, among the coding nodes having the same parent node with the same cbtDepth, the coding node to be decoded earlier is the previous-sibling node, and the coding node to be decoded later is the next-sibling node.

Figure 21A:
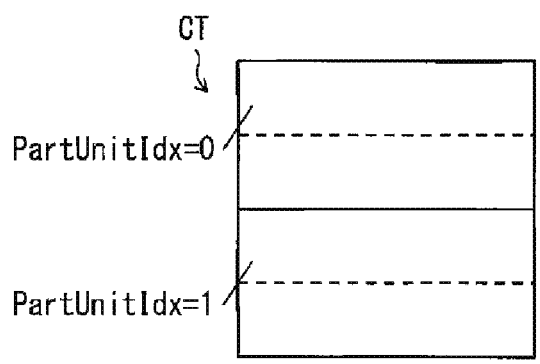
FIGS. 21A and 21B are diagrams, each illustrating an example of a division method for BT division.
Figure 21B:
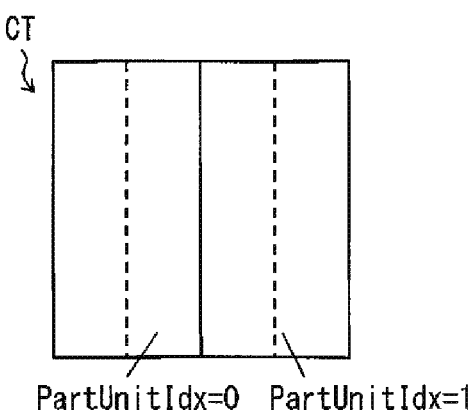

First, in the BT tree, the aspect in which the division method of another coding node (next-sibling node) having the same parent node with the same cbtDepth is limited to the division method (horizontal division or vertical division) of the coding node (previous-sibling node) having the same parent node with the same cbtDepth is described below. FIGS. 21A and 21B illustrate an example of a division method of BT division. A node with PartUnitIdx=0 in the figure represents a previous-sibling node, and a node with PartUnitIdx=1 represents a next-sibling node.

In the present aspect, as illustrated in FIG. 21A, in a case where the division method of the previous-sibling node is horizontal division, the division method of the next-sibling node is also limited to horizontal division. On the other hand, as illustrated in FIG. 21B, in a case where the division method of the previous-sibling node is vertical division, the dividing method of the sibling node is also limited to vertical division.

Processing of BT Information Decoding-1

An operation example of BT information decoding by the CT information decoding unit 10 in the present aspect will be described in detail by referring to FIG. 22. FIG. 22 is a diagram illustrating a configuration example of a syntax table of the BT information according to an embodiment of the disclosure.

In this case, in the image coding apparatus 11, the BT split mode split_bt_mode [x0] [y0] [cbtDepth] or the BT split flag split_bt_flag [x0] [y0] indicating whether to perform the BT division is coded for each coding tree CT.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth, splitConstrain). The initial value of splitConstrain is 0.

In the case where the predetermined condition is not satisfied, the CT information decoding unit 10 derives the BT split mode splitBtMode [x0] [y0] [cbtDepth] as 0.

On the other hand, in the case where the predetermined condition is satisfied, the CT information decoding unit 10 decodes the BT split mode split_bt_mode [x0] [y0] [cbtDepth] or the BT split flag split_bt_flag [x0] [y0] as the syntax element.

In a case where the splitConstrain is 0, the CT information decoding unit 10 decodes the BT split mode split_bt_mode [x0] [y0] [cbtDepth] from the coding data and outputs the decoded BT split mode split_bt_mode [x0] [y0] [cbtDepth] as the BT split mode splitBtMode [x0] [y0] [cbtDepth] of the target CT.

On the other hand, in a case where the splitConstrain is other than 0 (=1, 2), the CT information decoding unit 10 decodes the BT split flag split_bt_flag [x0] [y0] from the coding data, and derives the BT split mode splitBtMode [x0] [y0] [cbtDepth] of the target CT based on splitConstrain and the BT split flag split_bt_flag [x0] [y0]. Here, the derivation table of the BT split mode splitBtMode [x0] [y0] [cbtDepth] is illustrated in FIG. 23.

As illustrated in FIG. 23, the BT split mode splitBtMode [x0] [y0] [cbtDepth] is determined according to the values of splitConstrain and BT split flag split_bt_flag [x0] [y0].

In a case where the BT split mode splitBtMode [x0] [y0] [cbtDepth] is 1, the CT information decoding unit 10 decodes the two coding trees CT of log 2CbHeight−1 at the positions (x0, y0), (x0, y1) of the CT layer cbtDepth+1, sets splitConstrain=0 for the previous-sibling node, and set split-Constrain to be the BT split mode splitBtMode [x0] [y0] [cbtDepth+1] of the previous-sibling node for the next-sibling node (x0, y1) as illustrated in FIG. 21A.

On the other hand, in a case where the BT split mode split_bt_mode [x0] [y0] [cbtDepth] is 2, the CT information decoding unit 10 decodes the two coding trees CT of log 2CbWidth−1 at the positions (x0, y0), (x1, y0) of the CT layer cbtDepth+1, sets splitConstrain=0 for the previous-sibling node, and set splitConstrain to be the BT split mode splitBtMode [x0] [y0] [cbtDepth+1] of the previous-sibling node for the next-sibling node (x1, y0) as illustrated in FIG. 21B.

The CT information decoding unit 10 also performs the same processing in the lower layer coding tree CT to continue the BT information decoding.

As in the above description, one syntax split_bt_mode may be used without distinguishing the syntax of divide information into split_bt_flag and split_bt_mode, and both may be distinguished from binary representation.

Processing of BT Information Decoding-2

Figure 24A:
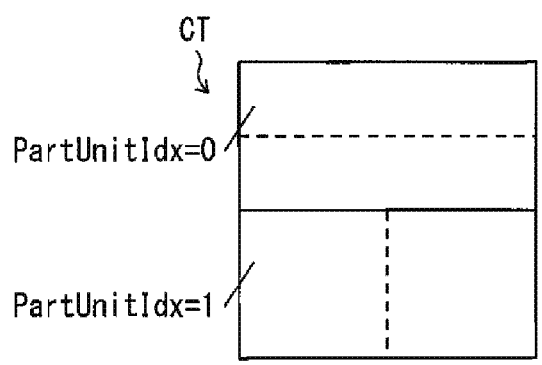
FIGS. 24A and 24B are diagrams, each illustrating an example of a division method for BT division.
Figure 24B:
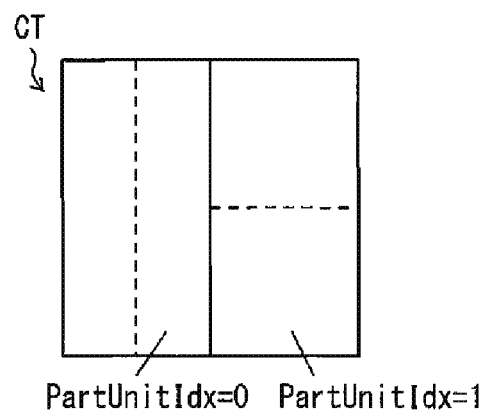

Subsequently, in the BT tree, the aspect in which the division method of another coding node (next-sibling node) having the same parent node with the same cbtDepth is limited to a division method different from the division method (horizontal division or vertical division) of the coding node (previous-sibling node) having the same parent node with the same cbtDepth is described below. FIGS. 24A and 24B illustrate examples of a division method of BT division.

In the present aspect, as illustrated in FIG. 24A, in a case where the division method of the previous-sibling node is horizontal division, the division method of the next-sibling node is limited to vertical division. On the other hand, as illustrated in FIG. 24B, in a case where the division method of the previous-sibling node is vertical division, the dividing method of the sibling node is limited to horizontal division.

An operation example of BT information decoding by the CT information decoding unit 10 in the present aspect will be described in detail by referring to FIG. 25. FIG. 25 is a diagram illustrating a configuration example of a syntax table of the BT information according to an embodiment of the disclosure.

In this case, in the image coding apparatus 11, the BT split mode split_bt_mode [x0] [y0] [cbtDepth] or the BT split flag split_bt_flag [x0] [y0] indicating whether to perform the BT division is coded for each coding tree CT.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth, splitConstrain). The initial value of splitConstrain is 0.

In the case where the predetermined condition is not satisfied, the CT information decoding unit 10 derives the BT split mode splitBtMode [x0] [y0] [cbtDepth] as 0.

On the other hand, in the case where the predetermined condition is satisfied, the CT information decoding unit 10 decodes the BT split mode split_bt_mode [x0] [y0] [cbtDepth] or the BT split flag split_bt_flag [x0] [y0] as the syntax element.

In a case where the splitConstrain is 0, the CT information decoding unit 10 decodes the BT split mode split_bt_mode [x0] [y0] [cbtDepth] from the coding data and outputs the decoded BT split mode split_bt_mode [x0] [y0] [cbtDepth] as the BT split mode splitBtMode [x0] [y0] [cbtDepth] of the target CT.

On the other hand, in a case where the splitConstrain is other than 0 (=1, 2), the CT information decoding unit 10 decodes the BT split flag split_bt_flag [x0] [y0] [cbtDepth] from the coding data, and derives the BT split mode splitBt-Mode [x0] [y0] [cbtDepth] of the target CT based on splitConstrain and the BT split flag split_bt_flag [x0] [y0]. Here, the derivation table of the BT split mode splitBtMode [x0] [y0] [cbtDepth] is as illustrated in FIG. 23.

As illustrated in FIG. 23, the BT split mode splitBtMode [x0] [y0] [cbtDepth] is determined according to the values of splitConstrain and BT split flag split_bt_flag [x0] [y0].

In a case where the BT split mode splitBtMode [x0] [y0] [cbtDepth] is 1, the CT information decoding unit 10 decodes the two coding trees CT of log 2CbHeight−1 at the positions (x0, y0), (x0, y1) of the CT layer cbtDepth+1. At this time, splitConstrain=0 is set for the previous-sibling node (x0, y0), and for the next-sibling node (x0, y1), when the BT split mode splitBtMode [x0] [y0] [cbtDepth+1] of the previous-sibling node is other than 0 (=1, 2), splitConstrain=3−splitBtMode [x0] [y0] [cbtDepth+1], that is, splitConstrain is set as a division direction different from that of the previous-sibling (FIG. 24A), when splitBtMode [x0] [y0] [cbtDepth+1] is 0, set splitConstrain=0.

On the other hand, in a case where the BT split mode split_bt_mode [x0] [y0] [cbtDepth] is 2, the CT information decoding unit 10 decodes the two coding trees CT of log 2CbWidth−1 at the positions (x0, y0), (x1, y0) of the CT layer cbtDepth+1. At this time, splitConstrain=0 is set for the previous-sibling node (x0, y0), and for the next-sibling node (x1, y0), when the BT split mode splitBtMode [x0] [y0] [cbtDepth+1] of the previous-sibling node is other than 0 (=1, 2), splitConstrain=3−splitBtMode [x0] [y0] [cbtDepth+1] (FIG. 24B), in a case where splitBtMode [x0] [y0] [cbtDepth+1] is 0, set splitConstrain=0.

The CT information decoding unit 10 also performs the same processing in the lower layer coding tree CT to continue the BT information decoding.

As in the above description, one syntax split_bt_mode may be used without distinguishing the syntax of divide information into split_bt_flag and split_bt_mode, and both may be distinguished from binary representation.

Processing of BT Information Decoding-3

Figure 26A:
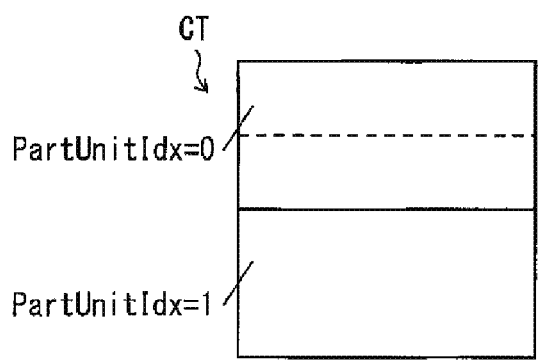
FIGS. 26A and 26B are diagrams, each illustrating an example of a division method for BT division.
Figure 26B:
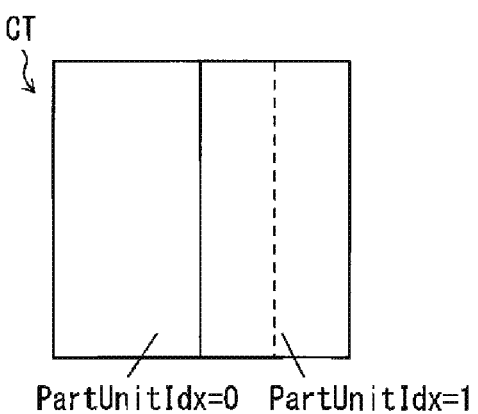

Subsequently, in the BT tree, the aspect the BT division of another coding node (next-sibling node) having the same parent node with the same cbtDepth is prohibited, when the coding node (previous-sibling node) having the same parent node with the same cbtDepth is BT divided, is described below. FIGS. 26A and 26B illustrate an example of a division method of BT division.

In the present aspect, as illustrated in FIG. 26A, in a case where the previous-sibling node is performed BT division, the BT division of the sibling node is prohibited. On the other hand, as illustrated in FIG. 26B, in a case where the previous-sibling node is not BT divided, the BT division of the sibling node is not prohibited.

An operation example of BT information decoding by the CT information decoding unit 10 in the present aspect will be described in detail by referring to FIG. 27. FIG. 27 is a diagram illustrating a configuration example of a syntax table of the BT information according to an embodiment of the disclosure.

In this case, in the image coding apparatus 11, splitConstrain indicating whether BT division is allowed is derived. When splitConstrain is 0, it indicates that BT division is allowed, and when splitConstrain is 1, it indicates that BT division is prohibited.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth, splitConstrain). The initial value of splitConstrain is 0.

In the case where the predetermined condition is not satisfied, the CT information decoding unit 10 derives the split_bt_mode [x0] [y0] [cbtDepth] as 0.

On the other hand, in the case where the predetermined condition is satisfied and the splitConstrain is 0, the CT information decoding unit 10 decodes the BT split mode split_bt_mode [x0] [y0] [cbt Depth] from the coding data.

In a case where the BT split mode split_bt_mode [x0] [y0] [cbtDepth] is 1, the CT information decoding unit 10 decodes the two coding trees CT of log 2CbHeight-1 at the positions (x0, y0), (x0, y1) of the CT layer cbtDepth+1. At this time, splitConstrain=0 is set for the previous-sibling node (x0, y0), and for the next-sibling node (x0, y1), when the BT split mode splitBtMode [x0] [y0] [cbtDepth+1] of the previous-sibling node is other than 0 (=1, 2), splitConstrain=1 (FIG. 26A), when splitBtMode [x0] [y0] [cbtDepth+1] is 0, set splitConstrain=0.

On the other hand, in a case where the BT split mode split_bt_mode [x0] [y0] [cbtDepth] is 2, the CT information decoding unit 10 decodes the two coding trees CT of log 2CbWidth-1 at the positions (x0, y0), (x1, y0) of the CT layer cbtDepth+1. At this time, splitConstrain=0 is set for the previous-sibling node (x0, y0), and for the next-sibling node (x1, y0), when the BT split mode splitBtMode [x0] [y0] [cbtDepth+1] of the previous-sibling node is other than 0 (=1, 2), splitConstrain=1 (FIG. 26B), when splitBtMode [x0] [y0] [cbtDepth+1] is 0, set splitConstrain=0.

The CT information decoding unit 10 also performs the same processing in the lower layer coding tree CT to continue the BT information decoding.

Third Embodiment

In the present embodiment, as still another specific aspect, when the division directions of BT division is limited, that is, when the coding node of the CTU is decoded, BT division is performed using the division method for the BT division in another decoded coding node, an aspect is indicated, in which the division method of another coding node (next-sibling node) having the same parent node with the same cbtDepth is limited, in a case where the division method (horizontal division or vertical division) of the coding node (previous-sibling node) having the same parent node with the same cbtDepth is the same as the parent node in the BT tree.

Specific examples of the above-described aspects include an aspect in which the division method of the next-sibling node is limited to the same division method of the parent node and the previous-sibling node, and an aspect in which the division method of the next-sibling node is limited to a division method different from the division method of the parent node and the previous-sibling node, in a case where the division method of the parent node and the next-sibling node are the same. Here, among the coding nodes having the same parent node with the same cbtDepth, the coding node to be decoded earlier is the previous-sibling node, and the coding node to be decoded later is the next-sibling node.

Figure 28A:
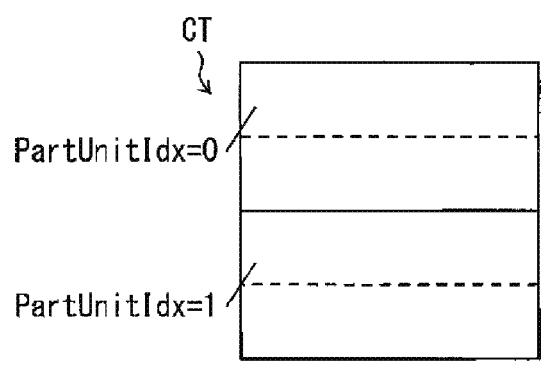
FIGS. 28A and 28B are diagrams, each illustrating an example of a division method for BT division.
Figure 28B:
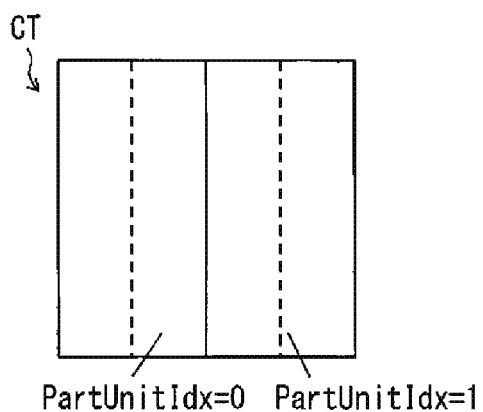

First, in the BT tree, the aspect in which the division method of the next-sibling node is limited to the division method (horizontal division or vertical division) of the parent node and the previous-sibling node. FIGS. 28A and 28B illustrate examples of a division method of BT division.

In the present aspect, as illustrated in FIG. 28A, in a case where the division method of the parent node and the division method of the previous-sibling node are both horizontal division, the division method of the next-sibling node is also limited to horizontal division. On the other hand, as illustrated in FIG. 28B, in a case where the division method of the parent node and the division method of the previous-sibling node are both vertical division, the dividing method of the sibling node is also limited to vertical division.

Processing of BT Information Decoding-1

An operation example of BT information decoding by the CT information decoding unit 10 in the present aspect will be described in detail by referring to FIG. 29. FIG. 29 is a diagram illustrating a configuration example of a syntax table of the BT information according to an embodiment of the disclosure.

In this case, in the image coding apparatus 11, the BT split mode split_bt_mode [x0] [y0] [cbtDepth] or the BT split flag split_bt_flag [x0] [y0] indicating whether to perform the BT division is coded for each coding tree CT.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth, splitConstrain). The initial value of splitConstrain is 0.

In the case where the predetermined condition is not satisfied, the CT information decoding unit 10 derives the BT split mode splitBtMode [x0] [y0] [cbtDepth] as 0.

On the other hand, in the case where the predetermined condition is satisfied, the CT information decoding unit 10 derives splitConstrain.

In a case where the splitConstrain is 0, the CT information decoding unit 10 decodes the BT split mode split_bt_mode [x0] [y0] [cbtDepth] from the coding data and outputs the decoded BT split mode split_bt_mode [x0] [y0] [cbtDepth] as the BT split mode splitBtMode [x0] [y0] [cbtDepth] of the target CT.

On the other hand, in a case where the splitConstrain is other than 0 (=1, 2), the CT information decoding unit 10 decodes the BT split flag split_bt_flag [x0] [y0] from the coding data, and derives the BT split mode splitBtMode [x0] [y0] [cbtDepth] of the target CT based on splitConstrain and the BT split flag split_bt_flag [x0] [y0]. Here, the derivation table of the BT split mode splitBtMode [x0] [y0] [cbtDepth] is as illustrated in FIG. 23.

As illustrated in FIG. 23, the BT split mode splitBtMode [x0] [y0] [cbtDepth] is determined according to the values of splitConstrain and BT split flag split_bt_flag [x0] [y0].

In a case where the BT split mode splitBtMode [x0] [y0] [cbtDepth] is 1, that is, in a case where the division method of the target CT (the parent node seen from the next-sibling node) is horizontal division, the CT information decoding unit 10 decodes the two coding trees CT of log 2CbHeight−1 at the positions (x0, y0), (x0, y1) of the CT layer cbtDepth+1. At this time, splitConstrain=0 is set for the previous-sibling node (x0, y0), and for the next-sibling node (x0, y1), in a case where the BT split mode splitBtMode [x0] [y0] [cbtDepth+1] of the previous-sibling node is 1, that is, in a case where the division method of the previous-sibling node is horizontal division, set splitConstrain=1, that is, the division method of the next-sibling node is limited to horizontal division (FIG. 28A), and in a case where splitBtMode [x0] [y0] [cbtDepth+1] is other than 1 (=0, 2), set splitConstrain=0.

On the other hand, in a case where the BT split mode split_bt_mode [x0] [y0] [cbtDepth] is 2, that is, in a case where the division method of the target CT (the parent node seen from the next-sibling node) is vertical division, the CT information decoding unit 10 decodes the two coding trees CT of log 2CbWidth−1 at the positions (x0, y0), (x1, y0) of the CT layer cbtDepth+1. At this time, splitConstrain=0 is set for the previous-sibling node (x0, y0), and for the next-sibling node (x1, y0), when the BT split mode splitBtMode [x0] [y0] [cbtDepth+1] of the previous-sibling node is 2, that is, when the division method of the previous-sibling node is vertical division, set splitConstrain=2, that is, the division method of the next-sibling node is limited to vertical division (FIG. 28B), and when splitBtMode [x0] [y0] [cbtDepth+1] is other than 2 (=0, 1), set splitConstrain=0.

The CT information decoding unit 10 also performs the same processing in the lower layer coding tree CT to continue the BT information decoding.

Processing of BT Information Decoding-2

Figure 30A:
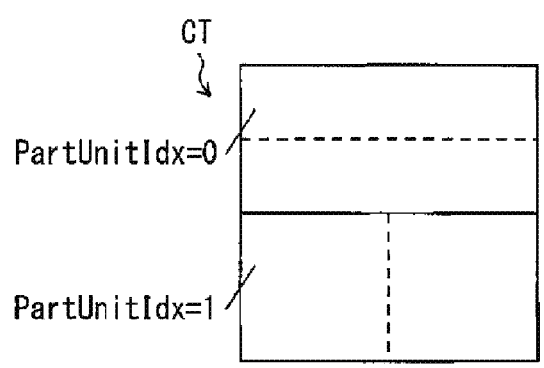
FIGS. 30A and 30B are diagrams, each illustrating an example of a division method for BT division.
Figure 30B:
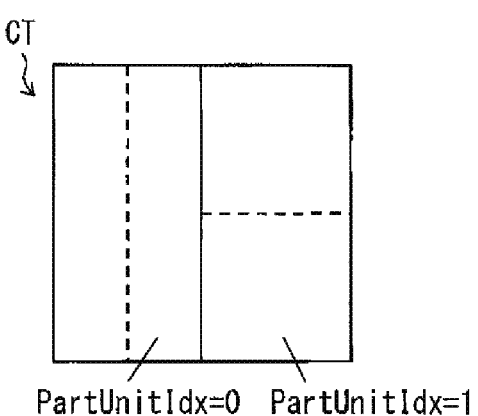

Subsequently, the aspect in which the division method of another coding node (next-sibling node) having the same parent node with the same cbtDepth is limited to a division method different from either the division method (horizontal division or vertical division) of the parent node and the coding node (previous-sibling node) having the same parent node with the same cbtDepth is described below. FIGS. 30A and 30B illustrate an example of a division method of BT division.

In the present aspect, as illustrated in FIG. 30A, in a case where the division method of the parent node and the division method of the previous-sibling node are both horizontal division, the division method of the next-sibling node is limited to vertical division. On the other hand, as illustrated in FIG. 30B, in a case where the division method of the parent node and the division method of the previous-sibling node are both vertical division, the dividing method of the sibling node is limited to horizontal division.

An operation example of BT information decoding by the CT information decoding unit 10 in the present aspect will be described in detail by referring to FIG. 31. FIG. 31 is a diagram illustrating a configuration example of a syntax table of the BT information according to an embodiment of the disclosure.

In this case, in the image coding apparatus 11, the BT split mode split_bt_mode [x0] [y0] [cbtDepth] or the BT split flag split_bt_flag [x0] [y0] indicating whether to perform the BT division is coded for each coding tree CT.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth, splitConstrain). The initial value of splitConstrain is 0.

In the case where the predetermined condition is not satisfied, the CT information decoding unit 10 derives the BT split mode splitBtMode [x0] [y0] [cbtDepth] as 0.

On the other hand, in the case where the predetermined condition is satisfied, the CT information decoding unit 10 decodes the BT split mode split_bt_mode [x0] [y0] [cbtDepth] or the BT split flag split_bt_flag [x0] [y0] as the syntax element.

In a case where the splitConstrain is 0, the CT information decoding unit 10 decodes the BT split mode split_bt_mode [x0] [y0] [cbtDepth] from the coding data and outputs the decoded BT split mode split_bt_mode [x0] [y0] [cbtDepth] as the BT split mode splitBtMode [x0] [y0] [cbtDepth] of the target CT.

On the other hand, in a case where the splitConstrain is other than 0 (=1, 2), the CT information decoding unit 10 decodes the BT split flag split_bt_flag [x0] [y0] from the coding data, and derives the BT split mode splitBtMode [x0] [y0] [cbtDepth] of the target CT based on splitConstrain and the BT split flag split_bt_flag [x0] [y0]. Here, the derivation table of the BT split mode splitBtMode [x0] [y0] [cbtDepth] is as illustrated in FIG. 23.

As illustrated in FIG. 23, the BT split mode splitBtMode [x0] [y0] [cbtDepth] is determined according to the values of splitConstrain and BT split flag split_bt_flag [x0] [y0].

When the BT split mode splitBtMode [x0] [y0] [cbtDepth] is 1, that is, when the division method of the target CT (the parent node seen from the next-sibling node) is horizontal division, the CT information decoding unit 10 decodes the two coding trees CT of log 2CbHeight−1 at the positions (x0, y0), (x0, y1) of the CT layer cbtDepth+1. At this time, splitConstrain=0 is set for the previous-sibling node (x0, y0), and for the next-sibling node (x0, y1), when the BT split mode splitBtMode [x0] [y0] [cbtDepth+1] of the previous-sibling node is 1, that is, when the division method of the previous-sibling node is horizontal division, set splitConstrain=2, that is, the split method of the next-sibling node is limited to vertical division (FIG. 31A), and when splitBtMode [x0] [y0] [cbtDepth+1] is other than 1 (=0, 2), set splitConstrain=0.

On the other hand, in a case where the BT split mode split_bt_mode [x0] [y0] [cbtDepth] is 2, that is, in a case where the division method of the target CT (the parent node seen from the next-sibling node) is vertical division, the CT information decoding unit 10 decodes the two coding trees CT of log 2CbWidth−1 at the positions (x0, y0), (x1, y0) of the CT layer cbtDepth+1. At this time, splitConstrain=0 is set for the previous-sibling node (x0, y0), and for the next-sibling node (x1, y0), in a case where the BT split mode splitBtMode [x0] [y0] [cbtDepth+1] of the previous-sibling node is 2, that is, in a case where the division method of the previous-sibling node is vertical division, set splitConstrain=1, that is, the division method of the next-sibling node is limited to horizontal division (FIG. 31B), and in a case where splitBtMode [x0] [y0] [cbtDepth+1] is other than 2 (=0, 1), set splitConstrain=0.

The CT information decoding unit 10 also performs the same processing in the lower layer coding tree CT to continue the BT information decoding.

As in the above description, one syntax split_bt_mode may be used without distinguishing the syntax of divide information into split_bt_flag and split_bt_mode, and both may be distinguished from binary representation.

Fourth Embodiment

The division method for the BT division may be limited according to an aspect ratio of the target CT. In the present embodiment, an aspect is described that, in a case where the aspect ratio (height/width) of the target CT is horizontally large, that is, the width of the target CT is not less than a predetermined value (for example, width>=8*height), horizontal division where the aspect ratio is 1:16 is prohibited and only the vertical division is allowed, and in a case where the aspect ratio of the target CT is vertically long, that is, the height of the target CT is not less than a predetermined value (for example, height>=8*width), vertical division where the aspect ratio is 16:1 is prohibited and only the horizontal division is allowed.

Note that it does not exceed the range of the predetermined value when the aspect ratio is limited, thus, it is limited only to vertical division in a case where the width of the target CT is a predetermined value (for example, width==8*height), and it is limited only to horizontal division in a case where the height of the target CT is a predetermined value (for example, height==8*width).

Processing of BT Information Decoding-1

An operation example of BT information decoding by the CT information decoding unit 10 in the present aspect will be described in detail by referring to FIG. 32. FIG. 32 is a diagram illustrating a configuration example of a syntax table of the BT information according to an embodiment of the disclosure.

In this case, in the image coding apparatus 11, the BT split mode split_bt_mode [x0] [y0] [cbtDepth] or the BT split flag split_bt_flag [x0] [y0] indicating whether to perform the BT division is coded for each coding tree CT.

The CT information decoding unit 10 decodes the BT information from the coding data and recursively decodes the coding tree CT (coding_binarytree). Specifically, the CT information decoding unit 10 decodes the target coding tree coding_binarytree (x0, y0, log 2CbWidth, log 2CbHeight, cqtDepth, cbtDepth, splitConstrain). The initial value of splitConstrain is 0.

In the case where the predetermined condition is not satisfied, the CT information decoding unit 10 derives the BT split mode splitBtMode [x0] [y0] as 0.

On the other hand, in the case where the predetermined condition is satisfied, the CT information decoding unit 10 decodes the BT split mode split_bt_mode [x0] [y0] [cbtDepth] or the BT split flag split_bt_flag [x0] [y0] as the syntax element.

In a case where the splitConstrain is 0, the CT information decoding unit 10 decodes the BT split mode split_bt_mode [x0] [y0] [cbtDepth] from the coding data and sets the decoded BT split mode split_bt_mode [x0] [y0] as BT split mode splitBtMode [x0] [y0] of the target CT.

On the other hand, in a case where the splitConstrain is other than 0 (=1, 2), the CT information decoding unit 10 decodes the BT split flag split_bt_flag [x0] [y0] from the coding data, and derives the BT split mode splitBtMode [x0] [y0] of the target CT based on splitConstrain and the BT split flag split_bt_flag [x0] [y0]. Here, the derivation table of the BT split mode splitBtMode [x0] [y0] is as illustrated in FIG. 23.

As illustrated in FIG. 23, the BT split mode splitBtMode [x0] [y0] is determined according to the respective value of splitConstrain and BT split flag split_bt_flag [x0] [y0].

In a case where the BT split mode splitBtMode [x0] [y0] is 1, the CT information decoding unit 10 decodes two coding trees CT with logarithmic height log 2CbHeight−1 at the positions (x0, y0) and (x0, y1) of the CT layer cbtDepth+1. In this case, if the width of the target CT is more than four times the height (log 2CbWidth>=log 2CbHeight+2), that is, the width of the CT after horizontal division is eight times or more the height, if the CT is further divided, the aspect ratio becomes 16:1. Therefore, in a case where the CT is further divided, set splitConstrain=2 since it is limited only to vertical division, in other case, set splitConstrain=0.

On the other hand, in a case where the BT split mode split_bt_mode [x0] [y0] is 2, the CT information decoding unit 10 decodes the two coding trees CT with logarithmic width log 2CbWidth−1 at the positions (x0, y0), (x1, y0) of the CT layer cbtDepth+1. In this case, if the height of the target CT is more than four times the width (log 2CbHeight>=log 2CbWidth+2), that is, the height of the CT after vertical division is eight times or more the width, the aspect ratio becomes 1:16 in a case where the CT is further divided. Therefore, when the CT is further divided, set splitConstrain=1 since it is limited only to horizontal division, in other case, set splitConstrain=0.

Note that, the determination of log 2CbWidth>=log 2CbHeight+2, log 2CbHeight>=log 2CbWidth+2 may respectively be log 2CbWidth==log 2CbHeight+2, log 2CbHeight==log 2CbWidth+2.

The CT information decoding unit 10 also performs the same processing in the lower layer coding tree CT to continue the BT information decoding.

Processing of BT Information Decoding-2

The restriction on the BT division according to the aspect ratio of the target CT may be performed when the slice-type is I slice. Hereinafter, an aspect in which the BT division is limited according to the aspect ratio when the slice-type is I slice will be described.

An operation example of BT information decoding by the CT information decoding unit 10 in the present aspect will be described in detail by referring to FIG. 33. FIG. 33 is a diagram illustrating a configuration example of a syntax table of the BT information according to an embodiment of the disclosure. Hereinafter, only portions different from the syntax table illustrated in FIG. 32 will be described, and descriptions of other portions will be omitted.

The processing until the CT information decoding unit 10 derives the BT split mode splitBtMode [x0] [y0] is the same as the processing using the syntax table of FIG. 32. After the CT information decoding unit 10 derives the BT split mode splitBtMode [x0] [y0], in the present aspect, in a case where the BT split mode splitBtMode [x0] [y0] is 1, the CT information decoding unit 10 decodes two coding trees CT of log 2CbHeight−1 at the positions (x0, y0) and (x0, y1) of the CT layer cbtDepth+1 In this case, if the width of the target CT is more than four times the height, that is, the width of the CT after horizontal division is eight times or more the height, the aspect ratio becomes 16:1 in a case where CT is further divided. Therefore, in the case where the width of the target CT is more than 4 times the height and the slice-type is I slice (log 2CbWidth>=log 2CbHeight+2) && slice_type==I_SLICE), set splitConstrain=2, in other case, set splitConstrain=0.

On the other hand, when the BT split mode split_bt_mode [x0] [y0] is 2, the CT information decoding unit 10 decodes the two coding trees CT of log 2CbWidth−1 at the positions (x0, y0), (x1, y0) of the CT layer cbtDepth+1. In this case, if the height of the target CT is more than four times the width, that is, the height of the CT after vertical division is eight times or more the width, the aspect ratio becomes 1:16 when the CT is further divided. Therefore, in the case where the height of the target CT is more than 4 times the width and the slice-type is I slice (log 2CbHeight>=log 2CbWidth+2) && slice_type==I_SLICE), set splitConstrain=1, in other case, set splitConstrain=0.

The determination of log 2CbWidth>=log 2CbHeight+2, log 2CbHeight>=log 2CbWidth+2 may respectively be log 2CbWidth==log 2CbHeight+2, log 2CbHeight==log 2CbWidth+2.

The CT information decoding unit 10 also performs the same processing in the lower layer coding tree CT to continue the BT information decoding.

In the above description, the aspect of prohibiting the BT division in which the aspect ratio is 1:16 or 16:1 is illustrated, but the present embodiment is not limited to this. For example, BT division may be prohibited in which the aspect ratio is 1:8 or 8:1.

Note that, in the above description, the configuration in which the BT division for both of the two nodes is limited according to the aspect ratio has been described above, but the present embodiment is not limited to this. For example, the BT division may be limited according to the aspect ratio in only the previous-sibling or the previous-sibling node.

Fifth Embodiment

In the first to third embodiments described above, it is preferable that the coding efficiency does not decrease while the complexity of coding/decoding is reduced. Therefore, in the present embodiment, the BT division is limited according to the BT depth.

In the present embodiment, by limiting the BT division according to the BT depth, the reduction of coding efficiency due to the restriction of the BT division pattern can be suppressed. Therefore, in the present embodiment, the complexity of coding/decoding can be reduced while suppressing the influence on coding efficiency.

Specific aspects include, an aspect in which the BT division is limited in the first to third embodiments in a case where the BT depth is greater than the threshold value, and an aspect in which the BT division is limited according to the maximum BT depth max_bt_depth set for each Temporal ID (temporal layer, prediction layer) in the BT tree. Temporal ID is a value indicating the depth of reference between pictures, and is allocated to each picture. In a case of coding/decoding a picture with a Temporal ID TID_curr, there is a restriction that only reference pictures whose Temporal ID is not greater than TID_curr can be referred to. Pictures with a small Temporal ID are often referred to by subsequent pictures, thus have the property of being important in coding efficiency. In addition, using Temporal ID, when playing pictures intermittently, high-speed playback is possible by restricting playback to pictures below a specific Temporal ID.

First, in the case where the BT depth is greater than the threshold value, the aspect in which the BT division is limited in the first to third embodiments will be described below.

Processing of BT Information Decoding-1

First, in the case where the BT depth is greater than the threshold value, an aspect in which the BT division using the syntax table of FIG. 15 is limited will be described below. FIG. 34 is a diagram illustrating a configuration example of a syntax table of the BT information according to an embodiment of the disclosure. Hereinafter, only portions different from the syntax table illustrated in FIG. 15 will be described, and descriptions of other portions will be omitted.

The processing until the CT information decoder 10 decodes the BT split flag split_bt_flag [x0] [y0] is the same as the processing using the syntax table of FIG. 15. After the CT information decoding unit 10 decodes the BT split flag split_bt_flag [x0] [y0], in the present aspect, in a case where cbtDepth<=TH and the BT split flag split_bt_flag [x0] [y0] is other than 0 (=1), the CT information decoding unit 10 decodes the BT division direction flag split_dir_flag [x0] [y0] [cbtDepth]. Here, TH is a threshold value of the BT depth in the case where the BT division is limited.

The CT information decoding unit 10 derives the BT split mode splitBtMode [x0] [y0] [cbtDepth] of the target CT based on the decoded BT division direction flag split_dir_flag [x0] [y0] and the BT split flag split_bt_flag [x0] [y0]. The subsequent processing is the same as the processing using the syntax table of FIG. 15.

Note that in a case where cbtDepth>TH and the BT split flag split_bt_flag [x0] [y0] is other than 0 (=1), the CT information decoding unit 10 derives the BT split flag split_dir_flag [x0] [y0] [cbtDepth−1] of the parent node stored in the memory as split_dir_flag [x0] [y0] [cbtDepth] of the target CT.

As described above, in the present aspect, in the case where the BT depth of the target CT is greater than the threshold TH, the division method of the target CT (child node) is limited to the division method (horizontal division or vertical division) of the parent node.

Processing of BT Information Decoding-2

Subsequently, in the case where the BT depth is greater than the threshold value, an aspect in which the BT division using the syntax table of FIG. 17 is limited will be described below. FIG. 35 is a diagram illustrating a configuration example of a syntax table of the BT information according to an embodiment of the disclosure. Hereinafter, only portions different from the syntax table illustrated in FIG. 17 will be described, and descriptions of other portions will be omitted.

In the present aspect, in a case where the splitConstrain is 0 or cbtDepth<=TH, the CT information decoding unit 10 decodes the BT split mode split_bt_mode [x0] [y0] from the coding data and sets the decoded BT split mode split_bt_mode [x0] [y0] as BT split mode splitBtMode [x0] [y0] of the target CT. The subsequent processing is the same as the processing using the syntax table of FIG. 17.

Note that, in a case where the splitConstrain is other than 0 (=1, 2) and cbtDepth>TH, the CT information decoding unit 10 decodes the BT split flag split_bt_flag [x0] [y0] from the coding data, and derives the BT split mode splitBtMode [x0] [y0] of the target CT based on splitConstrain and the BT split flag split_bt_flag [x0] [y0].

As described above, in the present aspect, in the case where the BT depth of the target CT is greater than the threshold TH, the division method of the target CT (child node) is limited to the division method (horizontal division or vertical division) of the parent node.

Processing of BT Information Decoding-3

Subsequently, in the case where the BT depth is greater than the threshold value, an aspect in which the BT division using the syntax table of FIG. 19 is limited will be described below. FIG. 36 is a diagram illustrating a configuration example of a syntax table of the BT information according to an embodiment of the disclosure. Hereinafter, only portions different from the syntax table illustrated in FIG. 19 will be described, and descriptions of other portions will be omitted.

In a case where the predetermined condition is satisfied and cbtDepth<=TH, the CT information decoding unit 10 decodes the BT split mode split_bt_mode [x0] [y0] from the coding data, and sets the decoded BT split mode split_bt_mode [x0] [y0] as the BT split mode splitBtMode [x0] [y0] [cbtDepth] of the target CT.

On the other hand, in a case where the predetermined condition is satisfied and other than cbtDepth<=TH (=cbtDepth>TH), the CT information decoding unit 10 decodes the BT split flag split_bt_flag [x0] [y0] from the coding data and derives the BT split mode splitBtMode [x0] [y0] [cbtDepth] of the target CT based on the BT split mode splitBtMode [x0] [y0] [cbtDepth-1] and the BT split flag split_bt_flag [x0] [y0] of the parent node. The subsequent processing is the same as the processing using the syntax table of FIG. 19.

As described above, in the present aspect, in the case where the BT depth of the target CT is greater than the threshold TH, the division method of the target CT (child node) is limited to the division method (horizontal division or vertical division) of the parent node.

Processing of BT Information Decoding-4

Subsequently, in the case where the BT depth is greater than the threshold value, an aspect in which the BT division using the syntax table of FIG. 22 is limited will be described below. FIG. 37 is a diagram illustrating a configuration example of a syntax table of the BT information according to an embodiment of the disclosure. Hereinafter, only portions different from the syntax table illustrated in FIG. 22 will be described, and descriptions of other portions will be omitted.

The processing until the CT information decoding unit 10 derives the BT split mode splitBtMode [x0] [y0] [cbtDepth] is the same as the processing using the syntax table of FIG. 22. After the CT information decoding unit 10 derives the BTsplit mode splitBtMode [x0] [y0] [cbtDepth], in the present aspect, in a case where the BT split mode splitBtMode [x0] [y0] [cbtDepth] is 1, the CT information decoding unit 10 decodes two coding trees CT of log 2CbHeight-1 at the positions (x0, y0) and (x0, y1) of the CT layer cbtDepth+1. At this time, splitConstrain=0 for the previous-sibling node (x0, y0). For the next sibling node (x0, y1), when cbtDepth>TH, set splitConstrain to BT split mode splitBtMode [x0] [y0] [cbtDepth+1] of the previous-sibling node, and when other than cbtDepth>TH (cbtDepth<=TH), Set splitConstrain=0.

On the other hand, in a case where the BT split mode split_bt_mode [x0] [y0] [cbtDepth] is 2, the CT information decoding unit 10 decodes the two coding trees CT of log 2CbWidth-1 at the positions (x0, y0), (x1, y0) of the CT layer cbtDepth+1. At this time, splitConstrain=0 for the previous-sibling node (x0, y0). For the next sibling node (x1, y0), in a case where cbtDepth>TH, set splitConstrain to BT split mode splitBtMode [x0] [y0] [cbtDepth+1] of the previous-sibling node, and in a case where cbtDepth>TH (cbtDepth<=TH), Set splitConstrain=0.

As described above, in the present aspect, in the case where the BT depth of the target CT is greater than the threshold TH, the division method of the next-sibling node is limited to the division method (horizontal division or vertical division) of the previous-sibling node.

Processing of BT Information Decoding-5

Subsequently, in the case where the BT depth is greater than the threshold value, an aspect in which the BT division using the syntax table of FIG. 25 is limited will be described below. FIG. 38 is a diagram illustrating a configuration example of a syntax table of the BT information according to an embodiment of the disclosure. Hereinafter, only portions different from the syntax table illustrated in FIG. 25 will be described, and descriptions of other portions will be omitted.

The processing until the CT information decoding unit 10 derives the BT split mode splitBtMode [x0] [y0] [cbtDepth] is the same as the processing using the syntax table of FIG. 25. After the CT information decoding unit 10 derives the BT split mode splitBtMode [x0] [y0] [cbtDepth], in the present aspect, in a case where the BT split mode splitBtMode [x0] [y0] [cbtDepth] is 1, the CT information decoding unit 10 decodes two coding trees CT of log 2CbHeight-1 at the positions (x0, y0) and (x0, y1) of the CT layer cbtDepth+1 At this time, splitConstrain=0 is set for the previous-sibling node (x0, y0), and for the next-sibling node (x0, y1), when the BT split mode splitBtMode [x0] [y0] [cbtDepth+1] of the previous-sibling node is other than 0 (=1, 2) and cbtDepth>TH, set splitConstrain=3-splitBtMode [x0] [y0] [cbtDepth+1], when the BT split mode splitBtMode [x0] [y0] [cbtDepth+1] of the previous-sibling node is 0 or other than cbtDepth>TH (cbtDepth<=TH), set splitConstrain=0.

On the other hand, in a case where the BT split mode split_bt_mode [x0] [y0] [cbtDepth] is 2, the CT information decoding unit 10 decodes the two coding trees CT of log 2CbWidth-1 at the positions (x0, y0), (x1, y0) of the CT layer cbtDepth+1. At this time, splitConstrain=0 is set for the previous-sibling node (x0, y0), and for the next-sibling node (x1, y0), in a case where the BT split mode splitBtMode [x0] [y0] [cbtDepth+1] of the previous-sibling node is other than 0 (=1, 2) and cbtDepth>TH, set splitConstrain=3-splitBtMode [x0] [y0] [cbtDepth+1], in a case where the BT split mode splitBtMode [x0] [y0] [cbtDepth+1] of the previous-sibling node is 0 or other than cbtDepth>TH (cbtDepth<=TH), set splitConstrain=0.

As described above, in the present aspect, in the case where the BT depth of the target CT is greater than the threshold TH, the division method of the next-sibling node is limited to a division method different from the division method (horizontal division or vertical division) of the previous-sibling node.

Processing of BT Information Decoding-5

Subsequently, in the case where the BT depth is greater than the threshold value, an aspect in which the BT division using the syntax table of FIG. 27 is limited will be described below. FIG. 39 is a diagram illustrating a configuration example of a syntax table of the BT information according to an embodiment of the disclosure. Hereinafter, only portions different from the syntax table illustrated in FIG. 27 will be described, and descriptions of other portions will be omitted.

The processing until the CT information decoding unit 10 derives the BT split mode split_bt_mode [x0] [y0] [cbtDepth] is the same as the processing using the syntax table of FIG. 27. After the CT information decoding unit 10 derives the BT split mode split_bt_mode [x0] [y0] [cbtDepth], in the present aspect, when the BT split mode split_bt_mode [x0] [y0] [cbtDepth] is 1, the CT information decoding unit 10 decodes two coding trees CT of log 2CbHeight−1 at the positions (x0, y0) and (x0, y1) of the CT layer cbtDepth+1. At this time, splitConstrain=0 is set for the previous-sibling node (x0, y0), and for the next-sibling node (x0, y1), when the BT split mode split_bt_mode [x0] [y0] [cbtDepth+1] of the previous-sibling node is other than 0 (=1, 2) and cbtDepth>TH, set splitConstrain=1, when the BT split mode split_bt_mode [x0] [y0] [cbtDepth+1] of the previous-sibling node is 0 or other than cbtDepth>TH (cbtDepth<=TH), set splitConstrain=0.

On the other hand, when the BT split mode split_bt_mode [x0] [y0] [cbtDepth] is 2, the CT information decoding unit 10 decodes the two coding trees CT of log 2CbWidth−1 at the positions (x0, y0), (x1, y0) of the CT layer cbtDepth+1. At this time, splitConstrain=0 is set for the previous-sibling node (x0, y0), and for the next-sibling node (x1, y0), when the BT split mode split_bt_mode [x0] [y0] [cbtDepth+1] of the previous-sibling node is other than 0 (=1, 2) and cbtDepth>TH, set splitConstrain=1, when the BT split mode split_bt_mode [x0] [y0] [cbtDepth+1] of the previous-sibling node is 0 or cbtDepth<=TH, set splitConstrain=0.

As described above, in the present aspect, in the case where the BT depth of the target CT is greater than the threshold TH, if the previous-sibling node is BT divided, BT division of the next-sibling node which has the same BT split mode as split_bt_mode [x0] [y0] [cbtDepth+1] is prohibited.

Processing of BT Information Decoding-6

Subsequently, in the case where the BT depth is greater than the threshold value, an aspect in which the BT division using the syntax table of FIG. 29 is limited will be described below. FIG. 40 is a diagram illustrating a configuration example of a syntax table of the BT information according to an embodiment of the disclosure. Hereinafter, only portions different from the syntax table illustrated in FIG. 29 will be described, and descriptions of other portions will be omitted.

The processing until the CT information decoding unit 10 derives the BT split mode splitBtMode [x0] [y0] [cbtDepth] is the same as the processing using the syntax table of FIG. 29. After the CT information decoding unit 10 derives the BT split mode splitBtMode [x0] [y0] [cbtDepth], in the present aspect, when the BT split mode splitBtMode [x0] [y0] [cbtDepth] is 1, the CT information decoding unit 10 decodes two coding trees CT of log 2CbHeight−1 at the positions (x0, y0) and (x0, y1) of the CT layer cbtDepth+1. At this time, splitConstrain=0 is set for the previous-sibling node (x0, y0), and for the next-sibling node (x0, y1), when the BT split mode splitBtMode [x0] [y0] [cbtDepth+1] of the previous-sibling node is 1 and cbtDepth>TH, set splitConstrain=1, when the BT split mode splitBtMode [x0] [y0] [cbtDepth+1] of the previous-sibling node is other than 0 (=1, 2) or cbtDepth<=TH, set splitConstrain=0.

On the other hand, when the BT split mode split_bt_mode [x0] [y0] [cbtDepth] is 2, the CT information decoding unit 10 decodes the two coding trees CT of log 2CbWidth−1 at the positions (x0, y0), (x1, y0) of the CT layer cbtDepth+1. At this time, splitConstrain=0 is set for the previous-sibling node (x0, y0), and for the next-sibling node (x1, y0), when the BT split mode splitBtMode [x0] [y0] [cbtDepth+1] of the previous-sibling node is 2 and cbtDepth>TH, set splitConstrain=2, when the BT split mode splitBtMode [x0] [y0] [cbtDepth+1] of the previous-sibling node is other than 2 (=0, 1) or cbtDepth<=TH, set splitConstrain=0.

As described above, in the present aspect, in the case where the BT depth of the target CT is greater than the threshold TH, the division method of the next-sibling node is limited to the division method (horizontal division or vertical division) of the parent node and the previous-sibling node.

Processing of BT Information Decoding-7

Subsequently, in the case where the BT depth is greater than the threshold value, an aspect in which the BT division using the syntax table of FIG. 31 is limited will be described below. FIG. 41 is a diagram illustrating a configuration example of a syntax table of the BT information according to an embodiment of the disclosure. Hereinafter, only portions different from the syntax table illustrated in FIG. 31 will be described, and descriptions of other portions will be omitted.

The processing until the CT information decoding unit 10 derives the BT split mode splitBtMode [x0] [y0] [cbtDepth] is the same as the processing using the syntax table of FIG. 31. After the CT information decoding unit 10 derives the BT split mode splitBtMode [x0] [y0] [cbtDepth], in the present aspect, when the BT split mode splitBtMode [x0] [y0] [cbtDepth] is 1, the CT information decoding unit 10 decodes two coding trees CT of log 2CbHeight−1 at the positions (x0, y0) and (x0, y1) of the CT layer cbtDepth+1. At this time, splitConstrain=0 is set for the previous-sibling node (x0, y0), and for the next-sibling node (x0, y1), when the BT split mode splitBtMode [x0] [y0] [cbtDepth+1] of the previous-sibling node is 1 and cbtDepth>TH, set splitConstrain=2, when the BT split mode splitBtMode [x0] [y0] [cbtDepth+1] of the previous-sibling node is other than 1 (=0, 2) or other than cbtDepth>TH (cbtDepth<=TH), set splitConstrain=0.

On the other hand, when the BT split mode split_bt_mode [x0] [y0] [cbtDepth] is 2, the CT information decoding unit 10 decodes the two coding trees CT of log 2CbWidth−1 at the positions (x0, y0), (x1, y0) of the CT layer cbtDepth+1. At this time, splitConstrain=0 is set for the previous-sibling node (x0, y0), and for the next-sibling node (x1, y0), when the BT split mode splitBtMode [x0] [y0] [cbtDepth+1] of the previous-sibling node is 2 and cbtDepth>TH, set splitConstrain=1, when the BT split mode splitBtMode [x0] [y0] [cbtDepth+1] of the previous-sibling node is other than 2 (=0, 1) or other than cbtDepth>TH (cbtDepth<=TH), set splitConstrain=0.

As described above, in the present aspect, in the case where the BT depth of the target CT is greater than the threshold TH, the division method of the next-sibling node is limited to a division method different from the division method (horizontal division or vertical division) of the parent node and the previous-sibling node.

Restriction of BT Division

An aspect in which the BT division is limited according to the maximum BT depth max_bt_depth set for each Temporal ID (temporal layer, prediction layer) in the BT tree will be described below.

In the present embodiment, the maximum BT depth max_bt_depth is set for each Temporal ID. For this maximum BT depth max_bt_depth, a value obtained by subtracting an offset value (for example, Temporal ID itself) corresponding to each Temporal ID from the default value is set. As this default value, a value not less than the maximum value of Temporal ID can be arbitrarily selected. In addition, the offset value can be arbitrarily selected from values below the default value.

Figure 42:
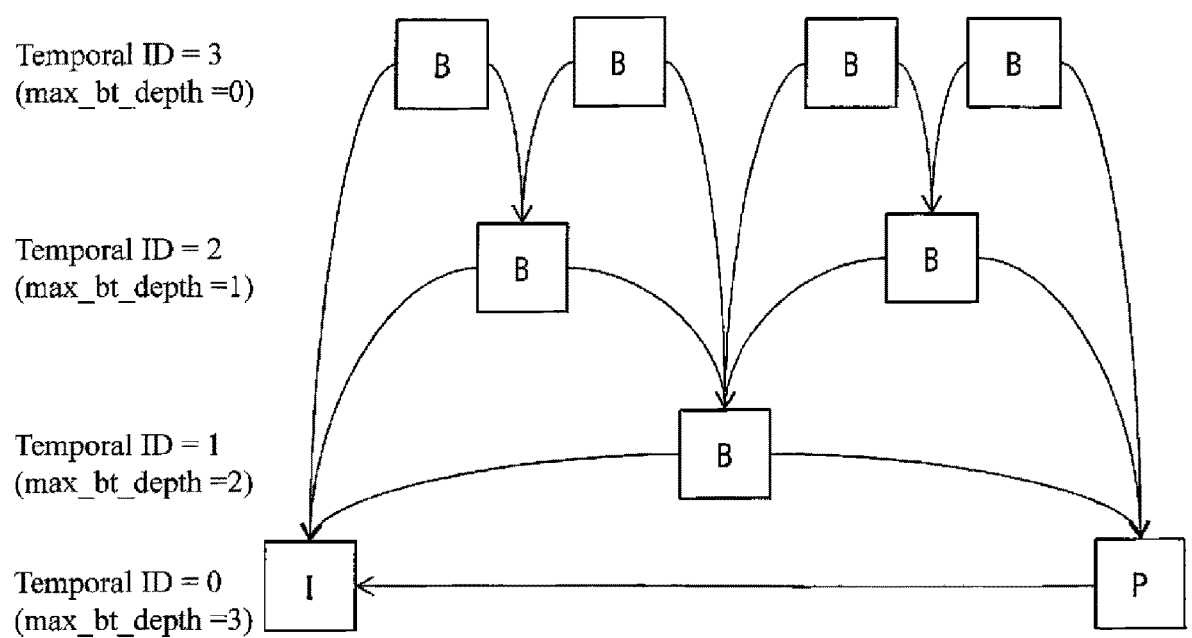
FIG. 42 is a diagram illustrating an example of setting the maximum BT depth for each Temporal ID in a BT tree.

FIG. 42 illustrates an example of setting the maximum BT depth max_bt_depth for each Temporal ID in the BT tree. In this figure, if default value=3, max_bt_depth=default value−Temporal ID=3 in Temporal ID=0. That is, at Temporal ID=0, BT division can be performed three times. On the other hand, in Temporal ID=1, max_bt_depth=default value−Temporal ID=2, thus the BT division can be executed twice, and in Temporal ID=2, max_bt_depth=default value−Temporal ID=1 Therefore, thus BT division can be performed once. In Temporal ID=3, max_bt_depth=default value−Temporal ID=0, thus BT division cannot be performed and becomes the last layer of the BT tree.

In this way, by setting the maximum BT depth max_bt_depth for each Temporal ID, the layer of the BT division can be limited.

Sequence Parameter Set (SPS)

Coding parameters (CTU size, minimum QT size, maximum BT size, maximum BT depth, and the like) referred to by the image decoding apparatus 31 for decoding the above-described CT information are transmitted using a sequence parameter set (SPS). FIG. 43 illustrates an example syntax structure for SPS.

As illustrated in FIG. 43, in the SPS, a set of coding parameters to be referred to by the image decoding apparatus 31 for decoding the CT information is defined. Here, as can be seen from this figure, minimum QT size (log 2_min QT_. . . ), maximum BT size (log 2_max_bt_size_. . . ), and maximum BT depth (max_bt_depth . . . ), are defined for I-slice brightness (Luma), I-slice chrominance (Chroma), and others (P, B slice), respectively.

The maximum BT depth max_bt_depth for each Temporal ID in the BT tree described above can also be coded in the SPS. In the figure, as a parameter indicating the maximum BT depth for each Temporal ID, the maximum BT depth max_bt_depth_i_slice_luma_minus2 [i] for the luminance of the I slice, the maximum BT depth max_bt_depth_i_slice_chroma_minus2 [i] for the chrominance of the I slice, and the maximum BT depth max_bt_depth_minus2 [i] for the others (P, B slice) are coded. The alphabet i indicates the corresponding Temporal ID.

For example, in a case of setting the maximum BT depth to 4 when Temporal ID is 0, setting the maximum BT depth to 3 when Temporal ID is 1 to 3, and setting the maximum BT depth to 2 when Temporal ID is 4, the parameter indicating the maximum BT depth is set as follows.

max_bt_depth_i_slice_luma_minus2 [0]=4
max_bt_depth_i_slice_chroma_minus2 [0]=4
max_bt_depth_minus2 [0]=4
max_bt_depth_i_slice_luma_minus2 [1]=3
max_bt_depth_i_slice_chroma_minus2 [1]=3
max_bt_depth_minus2 [1]=3
max_bt_depth_i_slice_luma_minus2 [2]=3
max_bt_depth_i_slice_chroma_minus2 [2]=3
max_bt_depth_minus2 [2]=3
max_bt_depth_i_slice_luma_minus2 [3]=3
max_bt_depth_i_slice_chroma_minus2 [3]=3
max_bt_depth_minus2 [3]=3
max_bt_depth_i_slice_luma_minus2 [4]=2
max_bt_depth_i_slice_chroma_minus2 [4]=2
max_bt_depth_minus2 [4]=2

Coder Constraint

In the following, an aspect in which the division restriction is performed according to a skip depth SKIP_DEPTH, which is a threshold value set for each Temporal ID in the coding parameter determination unit 110, will be described. The coding parameter determination unit 110 determines whether to calculate the cost of a set of coding parameters obtained by further dividing the CU, that is, whether further division of the CU is limited based on the skip depth SKIP_DEPTH which is the threshold value related to division layers (for example, CT layer or BT depth). In the present embodiment, the skip depth SKIP_DEPTH is set for each Temporal ID.

For example, in a case where the Temporal ID is less than the predetermined threshold value (0, 1 or 2), the coding parameter determination unit 110 sets the skip depth SKIP_DEPTH to 3. Then, if the BT division number BTDepth of the CU is not less than three (BTDepth>=SKIP_DEPTH (=3)), the coding parameter determination unit 110 restricts the further division of the CU, that is, the coding parameter determination unit 110 do not calculate the cost. Further, in a case where the Temporal ID is not less than the predetermined threshold value (3 or 4), the coding parameter determination unit 110 sets the skip depth SKIP_DEPTH to 2. If the BT division number of the block is two or more (BTDepth>=SKIP_DEPTH (=2)), the coding parameter determination unit 110 restricts the further division of the CU.

Note that the further division of the CU may be limited only in a case where the prediction mode in the set of coding parameters for which the cost value is the minimum for the CU before division is the skip mode.

In this way, by setting the skip depth SKIP_DEPTH for each Temporal ID, the number of the sets of coding parameters for calculating the cost decreases, and the processing amount related to coding is reduced.

Coder Constraint 2

Subsequently, an aspect in which the skip depth SKIP_DEPTH is set according to the distance d between the coding target image and the reference image in the coding parameter determination unit 110 will be described.

The coding parameter determination unit 110 sets the skip depth SKIP_DEPTH which is the threshold of the division layer according to whether the distance d is equal to or less than the threshold value TH. Specifically, the skip depth SKIP_DEPTH when the distance d is not greater than the threshold TH, that is, when the coding target image and the reference image are closed, is set to a value less than the skip depth SKIP_DEPTH when the distance d is greater than the threshold TH, that is, when the coding target image and the reference image are distant. For example, when the threshold value TH is set to 2, in a case where the distance d between the coding target image and the reference image is not greater than 2 (a case where d<=TH), the coding parameter determination unit 110 sets the skip depth SKIP_DEPTH to 2. In addition, in a case where the distance d is not less than 3 (a case where d<=TH is not established), the coding parameter determination unit 110 sets the skip depth SKIP_DEPTH to 3. From the above, when the reference image is close, by setting the skip depth SKIP_DEPTH relatively small, the division layer is limited to be small. As a result, the processing amount related to coding is reduced.

Here, when calculating the distance between the coding target image and the reference image, in a case where there are a plurality of reference images to be referred to by the target image, the value in the case of the minimum distance among the reference images is set as the distance. That is, the distance d between the coding target image and the reference image is the less of the distance between the target image including the CU and the reference image indicated by the reference picture indexes refIdxL0, refIdxL1 of the CU. Further, the reference image used for deriving the distance is not limited to the image directly referred to by the target CU (the reference image indicated by the reference picture index refIdxL0, refIdxL1), but also may include the entire set of reference images (for example, reference images included in the list) that can be referred to by the target image. For example, in FIG. 4B, even in a case where the target block on the target image B3 refers to P1, B2 as the reference picture index refIdxL0, refIdxL1, the distance is calculated for the image I0 that can be referred to by the target image B3 and the minimum value among them may be set as the distance d. As a method of calculating the distance, there is a method of obtaining a difference absolute value of POC which is the display time of the image. For example, in FIG. 4A, the distance between P1 and I0 is |4−0|1=4 and the distance between B2 and P1 is |2−4|=2.

Note that the method of restricting the division of the CU according to the skip depth SKIP_DEPTH and the division layer of the target CU is not limited to a method that does not always divide in the case where the CU division layer (for example, the BT layer) is not less than the skip depth SKIP_DEPTH. For example, it may be limited to a case where the prediction mode (the prediction mode in the set of coding parameters having the minimum cost value for the reference CU which is the CU before division) of the reference CU which is the parent CU of the target CU is the skip mode. That is, it may be selected not to perform the cost derivation and not to divide further, only to limit to the case where the CU division layer (for example, the BT layer) is not less than the skip depth SKIP_DEPTH and the prediction mode of the reference CU is the skip mode.

In this way, by setting the skip depth SKIP_DEPTH according to the distance d between the coding target image and the reference image, the number of the sets of coding parameters for calculating the cost decreases, and the processing amount related to coding is reduced.

Sixth Embodiment

In the first to third embodiments described above, it is preferable that the coding efficiency does not decrease while the complexity of coding/decoding is reduced. Therefore, in the present embodiment, the BT division is limited according to the target CT size. Specifically, the BT division in the first to third embodiments is limited in a case where the target CT size (1<<log 2CbWidth, 1<<log 2CbHeight) is less than the threshold value TH.

In the present embodiment, by restricting the BT division according to the target CT size, the restriction of the BT division is not limited in the large-size target CT having a large influence on the coding/decoding efficiency, thus the reduction in coding/decoding efficiency can be suppressed.

In the processing using the syntax table of FIGS. 34 to 41, the BT division is limited in the case where the bit depth (cbtDepth) is greater than the threshold value, however, in the present embodiment, in the processing using the syntax table of FIGS. 34 to 41, the BT division may be limited in a case where the target CT size (1<<log 2CbWidth, 1<<log 2CbHeight) is less than the threshold value TH. That is the processing may be performed by replacing "cbtDepth>=TH" in FIGS. 34 to 36 with "(1<<log 2CbWidth)>=TH && (1<<log 2CbHeight)>=TH", and replacing "cbtDepth>TH" in FIGS. 37 to 41 with "(1<<log 2CbWidth)<TH||(1<<log 2CbHeight)<TH".

Seventh Embodiment

In the first to third embodiments described above, it is preferable that the coding efficiency does not decrease while the complexity of coding/decoding is reduced. Therefore, in the present embodiment, the BT division is limited according to the slice-type. Specifically, the BT division in the first to third embodiments is limited in a case where the slice-type is other than I slice (that is, B, P slice).

In the present embodiment, by restricting the BT division according to the slice-type, the restriction of the BT division is not applied for the I slice in which the BT division pattern is complicated, thus the reduction in coding efficiency can be suppressed.

In the processing using the syntax table of FIGS. 34 to 41, the BT division is limited in the case where the bit depth (cbtDepth) is greater than the threshold value, however, in the present embodiment, in the processing using the syntax table of FIGS. 34 to 41, the BT division may be limited in a case of the slice-type other than the I slice (that is, B, P slice). That is, the processing may be performed by replacing "cbtDepth<=TH" in FIGS. 34 to 36 with "slice_type==I_SLICE" and replacing "cbtDepth>TH" in FIGS. 37 to 41 with "slice_type!=I_SLICE".

Eight Embodiment

In the I slice, since QTBT trees of luminance and chrominance are included, it is preferable to reduce the complexity of coding/decoding. Therefore, in the present embodiment, the BT division of the chrominance of the I slice is limited according to the BT division of the luminance of the I slice.

In the present embodiment, the BT division of the chrominance of the I slice is limited according to the BT division of the luminance of the I slice, thus the division pattern of the QTBT of the QTBT tree of the chrominance is limited. As a result, the complexity of coding/decoding related to the QTBT division of the I slice can be reduced.

Figure 44:
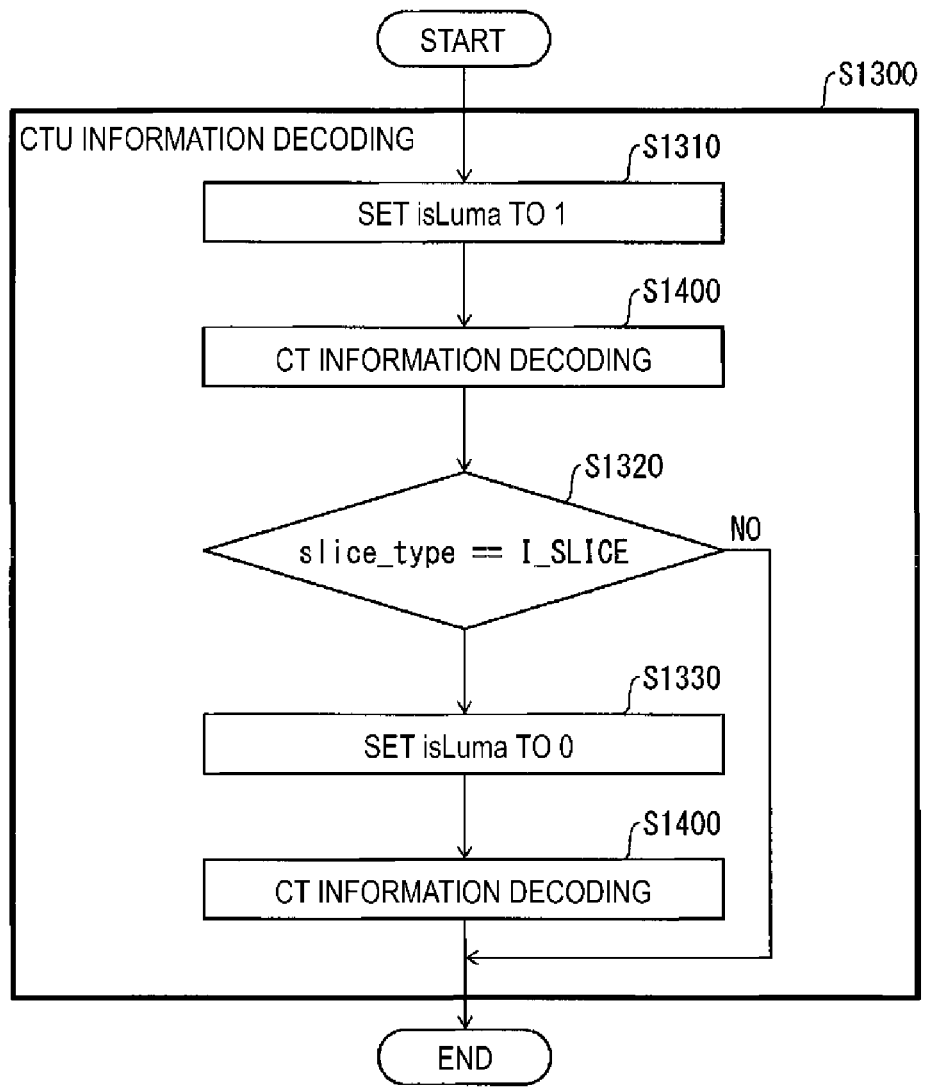
FIG. 44 is a flowchart illustrating an operation of the CT information decoding unit according to an embodiment of the disclosure.

Note that the CT information decoding unit 10 of the image decoding apparatus 31 decodes the CT information of the luminance of the I slice and then decodes the CT information of the chrominance of the I slice. FIG. 44 is a flowchart for explaining the operation of the CT information decoding unit 10.

In CTU information decoding S1300 by the CT information decoding unit 10, the CT information decoding unit 10 sets isLuma to 1 (S1310). isLuma is a variable indicating which of luminance and chrominance is to be processed, when isLuma is 1, the luminance is to be processed, and when isLuma is 0, the chrominance is to be processed.

Subsequently, the CT information decoding unit 10 performs CT information decoding S1400. The CT information decoding S1400 is the same as that illustrated in FIG. 11. Here, in the case where the slice-type is I slice, since isLuma is set to 1, the CT information decoding unit 10 performs CT information decoding S1400 on luminance.

In the case where the slice-type is other than I slice (that is, B, P slice) (S1320, NO), the process is ended as it is. On the other hand, in the case where the slice-type is I slice (S1320, YES), the CT information decoding unit 10 sets isLuma to 0.

Since isLuma is set to 0, the CT information decoding unit 10 performs CT information decoding S1400 of the chrominance. The CT information decoding S1400 is the same as that illustrated in FIG. 11.

Specific aspects of the present embodiment include an aspect in which the BT division of the chrominance of the I slice is limited such that the BT depth of the chrominance of the I slice is not greater than the BT depth of the luminance of the I slice, and an aspect in which the QTBT tree of the chrominance of the I slice is configured to have the same tree structure as the QTBT tree of the luminance of the I slice.

First, the aspect in which the BT division of the chrominance of the I slice is limited such that the BT depth of the chrominance of the I slice is not greater than the BT depth of the luminance of the I slice will be described below.

Processing of BT Information Decoding-1

An operation example of BT information decoding by the CT information decoding unit 10 in the present aspect will be described in detail by referring to FIG. 45. FIG. 45 is a diagram illustrating a configuration example of a syntax table of the BT information according to an embodiment of the disclosure.

Processing of Luminance of I Slice

The CT information decoding unit 10 decodes the BT information from the coding data and recursively decodes the coding tree CT (coding_binarytree) for the luminance of the I slice. Specifically, the CT information decoding unit 10 decodes the target coding tree coding_binarytree (x0, y0, log 2CbWidth, log 2CbHeight, cqtDepth, cbtDepth).

In the case where the predetermined condition is not satisfied, for the luminance of the I slice, the CT information decoding unit 10 derives the BT split mode split_bt_mode [x0] [y0] as 0.

On the other hand, in the case where the predetermined condition is not satisfied, for the luminance of the I slice, the CT information decoding unit 10 decodes the BT split mode split_bt_mode [x0] [y0] from the coding data.

Based on the BT split mode split_bt_mode [x0] [y0] derived in this way, the CT of the luminance of the I slice is decoded.

Here, when the BT split mode split_bt_mode [x0] [y0] is not 1 or 2 (that is, when BT division is not performed), since the processing target is the luminance of the I slice (=isLuma is 1), the CT information decoding unit 10 sets cqtDepth and cbtDepth respectively to the QT depth cqtDepthL [x0] [y0] in the QTBT tree of the luminance of the I slice and the BT depth cbtDepthL [x0] [y0] in the QTBT tree of luminance of the I slice.

The CT information decoding unit 10 also performs the same processing in the lower layer coding tree CT to continue the BT information decoding for the luminance of the I slice.

Processing of Chrominance of I Slice

Subsequently, the CT information decoding unit 10 decodes the BT information from the coding data and recursively decodes the coding tree CT (coding_binarytree) for the chrominance of the I slice. Specifically, the CT information decoding unit 10 decodes the target coding tree coding_binarytree (x0, y0, log 2CbWidth, log 2CbHeight, cqtDepth, cbtDepth).

In a case where the predetermined condition is not satisfied for the chrominance of the I slice, or in a case where the sum of the QT depth and the BT depth (cqtDepth+cbtDepth) is not less than the sum of the QT depth and the BT depth (cqtDepthL [x0] [y0]+cbtDepth L [x0] [y0]) in the QTBT tree of the luminance of the I slice, the CT information decoding unit 10 derives the BT split mode split_bt_mode [x0] [y0] as 0.

On the other hand, in a case where the predetermined condition is satisfied for the chrominance of the I slice, and the sum of the QT depth and the BT depth (cqtDepth+cbtDepth) is less than the sum of the QT depth and the BT depth (cqtDepthL [x0] [y0]+cbtDepth L [x0] [y0]) in the QTBT tree of the luminance of the I slice, the CT information decoding unit 10 decodes the BT split mode split_bt_mode [x0] [y0] from the coding data.

Based on the BT split mode split_bt_mode [x0] [y0] derived in this way, the CT information decoding unit 10 performs BT division of the chrominance of the I slice.

Processing of BT Information Decoding-2

Subsequently, the aspect in which the chrominance QTBT tree of the I slice is configured to have the same tree structure as the QTBT tree of the luminance of the I slice will be described. Note that, in the present aspect, in the case where the QTBT tree of the chrominance of the I slice is configured to have the same tree structure as the QTBT tree of the luminance of the I slice, the division method needs to be the same, but the division number may be less than the luminance QTBT tree. That is, a QTBT tree in which the QT division or the BT division is completed in the middle of the QTBT tree of the luminance of the I slice may be used as the QTBT tree of the chrominance of the I slice.

An operation example of QT information decoding and BT information decoding by the CT information decoding unit 10 in the present aspect will be described in detail by referring to FIG. 46 and FIG. 47. FIG. 46 is a diagram illustrating a configuration example of a syntax table of the QT information according to an embodiment of the disclosure, and FIG. 47 is a diagram illustrating a configuration example of a syntax table of the BT information according to an embodiment of the disclosure.

Processing of Luminance of I Slice

The CT information decoding unit 10 decodes the QT information from the coding data and recursively decodes the coding tree CT (coding_quadtree) for the luminance of the I slice. Specifically, the CT information decoding unit 10 decodes the target coding tree coding_quadtree (x0, y0, log 2CbSize, cqtDepth).

In a case where no QT split flag appears, the CT information decoding unit 10 derives the QT split flag split_cu_flag [x0] [y0] as 0.

On the other hand, in a case where the QT split flag appears, the CT information decoding unit 10 decodes the QT split flag split_cu_flag [x0] [y0] from the coding data.

Here, in the case where the processing target is the luminance of the I slice (=isLuma is 1), the CT information decoding unit 10 sets the QT split flag splitCuFlag of the target CT and the QT split flag splitCuFlagL [x0] [y0] of the luminance of the I slice to split_cu_flag [x0] [y0], respectively.

Based on the QT split flag splitCuFlag derived in this way, the CT information decoding unit 10 performs QT division of the luminance of the I slice.

Subsequently, the CT information decoding unit 10 decodes the BT information from the coding data and recursively decodes the coding tree CT (coding_binarytree) for the luminance of the I slice. Specifically, the CT information decoding unit 10 decodes the target coding tree coding_binarytree (x0, y0, log 2CbWidth, log 2CbHeight, cqtDepth, cbtDepth).

In the case where the predetermined condition is not satisfied, the CT information decoding unit 10 derives the BT split mode split_bt_mode [x0] [y0] as 0.

On the other hand, in the case where the predetermined condition is satisfied, the CT information decoding unit 10 decodes the BT split mode split_bt_mode [x0] [y0] from the coding data. Here, in the case where the processing target is the luminance of the I slice (=isLuma is 1), the CT information decoding unit 10 sets split_bt_mode [x0] [y0] to the BT split mode splitBtMode of the target CT.

Based on the BT split mode splitBtMode derived in this way, the BT division of the luminance of the I slice is performed.

The CT information decoding unit 10 also performs the same processing in the lower layer coding tree CT to continue the CT information decoding for the luminance of the I slice.

Processing of Chrominance of I Slice

Next, the CT information decoding unit 10 decodes the QT information from the coding data and recursively decodes the coding tree CT (coding_quadtree) for the chrominance of the I slice. Specifically, the CT information decoding unit 10 decodes the target coding tree coding_quadtree (x0, y0, log 2CbSize, cqtDepth).

In a case where no QT split flag appears, the CT information decoding unit 10 derives the QT split flag split_cu_flag [x0] [y0] as 0.

On the other hand, in a case where the QT split flag appears, the CT information decoding unit 10 decodes the QT split flag split_cu_flag [x0] [y0] from the coding data.

Here, in the case where the processing target is the I-slice chrominance (=isLuma is 0), the CT information decoding unit 10 sets QT split flag splitCuFlag of the target CT to "splitCuFlagL [corresponding X coordinate of luminance] [corresponding Y coordinate of luminance] AND split_cu_flag [x0] [y0]". The corresponding luminance coordinate is the luminance coordinate corresponding to the chrominance coordinate. For example, in the case of Y:Cb:Cr=4:4:4, the corresponding luminance coordinate is (x0, y0), and in the case of Y:Cb:Cr=4:2:2. The coordinates are (x0<<1, y0), and when Y:Cb:Cr=4:2:0, the corresponding luminance coordinates are (x0<<1, y0<<1).

Based on the QT split flag splitCuFlag derived in this way, the CT information decoding unit 10 performs QT division of the chrominance of the I slice.

Subsequently, the CT information decoding unit 10 decodes the BT information from the coding data and recursively decodes the coding tree CT (coding_binarytree) for the chrominance of the I slice. Specifically, the CT information decoding unit 10 decodes the target coding tree coding_binarytree (x0, y0, log 2CbWidth, log 2CbHeight, cqtDepth, cbtDepth).

In the case where the predetermined condition is not satisfied, the CT information decoding unit 10 derives the BT split mode split_bt_mode [x0] [y0] as 0.

On the other hand, in the case where the predetermined condition is satisfied, the CT information decoding unit 10 decodes the BT split flag split_bt_flag [x0] [y0] from the coding data.

Here, in the case where the processing target is the I-slice chrominance (=isLuma is 0), the CT information decoding unit 10 sets the BT split mode splitBtMode of the target CT to split_bt_mode [corresponding coordinate X of luminance] [corresponding Y coordinate of luminance] when the BT split flag split_bt_flag [x0] [y0] is 1, and sets to 0 when the BT split flag split_bt_flag [x0] [y0] is 0.

Based on the BT split mode splitBtMode derived in this way, the BT division of the chrominance of the I slice is performed.

The CT information decoding unit 10 also performs the same processing in the lower layer coding tree CT to continue the CT information decoding for the chrominance of the I slice.

Note that, in the above description, the aspect of that the QTBT tree of the chrominance of the I slice is configured to have the same tree structure as the QTBT tree of the luminance of the I slice is illustrated, but the present embodiment is not limited to this. For example, the QT tree of the chrominance of the I slice may have the same tree structure as the QT tree of the luminance of the I slice. An example of the structure of the syntax table of the QT information in this case is illustrated in FIG. 48. As illustrated in FIG. 48, in the case where the processing target is the I-slice chrominance (=isLuma is 0), the CT information decoding unit 10 sets QT split flag splitCuFlag of the target CT to splitCuFlagL [corresponding X coordinate of luminance] [corresponding Y coordinate of luminance]. The corresponding luminance coordinate is the luminance coordinate corresponding to the chrominance coordinate. Based on the QT split flag splitCuFlag derived in this way, the CT information decoding unit 10 performs QT division of the chrominance of the I slice.

Alternatively, the BT tree of the chrominance of the I slice may have the same tree structure as the BT tree of the luminance of the I slice.

Implementation Examples by Software

Note that a part of the image coding apparatus 11 and the image decoding apparatus 31 according to the above embodiment, for example, the entropy decoding unit 301, the prediction parameter decoding unit 302, the loop filter 305, the predicted image generation unit 308, the inverse quantization/inverse DCT Unit 311, an addition unit 312, a predicted image generating unit 101, a subtraction unit 102, a DCT/quantizing unit 103, an entropy coding unit 104, an inverse quantization/inverse DCT unit 105, a loop filter 107, a coding parameter determination unit 110, and the prediction parameter coding unit 111 may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built in the image coding apparatus 11 or the image decoding apparatus 31, and the "computer system" includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize a part of the functions described above, and further may be configured that the functions described above can be realized by combination with a program already recorded in the computer system.

Further, part or all of the image coding apparatus 11 and the image decoding apparatus 31 in the above-described embodiment may be realized as an integrated circuit such as a Large Scale Integration (LSI). Each of the functional blocks of the image coding apparatus 11 and the image decoding apparatus 31 may be individually realized as a processor, or may be partially or completely integrated into a processor. Further, the circuit integration technique is not limited to LSI, and may be realized by a dedicated circuit or a multi-purpose processor. Furthermore, in a case where an integrated circuit technology to replace LSI appears due to advances in semiconductor technology, an integrated circuit based on the technology may be used.

Application Example

The image coding apparatus 11 and the image decoding apparatus 31 described above can be used by being mounted in various apparatuses that transmit, receive, record, and reproduce videos. Note that, the video may be a natural video captured by a camera or the like, or may be an artificial video (including CG and GUI) generated by a computer or the like.

Figure 8A:
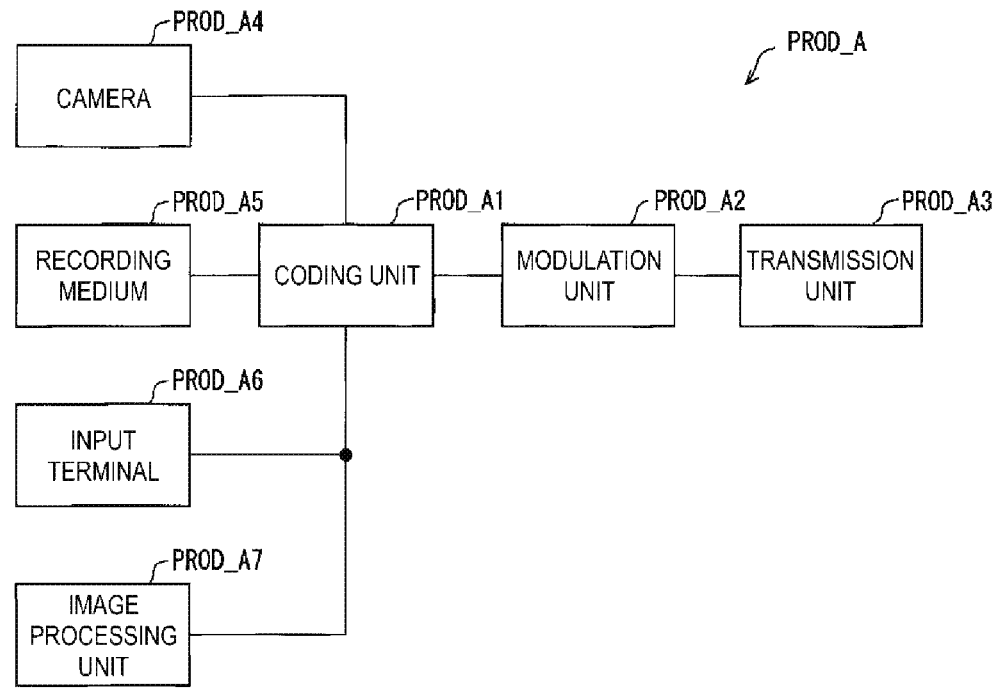
FIGS. 8A and 8B are diagrams illustrating a configuration of a transmission apparatus provided with the image coding apparatus and a reception apparatus provided with the image decoding apparatus according to an embodiment of the disclosure.
Figure 8B:
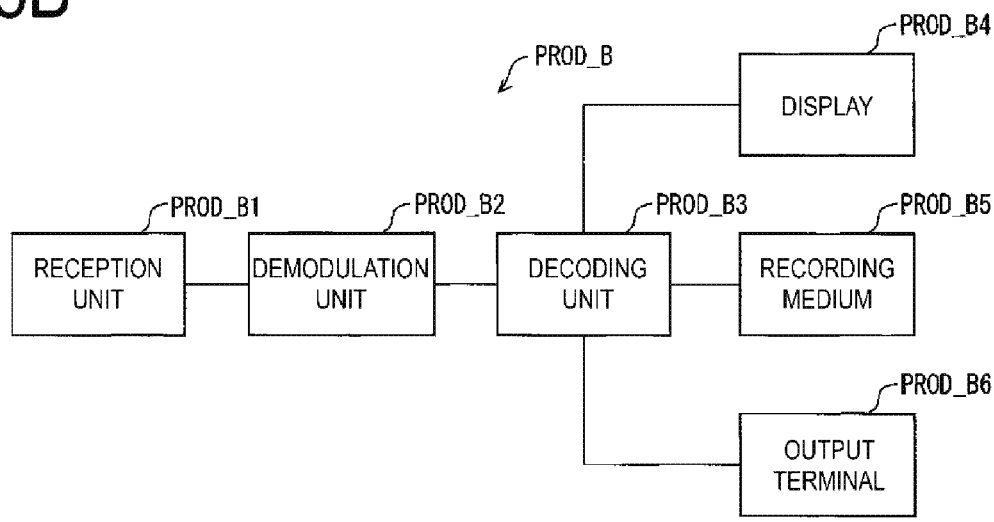

First, it is described by referring to FIGS. 8A and 8B that the image coding apparatus 11 and the image decoding apparatus 31 described above can be used for transmission and reception of videos.

FIG. 8A is a block diagram illustrating the configuration of the transmission apparatus PROD_A mounted with the image coding apparatus 11. As illustrated FIG. 8A, the transmission apparatus PROD_A includes a coding unit PROD_A1 configured to obtain coding data by coding a video, a modulation unit PROD_A2 configured to obtain a modulated signal by modulating a carrier wave with the coding data obtained by the coding section PROD_A1, and a transmission unit PROD_A3 configured to transmit the modulation signal obtained by the modulation unit PROD_A2. The above-described image coding apparatus 11 is used as the coding unit PROD_A1.

The transmission apparatus PROD_A, as a supply source of a video input to the coding unit PROD_A1, may further include a camera PROD_A4 configured to capture the video, a recording medium PROD_A5 configured to record the video, an input terminal PROD_A6 configured to input the video, and an image processing unit A7 configured to generate or process an image. In FIG. 8A, a configuration in which all of these are provided in the transmission apparatus PROD_A is illustrated, but a part thereof may be omitted.

Note that the recording medium PROD_A5 may be one in which a video not coded is recorded, and may be a recording of a video coded by a coding method for recording different from the coding method for transmission. In the latter case, a decoding unit (not illustrated) configured to decode the coding data read from the recording medium PROD_A5 according to the coding method for recording may be interposed between the recording medium PROD_A5 and the coding unit PROD_A1.

FIG. 8B is a block diagram illustrating the configuration of the reception apparatus PROD_A mounted with the image decoding apparatus 31. As illustrated in FIG. 8B, the receiving device PROD_B includes a reception unit PROD_B1 configured to receive the modulation signal, a demodulation unit PROD_B2 configured to obtain the coding data by demodulating the modulation signal received by the reception unit PROD_B1, and a decoding unit PROD_B3 configured to obtain a video by decoding the coding data obtained by the unit PROD_B2. The above-described image coding apparatus 31 is used as the decoding unit PROD_B3.

The receiving device PROD_B, as a supply source of a video output to the decoding unit PROD_B3, may further include a display PROD_B4 configured to display the video, a recording medium PROD_B5 configured to record the video, and an output terminal PROD_B6 configured to output the video to the outside. In FIG. 8B, a configuration in which all of these are provided in the reception apparatus PROD_B is illustrated, but a part thereof may be omitted.

Note that the recording medium PROD_B5 may be one in which a video not coded for recording, and may be coded by a coding method for recording different from the coding method for transmission. In the latter case, a coding unit (not illustrated) configured to codes the video acquired from the decoding unit PROD_B3 according to the coding method for recording may be interposed between the decoding unit PROD_B3 and the recording medium PROD_B5.

Note that the transmission medium for transmitting the modulated signal may be wireless or wired. Further, the transmission mode of transmitting the modulated signal may be broadcasting (in this case, a transmission mode in which a transmission destination is not specified in advance), or may be communication (in this case, a transmission mode in which a transmission destination is specified in advance). That is, the transmission of the modulated signal may be realized by any of radio broadcast, cable broadcast, wireless communication, and wired communication.

For example, a terrestrial digital broadcasting broadcast station (broadcasting facility, and the like)/receiving station (television receiver, and the like) is an example of a transmission apparatus PROD_A/reception apparatus PROD_B that transmits and receives modulated signals by radio broadcasting. Further, a cable TV broadcasting broadcast station (broadcasting facility, and the like)/receiving station (television receiver, and the like) is an example of a transmitting apparatus PROD_A/reception apparatus PROD_B that transmits and receives modulated signals by cable broadcasting.

In addition, server (workstations and the like)/client (television receiver, personal computer, smart phone, and the like) such as Video On Demand (VOD) service and video sharing service using the Internet is an example of the transmission apparatus PROD A/reception apparatus PROD_B that transmits and receives modulated signals by communication (normally, either a wireless or a wired is used as a transmission medium in the LAN, and wired is used as a transmission medium in the WAN). Here, the personal computer includes a desktop PC, a laptop PC, and a tablet PC. In addition, the smartphone includes multifunctional mobile phone terminal.

Note that the client of the video sharing service has a function to decode the coding data downloaded from the server and display it on the display, and to code the video captured by the camera and upload it to the server. That is, the client of the video sharing service has functions of both the transmission apparatus PROD_A and the reception apparatus PROD_B.

Figure 9A:
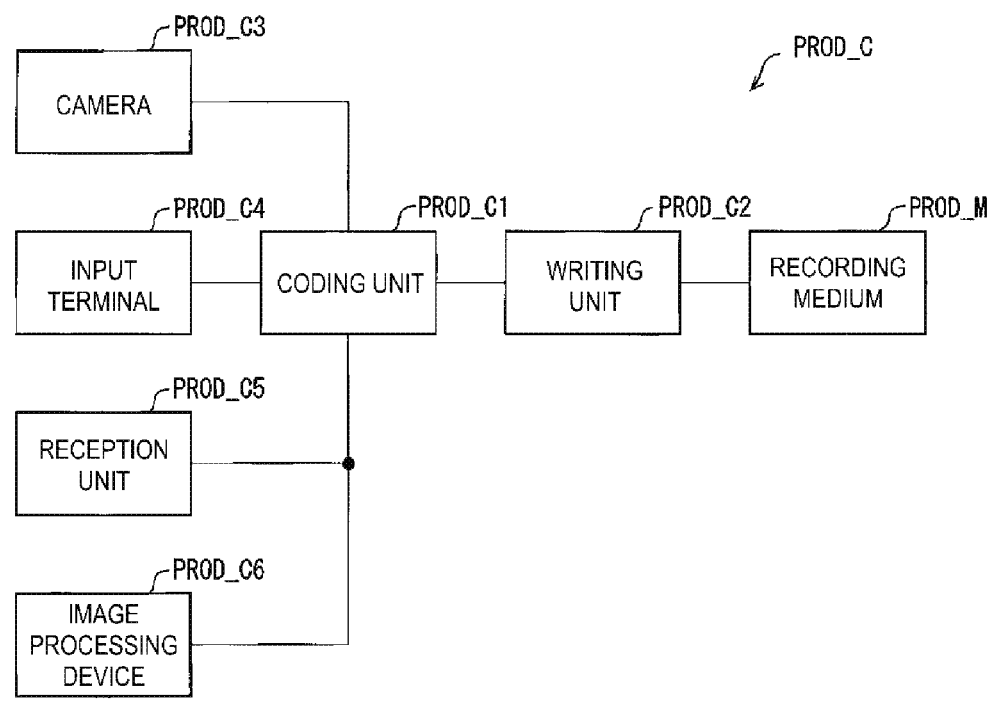
FIGS. 9A and 9B are diagrams illustrating a configuration of a recording apparatus provided with the image coding apparatus and a playback apparatus provided with the image decoding apparatus according to an embodiment of the disclosure.
Figure 9B:
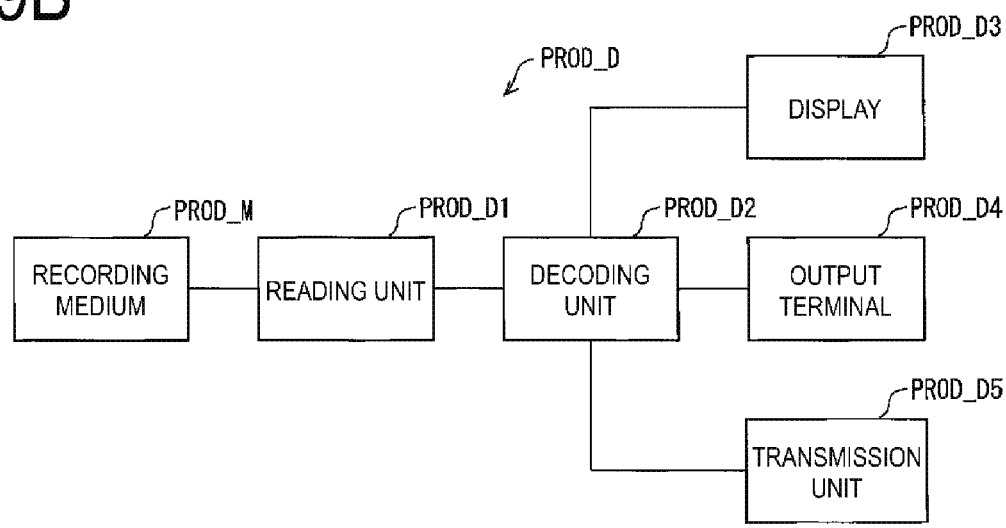

Next, it is described by referring to FIGS. 9A and 9B that the image coding apparatus 11 and the image decoding apparatus 31 described above can be used for recording and playback of videos.

FIG. 9A is a block diagram illustrating the configuration of a recording apparatus PROD_C mounted with the image coding apparatus 11. As illustrated FIG. 9A, the recording apparatus PROD_C includes a coding unit PROD_C1 configured to obtain coding data by coding a video, a writing unit PROD_C2 configured to write the coding data obtained by the coding unit PROD_C1 into a recording medium PROD_M. The above-described image coding apparatus 11 is used as the coding unit PROD_C1.

Note that the recording medium PROD_M may be a type connected to the recording apparatus PROD_C, such as (1) a Hard Disk Drive (HDD) or a Solid State Drive (SSD), or (2) an SD memory card Or a Universal Serial Bus (USB) flash memory, or may be loaded in a drive device (not illustrated) built in the recording apparatus PROD_C, such as (3) a Digital Versatile Disc (DVD) or a Blu-ray Disc (BD, registered trademark).

In addition, the recording device PROD_C, as a supply source of a video input to the coding unit PROD_C1, may further include a camera PROD_C3 configured to capture the video, an input terminal PROD_C4 configured to input the video, a reception unit PROD_C5 configured to receive the video, and an image processing unit PROD_C6 configured to generate or process an image. In FIG. 9A, a configuration in which all of these are provided in the recording apparatus PROD_C is illustrated, but a part thereof may be omitted.

Note that the reception unit PROD_C5 may receive an uncoded video and may receive coding data coded by a coding method for transmission different from the coding method for recording. In the latter case, a transmission decoding unit (not illustrated) for decoding the coding data coded by the coding method for transmission may be interposed between the reception unit PROD_C5 and the coding unit PROD_C1.

Examples of such a recording apparatus PROD_C include a DVD recorder, a BD recorder, a Hard Disk Drive (HDD) recorder, and the like (in this case, the input terminal PROD_C4 or the reception unit PROD_C5 is a main supply source of video). In addition, a camcorder (in this case, the camera PROD_C3 is the main supply source of video), a personal computer (in this case, the reception unit PROD_C5 or the image processing unit C6 is a main supply source of video), a smartphone, The camera PROD_C3 or the reception unit PROD_C5 is a main supply source of video), and the like are examples of such a recording device PROD_C.

FIG. 9B is a block diagram illustrating the configuration of a playback apparatus PROD_D mounted with the image decoding apparatus 31. As illustrated in FIG. 9B, the playback apparatus PROD_D includes a reading section PROD_D1 configured to read coding data written in a recording medium PROD_M, and a decoding unit PROD_D2 configured to obtain a video by decoding the coding data read by the reading unit PROD_D1. The above-described image coding apparatus 31 is used as the decoding unit PROD_D2.

Note that the recording medium PROD_M may be a type built in the playback apparatus PROD_D, such as (1) HDD, SSD, and the like, or may be a type connected to the playback apparatus PROD_D, such as (2) an SD memory card or a USB flash memory, or may be a type loaded in a drive device (not illustrated) built in the playback device PROD_D, such as (3) DVD, BD and the like.

In addition, the playback device PROD_D, as a supply source of a video output to the decoding unit PROD_D3, may further include a display PROD_D3 configured to display the video, an output terminal PROD_D4 configured to output the video to the outside, and a transmission unit PROD_D5 configured to transmit a video. In FIG. 9B, a configuration in which all of these are provided in the playback apparatus PROD_D is illustrated, but a part thereof may be omitted.

Note that the transmission unit PROD_D5 may transmit an uncoded video and may transmit coding data coded by a coding method for transmission different from the coding method for recording. In the latter case, a coding unit (not illustrated) configured to codes the video according to the coding method for transmission may be interposed between the decoding unit PROD_D2 and the transmission PROD_D5.

Examples of such a playback device PROD_D include a DVD player, a BD player, an HDD player, and the like (in this case, the output terminal PROD_D4 to which a television receiver or the like is connected is a main supply source of video). In addition, a television receiver (in this case, the display PROD_D3 is a main supply source of video), a digital signage (also referred to as an electronic signage or an electronic bulletin board, the display PROD_D3 or the transmission unit PROD_D5 is the main supply of video), a desktop type PC (In this case, the output terminal PROD_D4 or the transmission unit PROD_D5 is the main supply source of video), a laptop type or tablet type PC (in this case, the display PROD_D3 or the transmission unit PROD_D5 is the main supply source of video), a smartphone (in this case, the display PROD_D3 or the transmission unit PROD_D5 is the main supply source of video), and the like are examples of such a playback device PROD_D.

Hardware Realization and Software Realization

Further, each of the blocks of the image decoding apparatus 31 and the image coding apparatus 11 described above may be realized by hardware using a logic circuit formed on an integrated circuit (IC chip), or may be realized by software using a Central Processing Unit (CPU).

In the latter case, each of the above-described apparatuses may include a CPU configured to perform commands of a program for realizing the functions, a Read Only Memory (ROM) in which the program is stored, a Random Access Memory (RAM) in which the program is loaded, and a storage device (recording medium) such as a memory for storing the program and various data, and the like. The object of the embodiments of the disclosure is achieved by supplying a recording medium, which records program code of a control program (executable program, intermediate code program, supply source program) of each of the above-described apparatuses, to each of the above-described apparatuses, and by reading and performing the program code recorded on the recording medium, wherein each of the above-described apparatuses is software that realizes the above-described functions.

Examples of the recording medium include tape such as a magnetic tape and a cassette tape, disk including magnetic disk such as a floppy (registered trademark) disk/hard disk, and optical disk such as a Compact Disc Read-Only Memory (CD-ROM)/Magneto-Optical disc Disk (MO disk)/Mini Disc (MD)/Digital Versatile Disc (DVD)/CD Recordable (CD-R)/Blu-ray Disc (registered trademark), card such as IC card (including memory card)/optical card, semiconductor memory such as mask ROM/Erasable Programmable Read-Only Memory (EPROM)/Electrically Erasable Read-Only Memory (EEPROM, registered trademark)/flash ROM, and logic circuit such as Programmable Logic Device (PLD) and Field Programmable Gate Array (FPGA), and the like can be used.

Further, each of the above devices may be configured to be connectable to a communication network, and the program code may be supplied via a communication network. The communication network is not particularly limited as long as it can transmit the program code. The communication network is not particularly limited as long as it can transmit the program code. For example, the Internet, Intranet, Extranet, LAN (Local Area Network), ISDN (Integrated Services Digital Network), VAN (Value-Added Network), CATV (Community Antenna television/Cable Television) communication network, Virtual Private Network), telephone network, mobile communication network, satellite communication network, and the like can be used. In addition, the transmission medium constituting the communication network may be a medium capable of transmitting the program code, and is not limited to a specific configuration or type. For example, wired such as Institute of Electrical and Electronic Engineers (IEEE) 1394, USB, power line carrier, cable TV line, telephone line, Asymmetric Digital Subscriber Line (ADSL), infrared light such as Infrared Data Association (IrDA), remote control, and wireless such as BlueTooth (registered trademark), IEEE 802.11 radio, High Data Rate (HDR), Near Field Communication (NFC), Digital Living Network Alliance (DLNA, Registered Trademark), mobile phone network, satellite line, terrestrial digital broadcasting network, and the like also can be used. Note that, the embodiment of the disclosure can also be realized in the form of a computer data signal embedded in a carrier wave in which the program code is embodied by electronic transmission.

Embodiments of the disclosure are not limited to the embodiments described above, and various modifications can be made within the scope of the claims. That is, embodiments obtained by combining technical means appropriately changed within the scope of claims are also included in the technical scope of the disclosure.

CROSS-REFERENCE OF RELATED APPLICATION

The present application claims priority based on Japanese patent application No. 2016-166319 filed on Aug. 26, 2016, and Japanese Patent Application No. 2016-253890 filed on Dec. 27, 2016, all of the contents of which are incorporated herein by reference.

INDUSTRIAL APPLICABILITY

Embodiments of the disclosure can be suitably applied to an image decoding apparatus that decodes coding data in which image data is coded, and an image coding apparatus that generates coding data in which image data is coded. Further, the disclosure can be suitably applied to a data structure of coding data generated by an image coding apparatus and referred to by an image decoding apparatus.

REFERENCE SIGNS LIST

10 CT information decoding unit
11 Image coding apparatus
20 CU decoding unit
31 Image decoding apparatus
41 Image display apparatus

The invention claimed is:
1. An image decoding apparatus configured to decode a picture for each coding tree unit, comprising:
   a header decoding circuitry configured to receive coded data including the coding tree unit; and
   a division information decoding circuitry configured to decode division information indicating a division method of division with respect to coding nodes in the coding tree unit, wherein
   the division information decoding circuitry is configured to determine whether or not a hierarchy of the coding node is deeper than a predetermined hierarchy and refer to the division information of another decoded coding node,
   whether or not the hierarchy of the coding node is deeper than the predetermined hierarchy is determined by using a depth, and
   in a case that a value of the depth is greater than zero, the hierarchy of the coding node is determined as deeper than the predetermined hierarchy.

* * * * *